(12) United States Patent
Brady et al.

(10) Patent No.: US 10,241,516 B1
(45) Date of Patent: Mar. 26, 2019

(54) AUTONOMOUS GROUND VEHICLES DEPLOYED FROM FACILITIES

(71) Applicant: Amazon Technologies, Inc., Seattle, WA (US)

(72) Inventors: Tye Michael Brady, Southborough, MA (US); Darren Ernest Canavor, Redmond, WA (US); Ethan Zane Evans, Sumner, WA (US); Pragyana K. Mishra, Seattle, WA (US); Hilliard Bruce Siegel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/280,479

(22) Filed: Sep. 29, 2016

(51) Int. Cl.
*G05D 1/02* (2006.01)
*G06Q 10/08* (2012.01)
*G05D 1/00* (2006.01)

(52) U.S. Cl.
CPC ......... *G05D 1/0088* (2013.01); *G05D 1/0027* (2013.01); *G05D 1/0225* (2013.01); *G05D 1/0278* (2013.01); *G06Q 10/0832* (2013.01)

(58) Field of Classification Search
CPC .. G05D 1/0088; G05D 1/0225; G05D 1/0274; G05D 1/0278; G05D 2201/0216; G05D 1/0027; G06Q 10/0832; G06Q 10/087; B25J 5/007; B65G 1/1375; A47L 2201/022
See application file for complete search history.

(56) References Cited

U.S. PATENT DOCUMENTS

| 4,865,248 A | 9/1989 | Barth |
| 4,954,962 A | 9/1990 | Evans et al. |
| 5,040,116 A | 8/1991 | Evans et al. |
| 5,283,739 A | 2/1994 | Summerville et al. |

(Continued)

FOREIGN PATENT DOCUMENTS

| DE | 102011086497 A1 * | 5/2013 | |
| FR | 2692064 A1 * | 12/1993 | ............. B62D 1/265 |

(Continued)

OTHER PUBLICATIONS

EPO machine translation of DE 102011086497 (original DE document published May 16, 2013) (Year: 2013).*

(Continued)

*Primary Examiner* — Behrang Badii
*Assistant Examiner* — David A Testardi
(74) *Attorney, Agent, or Firm* — Athorus, PLLC

(57) ABSTRACT

Autonomous ground vehicles ("AGVs") may be deployed from facilities (e.g., materials handling facilities, etc.) to deliver items to specified locations (e.g., user residences). In various implementations, AGVs may utilize various techniques for long-range travel between materials handling facilities and delivery locations (e.g., solar charging, strategically placed charging stations, energy efficient travel paths, etc.). In various implementations, AGV facilities (e.g., smaller types of materials handling facilities) may be sized to be more easily located in compressed urban areas (e.g., to be closer to various delivery locations, etc.) and may function as home base locations where AGVs are stationed and/or where items are received (e.g., from transportation vehicles) for delivery to local delivery locations.

20 Claims, 21 Drawing Sheets

(56) References Cited

U.S. PATENT DOCUMENTS

| | | |
|---|---|---|
| 5,386,462 A | 1/1995 | Schlamp |
| 5,995,898 A | 11/1999 | Tuttle |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,543,983 B1 | 4/2003 | Felder et al. |
| 6,636,781 B1 | 10/2003 | Shen et al. |
| 6,690,997 B2 | 2/2004 | Rivalto |
| 6,694,217 B2 | 2/2004 | Bloom |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,459,880 B1 * | 12/2008 | Rosen ................ H01M 10/465 320/101 |
| 7,673,831 B2 | 3/2010 | Steele et al. |
| 7,685,953 B2 | 3/2010 | Giles |
| 7,693,745 B1 | 4/2010 | Pomerantz et al. |
| 7,894,939 B2 * | 2/2011 | Zini ................ G05B 19/41895 700/245 |
| 7,925,375 B2 | 4/2011 | Schininger et al. |
| 7,946,530 B1 | 5/2011 | Talmage |
| 7,966,093 B2 | 6/2011 | Zhuk |
| 8,015,023 B1 | 9/2011 | Lee et al. |
| 8,078,317 B2 | 12/2011 | Allinson et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,511,606 B1 | 8/2013 | Lutke et al. |
| 8,577,538 B2 | 11/2013 | Lenser et al. |
| 8,899,903 B1 | 12/2014 | Saad et al. |
| 8,948,914 B2 * | 2/2015 | Zini ................ G05B 19/41895 700/236 |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,216,587 B2 | 12/2015 | Ando et al. |
| 9,216,857 B1 | 12/2015 | Kalyan et al. |
| 9,230,236 B2 * | 1/2016 | Villamar ............ G06Q 10/087 |
| 9,235,213 B2 * | 1/2016 | Villamar ............ G05D 1/0212 |
| 9,244,147 B1 | 1/2016 | Soundararajan et al. |
| 9,256,852 B1 | 2/2016 | Myllymaki |
| 9,261,578 B2 | 2/2016 | Im et al. |
| 9,336,506 B2 | 5/2016 | Shucker et al. |
| 9,358,975 B1 | 6/2016 | Watts |
| 9,373,149 B2 | 6/2016 | Abhyanker |
| 9,381,916 B1 | 7/2016 | Zhu et al. |
| 9,397,518 B1 * | 7/2016 | Theobald ............ H02J 7/025 |
| 9,411,337 B1 * | 8/2016 | Theobald ............ B25J 5/00 |
| 9,436,926 B2 * | 9/2016 | Cousins ............ G06Q 10/087 |
| 9,489,490 B1 * | 11/2016 | Theobald ............ G06F 19/3462 |
| 9,535,421 B1 * | 1/2017 | Canoso ............ G05D 1/0214 |
| 9,545,852 B2 | 1/2017 | Streett |
| 9,561,941 B1 | 2/2017 | Watts |
| 9,582,950 B2 * | 2/2017 | Shimizu ............ G07C 9/00111 |
| 9,619,776 B1 * | 4/2017 | Ford ................ G06Q 10/08355 |
| 9,623,553 B1 * | 4/2017 | Theobald ............ B25J 9/00 |
| 9,623,562 B1 | 4/2017 | Watts |
| 9,682,481 B2 | 6/2017 | Lutz et al. |
| 9,718,564 B1 | 8/2017 | Beckman et al. |
| 9,720,414 B1 * | 8/2017 | Theobald ............ G01S 13/887 |
| 9,733,646 B1 * | 8/2017 | Nusser ............ G05D 1/0297 |
| 9,746,852 B1 | 8/2017 | Watts et al. |
| 9,786,187 B1 | 10/2017 | Bar-Zeev et al. |
| 9,959,773 B2 | 5/2018 | Raptopoulos et al. |
| 10,048,697 B1 * | 8/2018 | Theobald ............ G05D 1/0268 |
| 10,108,185 B1 * | 10/2018 | Theobald ............ G05B 19/4189 |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0141411 A1 | 7/2003 | Pandya et al. |
| 2004/0068416 A1 * | 4/2004 | Solomon ............ F41H 13/00 446/454 |
| 2004/0112660 A1 | 6/2004 | Johansson et al. |
| 2004/0162638 A1 | 8/2004 | Solomon |
| 2006/0118162 A1 * | 6/2006 | Saelzer ............ B60L 8/00 136/246 |
| 2006/0136237 A1 | 6/2006 | Spiegel et al. |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0233337 A1 | 10/2007 | Plishner |
| 2007/0293978 A1 | 12/2007 | Wurman et al. |
| 2008/0027591 A1 | 1/2008 | Lenser et al. |
| 2008/0100258 A1 * | 5/2008 | Ward ............ H01M 10/465 320/101 |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0079388 A1 * | 3/2009 | Reddy ............ B60L 11/1818 320/109 |
| 2009/0106124 A1 | 4/2009 | Yang |
| 2009/0149985 A1 | 6/2009 | Chirnomas |
| 2009/0236470 A1 | 9/2009 | Goossen et al. |
| 2009/0299903 A1 | 12/2009 | Hung et al. |
| 2009/0314883 A1 | 12/2009 | Ariton et al. |
| 2010/0088163 A1 | 4/2010 | Davidson et al. |
| 2011/0035149 A1 | 2/2011 | McAndrew et al. |
| 2011/0264311 A1 | 10/2011 | Lee et al. |
| 2012/0039694 A1 | 2/2012 | Suzanne |
| 2012/0109419 A1 | 5/2012 | Mercado |
| 2012/0219397 A1 | 8/2012 | Baker |
| 2012/0323365 A1 * | 12/2012 | Taylor ............ B25J 19/005 700/259 |
| 2013/0073477 A1 | 3/2013 | Grinberg |
| 2013/0081245 A1 | 4/2013 | Vavrina et al. |
| 2013/0126611 A1 | 5/2013 | Kangas et al. |
| 2013/0148123 A1 | 6/2013 | Hayashi |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2014/0022055 A1 | 1/2014 | Levied et al. |
| 2014/0030444 A1 | 1/2014 | Swaminathan et al. |
| 2014/0032034 A1 | 1/2014 | Raptopoulos et al. |
| 2014/0052661 A1 | 2/2014 | Shakes et al. |
| 2014/0136282 A1 | 5/2014 | Fedele |
| 2014/0136414 A1 * | 5/2014 | Abhyanker ............ G06Q 50/28 705/44 |
| 2014/0149244 A1 | 5/2014 | Abhyanker |
| 2014/0180914 A1 | 6/2014 | Abhyanker |
| 2014/0254896 A1 | 9/2014 | Zhou et al. |
| 2014/0309813 A1 | 10/2014 | Ricci |
| 2014/0325218 A1 * | 10/2014 | Shimizu ............ H04L 9/3271 713/168 |
| 2015/0006005 A1 * | 1/2015 | Yu ............ G06Q 10/08 701/22 |
| 2015/0069968 A1 | 3/2015 | Pounds |
| 2015/0102154 A1 | 4/2015 | Duncan et al. |
| 2015/0120602 A1 | 4/2015 | Huffman et al. |
| 2015/0129716 A1 | 5/2015 | Yaffe |
| 2015/0153175 A1 | 6/2015 | Skaaksrud |

(56) References Cited

U.S. PATENT DOCUMENTS

| | | |
|---|---|---|
| 2015/0154545 A1 | 6/2015 | Skaaksrud et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1* | 9/2015 | Binney ............... G05D 1/0214 701/28 |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0033966 A1 | 2/2016 | Farris et al. |
| 2016/0068267 A1 | 3/2016 | Liu et al. |
| 2016/0104099 A1 | 4/2016 | Villamar |
| 2016/0114488 A1 | 4/2016 | Medina et al. |
| 2016/0129592 A1 | 5/2016 | Saboo et al. |
| 2016/0144734 A1 | 5/2016 | Wang et al. |
| 2016/0144982 A1 | 5/2016 | Sugumaran |
| 2016/0200438 A1 | 7/2016 | Bokeno et al. |
| 2016/0207627 A1 | 7/2016 | Hoareau et al. |
| 2016/0214717 A1* | 7/2016 | De Silva ............... B64D 5/00 |
| 2016/0235236 A1 | 8/2016 | Byers et al. |
| 2016/0236778 A1 | 8/2016 | Takayama et al. |
| 2016/0257401 A1 | 9/2016 | Buchmueller et al. |
| 2016/0266578 A1 | 9/2016 | Douglas et al. |
| 2016/0282126 A1 | 9/2016 | Watts et al. |
| 2016/0299233 A1 | 10/2016 | Levied et al. |
| 2016/0334229 A1 | 11/2016 | Ross et al. |
| 2016/0364679 A1 | 12/2016 | Cao |
| 2016/0364989 A1 | 12/2016 | Speasl et al. |
| 2017/0032315 A1 | 2/2017 | Gupta et al. |
| 2017/0087999 A1* | 3/2017 | Miller ............... G01C 21/3679 |
| 2017/0096222 A1 | 4/2017 | Spinelli |
| 2017/0098378 A1 | 4/2017 | Soundararajan et al. |
| 2017/0100837 A1 | 4/2017 | Zevenbergen et al. |
| 2017/0101017 A1 | 4/2017 | Streett |
| 2017/0113352 A1 | 4/2017 | Lutz et al. |
| 2017/0164319 A1 | 6/2017 | Skaaksrud et al. |
| 2017/0167881 A1 | 6/2017 | Rander et al. |
| 2017/0286905 A1 | 10/2017 | Richardson et al. |
| 2017/0372256 A1 | 12/2017 | Kantor et al. |
| 2018/0024554 A1 | 1/2018 | Brady et al. |
| 2018/0088586 A1* | 3/2018 | Hance ............... G05D 1/0246 |
| 2018/0127211 A1 | 5/2018 | Jarvis et al. |
| 2018/0203464 A1* | 7/2018 | Yu ............... G06Q 10/08 |

FOREIGN PATENT DOCUMENTS

| | | | |
|---|---|---|---|
| JP | 2004126800 A | * | 4/2004 |
| JP | 2011211025 A | * | 10/2011 |
| WO | 2013148123 A1 | | 10/2013 |
| WO | WO-2017/064202 A1 | * | 4/2017 |

OTHER PUBLICATIONS

Kais, Mikael et al., "An intelligent architecture for automated transportation in our cities", 2001 European Control Conference (ECC), Porto, Portugal, Sep. 4-7, 2001, pp. 277-282 (Year: 2001).*

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).*

Translation of FR 2692064 (original FR document published Dec. 10, 1993) (Year: 1993).* http://qz.com/613277/google-wants-to-deliver-packages-from-self-driving-trucks/, (Feb. 9, 2016).

http://www.geekwire.com/2016/google-pondering-drone-delivery-even-about-boxes-it-flies-to-front-doors/, (Google patents secure rolling box to receive packages from drones, Jan. 27, 2016).

https://www.starship.xyz/, (Copyright 2016).

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

International Search Report and Written Opinion for PCT Application No. PCT/US2017/043401 dated Sep. 19, 2017.

* cited by examiner

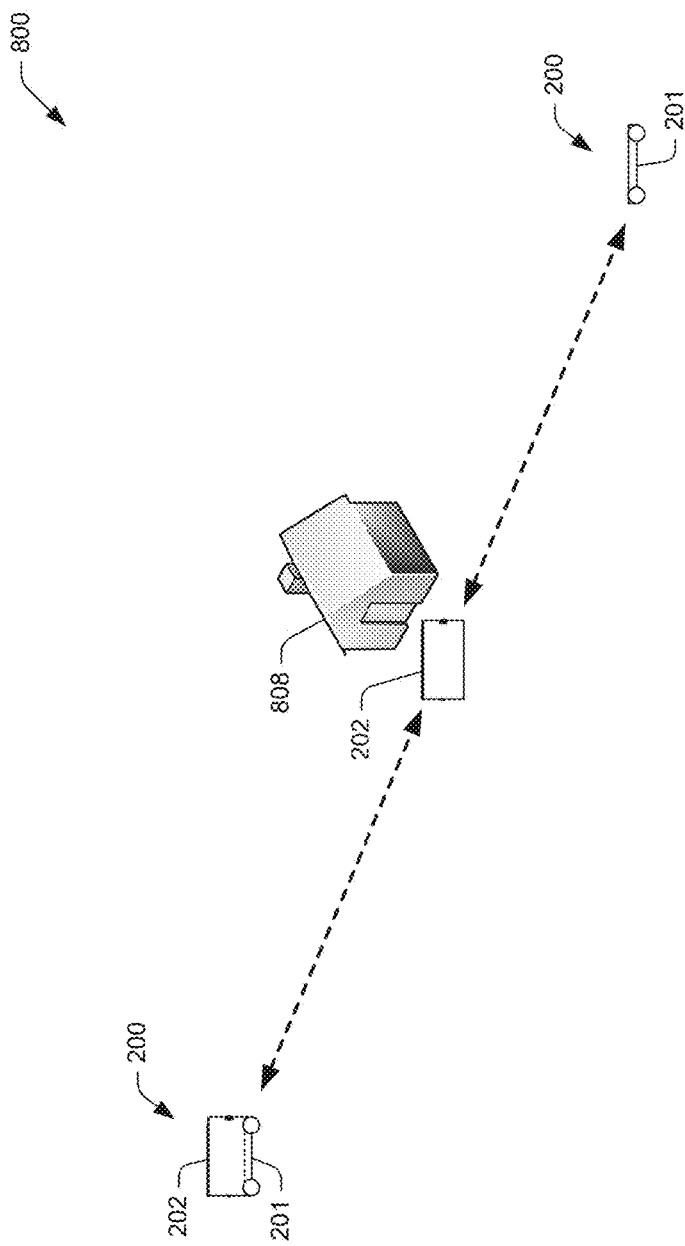

US 10,241,516 B1

AUTONOMOUS GROUND VEHICLES DEPLOYED FROM FACILITIES

BACKGROUND

Many companies, including "big box" retail and mail-order companies, package items (e.g., books, CDs, apparel, food, etc.) and/or groups of items together to be shipped in fulfillment of requests from customers (e.g., internal or external, retail or wholesale customers). Retailers, wholesalers, and other product distributors (which may collectively be referred to as distributors) typically maintain an inventory of various items that may be ordered by customers. This inventory may be maintained and processed at a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. The delivery of physical items to a customer's specified location is traditionally accomplished using a delivery system including a human controlled truck, bicycle, cart, etc. For example, a customer may order an item for delivery to their home. The item may be picked by a human agent from a materials handling facility, packed and shipped to the customer for final delivery by a shipping carrier, such as the United States Postal Service, FedEx, or UPS. An agent of the shipping carrier will load the item onto a truck that is driven to the final delivery location and a driver, or another human companion with the driver, will retrieve the item from the truck and complete the delivery to the destination. Over time, an increasing frequency and volume of deliveries of items from e-commerce and mail-order companies has resulted in an increased need for faster and more efficient delivery methods.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 depicts a block diagram of another autonomous ground vehicle environment, according to some implementations.

Figure 1:
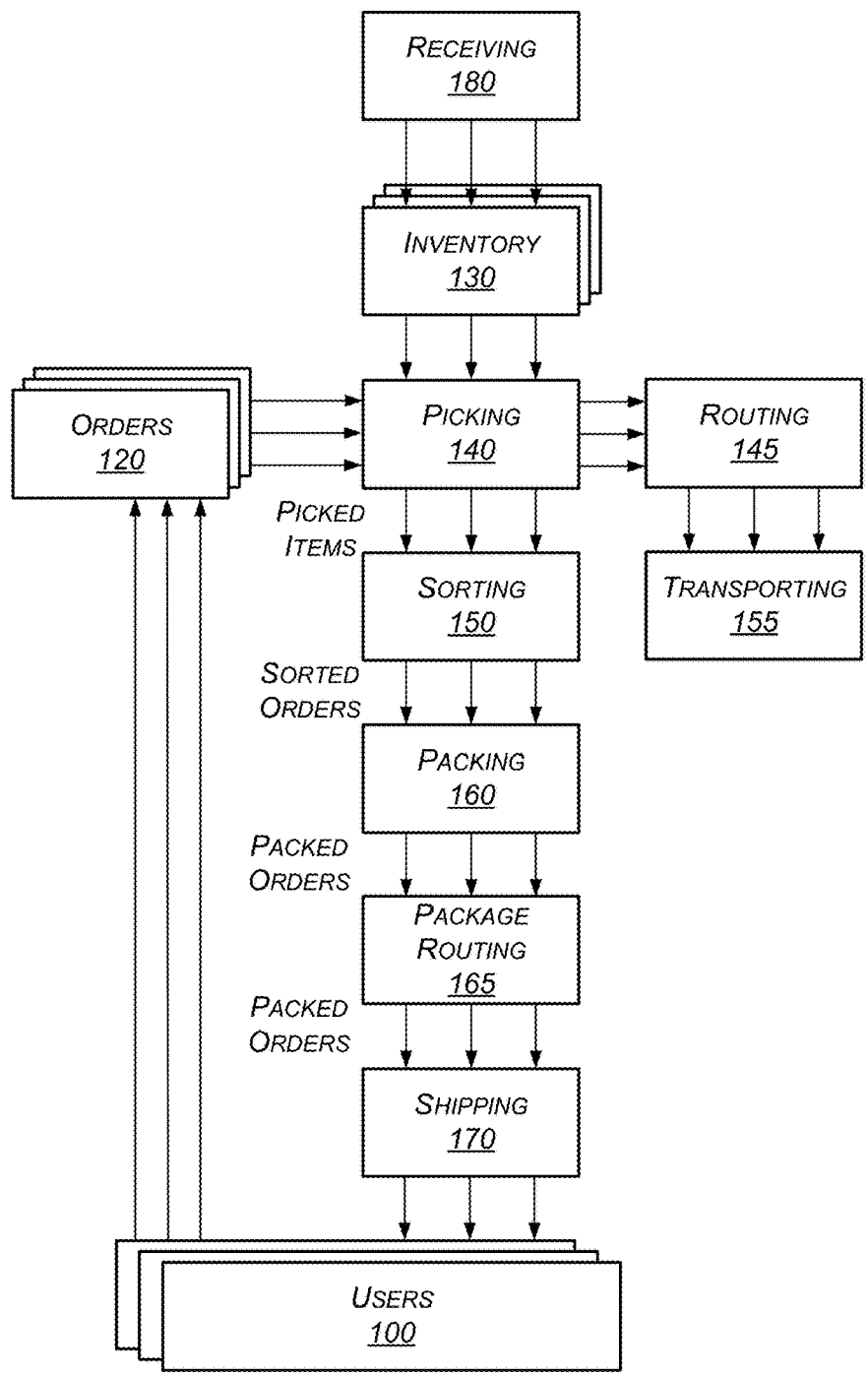
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes a system in which autonomous ground vehicles ("AGVs") are utilized to transport items to specified locations (e.g., user's residences, etc.). In various implementations, transportation vehicles (e.g., delivery trucks, etc.) may be utilized to transport the AGVs and/or items for delivery, etc. A management system may be configured to communicate (e.g., wirelessly) with the transportation vehicles and/or AGVs. In various implementations, the general activities of the transportation vehicles and/or AGVs (e.g., related to the delivery and/or receiving of items, the travel to and from the designated delivery and/or receiving areas, etc.) may be coordinated by the management system. For example, the management system may receive and/or determine schedule data for the travel of the transportation vehicles to and from the designated areas that include the locations where the AGVs will deliver and/or receive the items. In various implementations, the management system may also receive tracking data (e.g., GPS) regarding the locations of the transportation vehicles and/or AGVs and use that data for various purposes (e.g., status monitoring, answering location status requests, sending notifications regarding the current location of the transportation vehicles and/or AGVs, etc.)

In various implementations, AGVs may be transported by, and deploy from, transportation vehicles to deliver items to delivery locations. The transportation vehicles may be any type of mobile machine, such as a truck, car, watercraft, aircraft, etc., and control of the mobile machine may be manual (e.g., a driver) or automated (e.g., directly or remotely controlled by an automated system, robotic, etc.). The transportation vehicles may also transport other types of autonomous vehicles (e.g., unmanned aerial vehicles ("UAVs"), etc.), which may also deliver items and/or may provide/receive assistance to/from the AGVs. For example, an AGV may require assistance to navigate past an obstacle (e.g., a barrier, etc.), for which another autonomous vehicle (e.g., a UAV, etc.) may engage the AGV and/or item to be delivered and assist (e.g., through flying, lifting, etc.) in navigating past the obstacle to reach the delivery location. As another example, it may be undesirable for another type of autonomous vehicle (e.g., a UAV) to navigate (e.g., fly) along a final portion of a travel path to a delivery location (e.g., due to undesirable noise levels, safety issues in proximity to the delivery location, etc.) for which it may be preferred to have an AGV carry or otherwise assist the other autonomous vehicle and/or item in reaching the delivery location.

In various implementations, AGVs may be owned by individual users and/or may service a group of users in a given area (e.g., in an apartment building, neighborhood, etc.), and may be stationed at various types of locations (e.g., inside or outside of user residences, common areas, etc.) and may travel out (e.g., to a street) to meet a transportation vehicle that is carrying items. For example, a notification may be received indicating that a transportation vehicle is expected to arrive at a designated meeting area (e.g., on a street) at a particular time. As another example, various types of sensors (e.g., image sensors, sound sensors, etc.) may be utilized to determine when a transportation vehicle is approaching an area. In response to an approaching transportation vehicle, one or more AGVs may travel out to the meeting area to receive items from the transportation vehicle. In one configuration, a starting travel time may be established for an AGV to begin travel toward the meeting area so that the AGV may arrive ahead of the transportation vehicle. The determination of the starting travel time may be based at least in part on an estimated time of when the transportation vehicle is expected to arrive at the meeting area.

In various implementations, AGVs may be deployed from various types of facilities (e.g., materials handling facilities, etc.) to deliver items to specified locations (e.g., user residences). In some instances, the distance between the materials handling facility and the delivery location may be relatively long (e.g., 10 miles, 30 miles, 60 miles, or more), for which an AGV may utilize various techniques for long-range travel. For example, various energy conservation and/or recharging techniques (e.g., solar charging, propellers for generating electricity from wind power, regenerating electricity from wheel motors when travelling downhill, avoiding travel paths with large hills, etc.) may be utilized. AGVs with such long range capabilities may also be utilized to travel from one materials handling facility to another. In various implementations, strategically placed charging stations may also be utilized to increase the travel range of AGVs.

In various implementations, an AGV facility (e.g., which may be a type of materials handling facility) may be sized so that it may be more easily located in compressed urban areas (e.g., to be closer to various delivery locations, etc.). In one implementation, an AGV facility may be the size of, or smaller than, a 9' by 18' parking space, such that it may be temporarily located in a delivery area where parking locations (e.g., within parking spaces) are available. In various implementations, an AGV facility may be a home base location for one or more AGVs and/or may be configured to interact with and provide items to AGVs. For example, an AGV facility may include an item engagement mechanism (e.g., a mechanical arm) that is capable of placing items in, and removing items from, a storage compartment of an AGV. As another example, an AGV access door may be provided that is specifically sized to match the outer dimensions of an AGV, and which can only be accessed through use of a code/signal that the AGV is configured to provide/transmit.

In various implementations, AGVs may have various capabilities for navigating to and from facilities, delivery locations, transportation vehicles, etc. For example, an AGV may include various sensors and devices (e.g., imaging sensors, proximity sensors, GPS capabilities, etc.) to assist with navigation. In various implementations, an AGV may also include one or more access mechanisms to assist with opening access barriers (e.g., doors, gates, etc.) that the AGV may encounter on a travel path (e.g., on the way to a meeting area, delivery location, etc.). For example, an access mechanism may include a transmitter device that transmits a garage door opener signal to allow the AGV to open and close a garage door for exiting and/or entering a garage. As another example, a specialized door (e.g., sized to fit the AGV) may include a locking and/or opening mechanism that is triggered by an access mechanism of the AGV. In accordance with such access techniques and other capabilities of AGVs, it will be appreciated that an item may be received and delivered by an AGV without requiring a user to be home. In addition, an AGV may receive and deliver an item when a user is busy or otherwise unavailable (e.g., when a user is on a phone call, sleeping, etc.). Items may also be received and delivered by AGVs at times that may be more conducive for deliveries (e.g., between 2:00 a.m. and 6:00 a.m. when streets, sidewalks, parking locations, and/or other travel pathways and stopping locations may be less crowded, etc.).

In various implementations, AGVs containing ordered items may travel (e.g., from materials handling facilities, etc.) to pickup areas (e.g., on a street, in a parking lot, inside a store, etc.) where users may retrieve the ordered items from the AGVs. Users may be informed of the locations of the AGVs through electronic notifications, etc. In various implementations, different numbers and/or configurations of AGVs may be at locations in a pickup area. For example, an AGV in a pickup area may include multiple storage compartments that contain items for multiple users, wherein each storage compartment is associated with an access code for a user. As another example, multiple AGVs may congregate in a pickup area, wherein each AGV may contain an ordered item for a different user. In various implementations, the pickup areas may include various facilities/services for the AGVs. For example, one or more charging stations may be included in a pickup area that enable the AGVs to recharge while they are waiting in the pickup area for users to arrive. As another example, a control station may be included in a pickup area that communicates with AGVs in the pickup area (e.g., using wired or wireless connections) and provides a central user interface that may be utilized by users to gain access to the storage compartments of the AGVs, etc.

In various implementations, when a group of AGVs is congregating in an area (e.g., a pickup area, a meeting area for meeting a transportation vehicle, etc.), the positions of the AGVs may be coordinated so that the AGVs are in a designated order in the area. For example, when an AGV arrives or is otherwise in an area, if another AGV is determined to be present (e.g., utilizing various sensors of the AGVs and/or as indicated by a management system, etc.), one or both of the AGVs may be instructed to move relative to the other according to a designated order. In various implementations, the designated order may be determined according to various organizational methods. For example, if the AGVs are in a pickup area, the AGVs may be arranged in a configuration that is relatively compact but which provides easy access for the users to retrieve items from the AGVs and/or for which AGVs that are expected to leave sooner may be placed closer to the ends of the configuration, etc. As another example, if the AGVs are waiting to meet a transportation vehicle, the AGVs may be arranged to be lined up in an order according to the delivery addresses where the AGVs will be delivering items. As another example, the AGVs may be arranged in an order according to an arranged order of items that are stored in a transportation vehicle. It will be appreciated that such arrangements of AGVs in a meeting area may simplify a transfer of items from a transportation vehicle to the AGVs. In various implementations, the AGVs may also include markings or other identifying symbols or devices (e.g., flashing lights, sounds, etc.) for simplifying the identification and transfer of corresponding items from the transportation vehicle and/or to assist users or agents in locating AGVs that contain or are to receive ordered items, etc.

In various implementations, stopping locations (e.g., places where transportation vehicles may park or otherwise stop to deploy or meet AGVs, places where AGVs may stop/congregate to meet transportation vehicles, etc.) may be planned and/or determined in various ways. For example, if a previously planned stopping location is not available, or if a stopping location has not yet been planned, a transportation vehicle and/or AGVs may search for stopping locations. As another example, a management system may assist with a search for stopping locations. Once one or more available stopping locations have been found, an evaluation process may be performed to determine if the stopping locations meet certain criteria. For example, if a transportation vehicle will be stopping (e.g., parking) at a stopping location from which AGVs will be deployed, the stopping location may require sufficient room for the transportation vehicle to park and to be in an orientation from which the AGVs can be safely deployed (e.g., out of a back or side of the transportation vehicle, etc.), and may require enough room adjacent to the stopping location for the AGVs as they are deployed or wait (e.g., on a sidewalk that is not currently crowded, etc.). Similarly, if AGVs will be meeting (e.g., and waiting for) the transportation vehicle, the AGVs may require stopping locations (e.g., on a sidewalk, etc.) that will be proximate to the transportation vehicle, and where the AGVs can safely wait for and/or interact with the transportation vehicle once it arrives. As another example, if a user is to meet an AGV at a stopping location (e.g., in a pickup area where a user is informed of the location of the AGV and meets the AGV for acquiring an ordered item), the stopping location may need to be at a location where the AGV can safely wait for the user (e.g., to the side of a sidewalk, or otherwise in a space that is not in the way of other activities or pathways of travel for other entities), and where the user can easily find and interact with the AGV, etc.

In various implementations, the AGVs may be modular in that a storage compartment portion (e.g., which may hold an ordered item) may be removable (i.e., separable) from a propulsion portion. In various implementations, the storage compartment portion may be securely attached to the propulsion portion during transport (e.g., requiring an access code to remove and/or open), and the storage compartment portion may similarly be securely attached to the delivery location (e.g., at a docking station) when delivered. For example, coupling portions (e.g., for mechanical and/or electronic coupling) may be utilized for coupling the storage compartment portion to the propulsion portion and/or a docking station. In some configurations, storage compartment portions may also include coupling portions for mechanically and/or electronically coupling to one another. In various implementations, the storage compartment portion may be refrigerated, heated, etc., and may include various sensors on the inside and outside of the storage compartment portion (e.g., temperature sensors, motion sensors, image sensors to determine the presence and condition of items and/or to assist with navigation and other operations of the propulsion portion, etc.).

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a user's residence, a place of business, any location where a user or inventory is located, etc. Inventory or items may be any physical goods that can be transported using an AGV.

A block diagram of a materials handling facility which, in one implementation, may be an order fulfillment facility configured to utilize various systems and methods described herein (e.g., with regard to utilization of transportation vehicles and AGVs for delivering items, etc.), is illustrated in FIG. 1. In this example, multiple users 100 may submit orders 120, where each order 120 specifies one or more items from inventory 130 to be shipped or otherwise delivered (e.g., by a transportation vehicle and/or AGV) to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a transportation vehicle and/or AGV has been designated for a delivery, the item(s) of one or more shipment sets may be picked at the picking operation 140 directly into storage areas (e.g., bins) of the transportation vehicle and/or storage compartments of AGVs and/or other autonomous vehicles (e.g., which may be carried by the transportation vehicle or may travel independently, etc.). In various implementations, the item(s) in a particular storage area of the transportation vehicle may be designated for further transport by a particular AGV, as will be described in more detail below with respect to FIGS. 3-4. More specifically, once the transportation vehicle reaches a designated location, the item(s) in a particular storage area may be further transported by an AGV to a location (e.g., a delivery location at a user's residence, a stopping location in a pickup area, etc.). In some implementations, the storage areas of the transportation vehicle may be permanently affixed within the transportation vehicle. In other implementations, the transportation vehicle may include removable components that may be filled with items and/or AGVs in the materials handling facility and then placed in the transportation vehicle. For example, a storage area of a transportation vehicle may include a bay of bins, which may remain in the transportation vehicle or may be removed and filled with items and/or AGVs inside a materials handling facility, after which the bay of bins may be moved back into the transportation vehicle for transport. Regardless of whether the storage areas of the transportation vehicle are fixed or removable, it will be appreciated that by picking items directly into the storage areas of the transportation vehicle and/or storage compartments of the AGVs, the items may not need to be packed in shipping packages. In addition, the packing slip typically included in a shipping package may be applied to the item (e.g., stickered to the item), printed out at the transportation vehicle and/or AGV upon retrieval of the item, or otherwise made available to a user.

In various implementations, the storage areas of the transportation vehicles and/or storage compartments of the AGVs may each include a unique identifier, such as a bar code, QR code, unique number, etc., to enable tracking, identification, and/or association of items placed in each of the storage areas and/or storage compartments. For example, during a picking operation, an agent or automated system (e.g., robotic) within the materials handling facility may scan the bar code of the storage area or storage compartment and/or scan a bar code or identifier of the picked item as the item is picked and/or placed into the storage area or storage compartment. Scanning of the storage area or storage compartment and/or the picked item may be utilized to associate and track the item with the storage area and the transportation vehicle or the storage compartment and the AGV. As storage areas of transportation vehicles and/or storage compartments of AGVs are filled, a routing operation 145 may route the filled storage areas, transportation vehicles, storage compartments, and/or AGVs to an appropriate transporting operation 155 from which the transportation vehicle and/or AGV may travel to a designated location, as will be described in more detail below with respect to FIGS. 3-8.

In other examples, a transportation vehicle (e.g., a truck) and/or an AGV may be made to hold or otherwise transport one or more delivery containers, in which case the item(s) of one or more shipment sets may be picked at the picking operation 140 directly into delivery containers. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers. The delivery container may also include a unique identifier, such as a bar code, QR code, unique number, etc., to enable tracking and identification of the delivery container and association of items placed into the delivery container. For example, during a picking operation, an agent within the materials handling facility may scan the bar code of the delivery container and scan a bar code or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the transportation vehicle and/or AGV when the item is transferred or delivered, or otherwise made available to a user.

Regardless of the type of delivery container utilized, in some implementations, some types of items can be transported in the delivery container without needing to be packed in a shipping package inside the delivery container. In other instances, items that are either pre-packaged, fragile, or need additional protection prior to transport may be picked and packed in a shipping package. In another implementation, items may be put into bags prior to placement in the delivery container and/or storage areas to provide confidentiality of the ordered items. In addition, items from multiple shipment sets to be transported by the same transportation vehicle and/or AGV may be picked into the same delivery container for transport. As delivery containers are filled, a routing operation 145 may route the filled delivery containers to the appropriate transporting operation 155 for placement in a designated transportation vehicle and/or AGV. The routing operation 145 may be manual or automated. The routing operation 145 may receive an indication of the transportation vehicle and/or AGV to which each item should be routed from a shipment planning system and route delivery containers to an appropriate transporting operation 155, from which they may be placed in a designated transportation vehicle and/or AGV.

In other examples, some picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. In various implementations, transportation vehicles and/or AGVs may be utilized for the shipping and may be considered as an alternative to shipping by traditional carriers. The package routing operation 165 may, depending on the specific implementation, be either automated or manual. The package routing operation 165 may receive an indication of the destination to which each packed shipment set should be routed from a central control system. In some instances, the destination may be the final destination identified by the user, or a destination at which transfer of a shipment set may occur for final delivery to the user, or a location from which one or more AGVs may complete the final delivery. The package routing operation 165 may also determine a routing destination for each packed shipment set dependent on the size of a shipping package in which the shipment set is contained and/or based on whether the shipment set will be delivered by a traditional carrier, a transportation vehicle, and/or an AGV.

The arrangement and order of operations illustrated by FIG. 1 is merely one example of many possible implementations of the operation of a materials handling facility, such as an order fulfillment facility, that enables filling of transportation vehicles and/or AGVs with items and subsequent transportation of the items (FIGS. 3-8) and/or other fulfillment of user orders. Other types of materials handling, manufacturing, or order fulfillment facilities may include different, fewer, or additional operations and resources, according to different implementations.

Figure 2A:
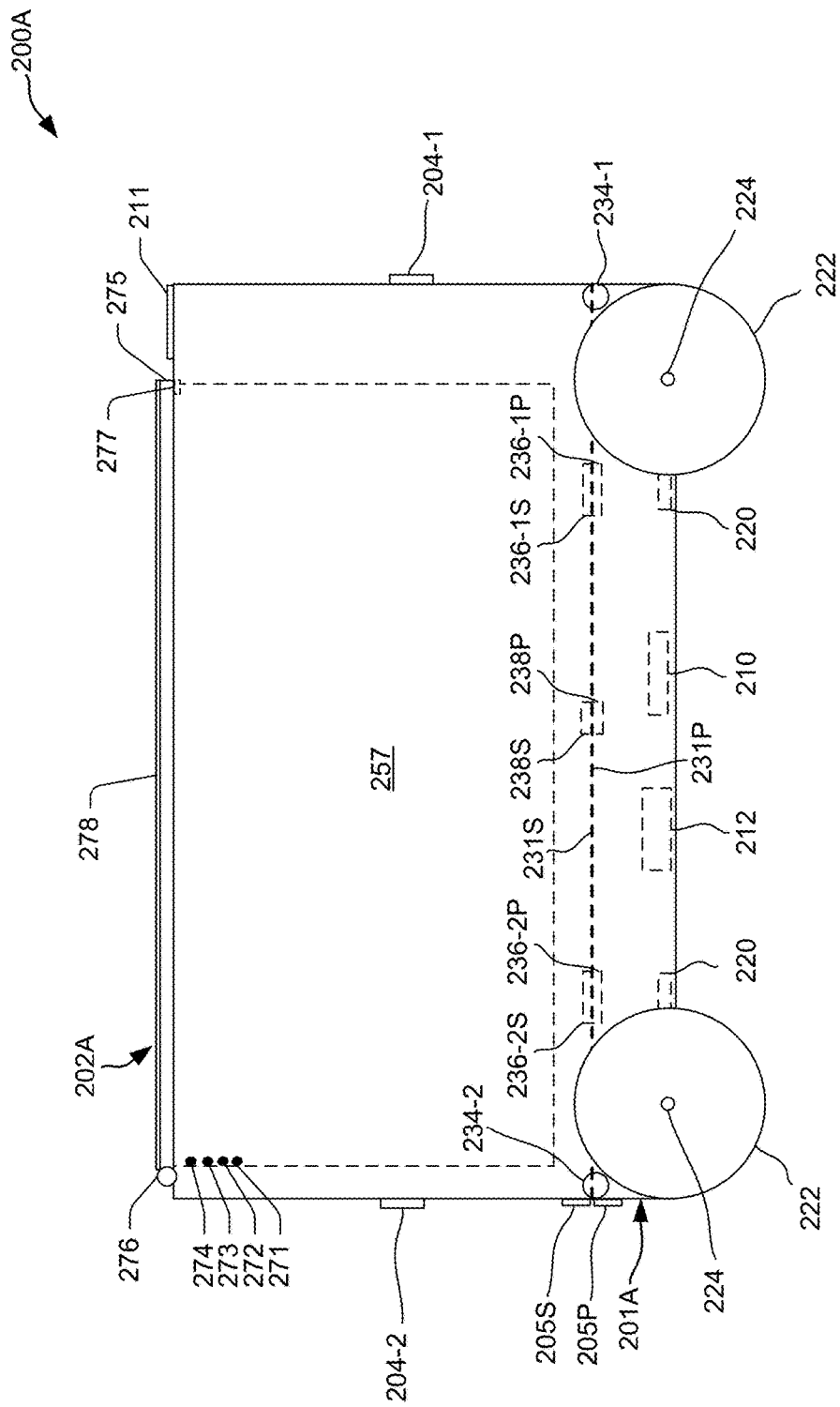
FIG. 2A depicts a block diagram of a side view of an autonomous ground vehicle, according to an implementation.

FIG. 2A depicts a block diagram of a side view of an AGV 200A, according to an implementation. In the example of FIG. 2A, the AGV 200A includes a storage compartment portion 202A and a propulsion portion 201A. The propulsion portion 201A includes four wheels 222 which are mounted on axles 224 that may be rotated by one or more motors 220 of a propulsion system of the propulsion portion 201A. In other implementations, additional or fewer motors 220 and/ or wheels 222 may be included in the propulsion portion 201A. The size of the AGV 200A may vary and, for purposes of illustration with respect to the example of FIG. 2A, the storage compartment portion 202A may include a storage compartment 257 which may hold items that are transported by the AGV 200A. In various implementations, the storage compartment 257 may be divided into smaller storage compartments (e.g., storage compartments 257A and 257B, as will be described in more detail below with respect to FIG. 2B).

In various implementations, varying numbers and/or sizes of storage compartments, and/or additional features may be included depending on the specific implementation. The shape of the AGV 200A may also vary, depending on the implementation. For example, the AGV 200A may be sized and shaped to be drivable on a standard sidewalk or road, and to fit within a doorway or other access point (e.g., of a user's residence, etc.). The storage compartment 257 may be sized according to various factors (e.g., to match the size of a standard bin of a materials handling facility, wherein similar sized bins may also be used on the transportation vehicles that bring the items to the AGVs, as well as in the materials handling facilities that the items are transported from, etc.). In various implementations, the utilization of standard sized and configured bins (e.g., with a scanning code in a standard location, etc.) may simplify the transfers and processing of items. For example, ordered items that are placed in a standard sized bin at a materials handling facility may be easily transported by a transportation vehicle and/or AGV that is configured for transporting and processing the standard sized bin, resulting in greater efficiencies throughout the overall transportation process. In various implementations, weatherproofing techniques may be utilized to protect the functionality of the AGV 200A and any operational components (e.g., storage compartments, control panels, etc.) when the AGV 200A is subjected to weather conditions during travel and/or other operations. The AGV 200A further includes an AGV control system 210, which as discussed in further detail below with respect to FIG. 16, may control the operation, routing, navigation, communication, object sense and avoid, item engagement mechanism, etc. of the AGV 200A.

As shown in FIG. 2A, various sensors 204 may be mounted to the AGV 200A. For example, sensors 204-1 and 204-2 may be mounted on the front and back of the AGV 200A, respectively. The sensors 204 may be of various types. In general, certain sensors 204 may be utilized to assist with the navigation, object sense and avoid, etc. of the AGV 200A. For example, the sensors 204-1 and/or 204-2 may include imaging sensors and/or distance detection sensors for measuring and monitoring the distance between the AGV 200A and other objects (e.g., an obstacle, a roadway, another AGV, etc.). While the example illustrated in FIG. 2A includes two sensors 204 mounted to the AGV 200A, in other implementations, fewer or additional sensors may be utilized. In one implementation, each of the sensors 204-1 and 204-2 may be representative of an array of sensors that are utilized to assist with the various functions of the AGV 200A.

The AGV 200A also includes one or more power modules 212. In this example, the AGV 200A includes a power module 212 that is removably mounted at the bottom of the AGV 200A in the propulsion portion 201A. The power module 212 for the AGV 200A may be in the form of battery power, solar power, gas power, super capacitor, fuel cell, alternative power generation source, or a combination thereof. The power module 212 is coupled to and provides power for the AGV control system 210 and the motor(s) 220 of the propulsion portion, as well as any other attached input/output devices, etc. The power module 212 stores energy with a corresponding energy level. In various implementations, the stored energy level of the power module 212 may be recharged through various techniques. For example, as will be described in more detail below, when an AGV is at a home base location or other location, the AGV 200A may engage with a charging station that will recharge the power module. As another example, an AGV may also or alternatively utilize other techniques for recharging (e.g., utilizing sunlight to recharge through solar panels, etc.). In addition, in some implementations, a power module may be configured such that it can be autonomously removed and/or replaced with another power module while the AGV 200A is at a home base location or other location.

In various implementations, the AGV 200A may also include an item engagement mechanism (not shown). For example, the item engagement mechanism may include a robotic arm or other mechanism that may be utilized to engage an item for placement in a storage compartment 257 of the AGV 200A, or for removing an item from a storage compartment 257 when the item is being delivered to a delivery location. The item engagement mechanism may communicate with (via wired or wireless communication) and be controlled by the AGV control system 210. In various implementations, such item engagement mechanisms may also or alternatively be included in a transportation vehicle, home base location, meeting area, user's residence, etc. for placing items in and/or removing items from a storage compartment 257 of the AGV 200A.

Figure 3:
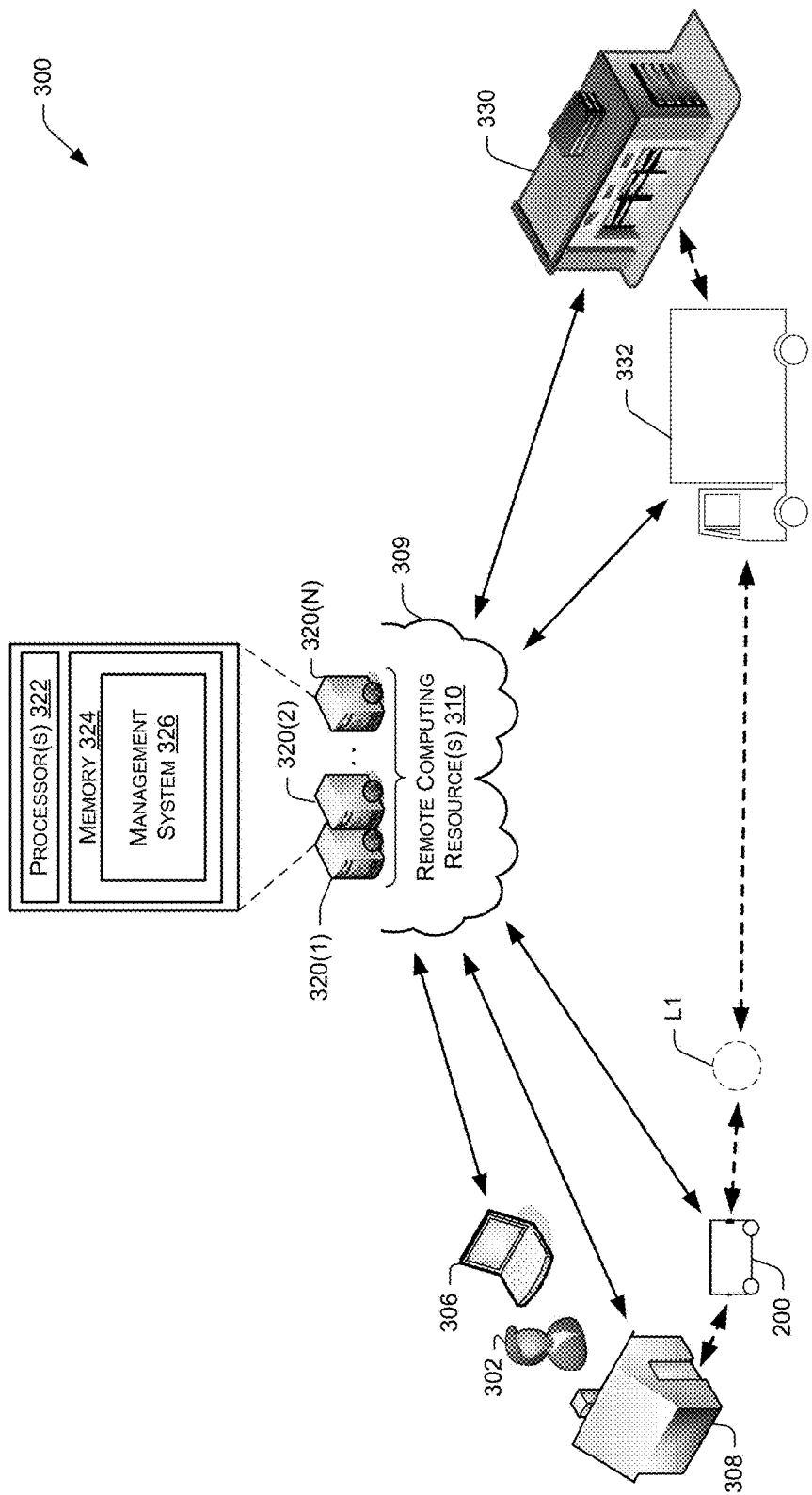
FIG. 3 depicts a block diagram of an autonomous ground vehicle environment, according to some implementations.

The AGV control system 210 maintains information as to whether a storage compartment of the AGV 200A is empty or includes items, the access code(s) or other identifier(s) necessary to open the storage compartment and any other information necessary to maintain the AGV. The AGV control system 210 may also lock/unlock storage compartments, activate sensors, and the like. The AGV 200A may be configured to obtain information from a remote computing resource or may be configured to operate primarily as a stand-alone unit, with limited external communication to receive/provide order/delivery/transfer information. FIG. 3, described below, illustrates an example of an environment in which a management system 326 is provided for remotely communicating with an AGV 200A as part of a system for transporting items. The AGV control system 210 may include a component configured to provide wired and/or wireless network connectivity (e.g., with computing resources in a user device, remote computing resources, etc.). Wireless connectivity may be implemented using a wireless antenna (not shown), which may provide both receive and transmit functionality.

The AGV 200A may also include a user interface 211. The user interface 211 is configured to receive and provide information to a user of the AGV 200A and may include, but is not limited to, a display, such as a touch-screen display, a scanner, a keypad, a biometric scanner, an audio transducer, one or more speakers, one or more image capture sensors, such as a video camera, and any other types of input or output devices that may support interaction between the AGV 200A and a user. In various implementations, the user interface 211 may alternatively include more limited features. For example, in one implementation the user interface 211 may only include a relatively small display and/or a keypad for providing input. In certain other implementations, these and other features may also be eliminated, wherein control of the AGV 200A may primarily be provided remotely. For example, in order to access a storage compartment, a user may send or reply to a text message to or from a centralized remotely located control system (e.g., a management system), which controls the AGV 200A to open the storage compartment door so that the user can retrieve an ordered item. In various implementations, the AGV 200A may have capabilities for directly receiving such signals from a user device or other device (e.g., a device inside a user's residence) that provides a signal to open the storage compartment door.

In the example of FIG. 2A, the storage compartment 257 of the storage compartment portion 202A of the AGV 200A includes bottom and side surfaces and a door 275 configured to form a cavity in which items may be stored. In addition, the storage compartment 257 may include various security or other components. For example, the storage compartment 257 may include a locking mechanism 277, which may be controlled directly or remotely by the AGV control system 210. The storage compartment 257 may also include a presence detection sensor 271, a motion sensor 272, an image capture sensor 273, a temperature sensor 274 and/or other sensors.

In various implementations, the locking mechanism 277 may be controlled by the AGV control system 210, either through wired or wireless communication, to effect locking and unlocking of a door 275 of a storage compartment 257. For example, when a user, carrier, etc. interacts with the user interface 211 (e.g., via the display, or with a user device, etc.) and provides an access code or other identifier, the AGV control system 210 may unlock the storage compartment 257. In a configuration in which the locking mechanism 277 includes a pin holding the door closed, the AGV control system 210 may activate the locking mechanism 277 such that the pin retracts, thereby disengaging the lock of the storage compartment 257 allowing the door 275 as mounted on a hinge 276 to open. In some implementations, the storage compartment 257 may also include a spring mechanism (not shown) such that when the locking mechanism 277 is disengaged, the spring mechanism propels the door 275 outward, thereby identifying to a user, carrier, etc. that the door 275 is unlocked and the storage compartment 257 is accessible.

In addition to the use of retractable pins, any mechanical, magnetic, electrical or other form of locking mechanism may be utilized with the various implementations described herein. In addition, the storage compartment 257 may also include magnets to help close a door. Moreover, while the above example describes the AGV control system 210 controlling the locking mechanism, in other implementations, the storage compartment may also or alternatively be controlled and/or communicated with directly by a command component and/or remote computing resources, etc.

The presence detection sensor 271 may be used to detect the presence or absence of objects in the storage compartment 257, and the motion sensor 272 may be used to detect movement in the storage compartment 257. For example, the presence detection sensor 271 may be utilized when an agent, carrier, user, or automated system (e.g., robotic) is placing items, delivery containers and/or transfer containers in the storage compartment 257 to confirm that the item is indeed in the storage compartment 257 before the door 275 is closed and locked by the locking mechanism 277. Additionally, the presence detection sensor 271 and/or motion sensor 272 may also be used when a user is retrieving an item stored in the storage compartment 257 or when a carrier is adding or removing an item, delivery container and/or transfer container from the storage compartment 257. For example, when a user interacts with the user interface 211 or an access code is otherwise provided such that a storage compartment 257 is opened, the presence detection sensor 271 and/or motion sensor 272 may be used to confirm that a user has reached into the storage compartment 257 and removed its contents (or added items in the case of returns). In some implementations, there may be multiple presence detection sensors 271 and/or motion sensors 272 distributed throughout the inside of a storage compartment to ensure objects/motion is detected.

The storage compartment 257 may also include an image capture sensor 273, such as a camera, and optionally an illumination component (not shown), such as a light emitting diode (LED), that may be used to illuminate the inside of the storage compartment 257. The image capture sensor 273 may also be used to capture images or and/or detect the presence or absence of items within the storage compartment 257. For example, the image capture sensor 273 may be used to capture images to identify the type of object located within the storage compartment 257 and/or to identify or record video/images of access within the storage compartment 257. In various implementations, the sensor 273 and/or a separate item identification sensor may include a bar code scanner or other technology that is utilized to determine an identification of an item that is being placed, or has been placed, in the storage compartment 257. For example, a sensor including a bar code scanner or other identification technology may be located with or as part of the other sensors 271-274, on the door 275, as part of the user interface 211, or otherwise positioned so as to scan or otherwise identify an item as it is being placed or is otherwise within the storage compartment 257. Such identification and/or images, video etc. may be recorded by the system and/or transmitted (e.g., to a management system as will be described in more detail below with respect to FIG. 3) and/or may be provided to a user to identify what items have been placed in a storage compartment for delivery. For example, a user may wish to receive a message and/or image indicating what items are being delivered.

Some storage compartments 257 may be refrigerated storage compartments. In various implementations, such refrigerated storage compartments may include their own cooling mechanisms and/or the AGV 200A may have a centralized cooling system. The temperature of previously non-refrigerated storage compartments may be adjusted to become refrigerated storage compartments, and vice versa. In an implementation with multiple refrigerated storage compartments, the temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be stored in refrigerated storage compartments.

In various implementations, the temperatures in the refrigerated storage compartments may be adjusted when items are to be placed into the refrigerated storage compartments, or may be adjusted in advance. For example, when a refrigerated item is scheduled to be placed into a refrigerated storage compartment of an AGV, the temperature of the refrigerated storage compartment may be adjusted to a temperature that is specified for the refrigerated item in advance so that the refrigerated storage compartment will already be at the specified temperature when the item is placed into the refrigerated storage compartment. In one implementation, the image capture sensor 273 may be used to capture an image of an item when it is placed into a storage compartment in order to try to determine an appropriate storage temperature for the item. For example, an item may have information on a label which identifies a storage temperature, such as "contents to be stored at 32 degrees F. or lower."

The temperatures in some or all of the refrigerated storage compartments may be controlled by the AGV control system 210. Continuous monitoring and regulating of the temperatures of the refrigerated storage compartments in which such items are kept may be important for verifying the condition of the items. Temperature sensors, such as the temperature sensor 274 of the storage compartment 257, may be utilized for sensing the temperature for monitoring and regulating the temperature inside the refrigerated storage compartment. The refrigerated storage compartment and/or the entire AGV 200A may be insulated to prevent the dissipation of the cooled air from the refrigerated storage compartment.

In various implementations, a refrigerated storage compartment may be an insulated storage compartment which is cooled by passive cooling elements that are placed within the storage compartment. For example, rather than utilizing an active cooling system which may have components such as compressors and coils, the storage compartment may be cooled by passive cooling elements such as cold packs, frozen water bottles, etc. In one implementation, the passive cooling elements may be added to the storage compartment when the item is first placed into the storage compartment, such as at a meeting area. In another implementation, the passive cooling elements may be included in a shipping container with an item at a materials handling facility when it is shipped to be delivered by an AGV. In an alternative implementation, the passive cooling elements may be added to the insulated storage compartment with the item when it arrives or is otherwise placed in the storage compartment.

In various implementations, the number of passive cooling elements to be included with an item may be calculated based on a number of factors. For example, one factor may be an estimated maximum period of time that the item may remain in the storage compartment before it is retrieved by a user. Another factor may be the expected ambient temperature around the AGV and/or during transport. Other factors may include the size of the storage compartment, the size and number of items to be included in the storage compartment, etc. Various government regulations may also specify temperatures at which certain items are to be maintained. For example, various federal, state and/or municipal regulations may dictate requirements for storage temperatures for items as well as maximum periods of time that items may be stored at a given temperature. All of these factors may be included in a calculation of how many passive cooling elements should be included in an insulated storage compartment with an item, as well as a determination of a maximum period of time that the item may remain in the storage compartment.

In various implementations, the AGV 200A may also include a locator device (not shown) that is configured to assist with finding the AGV (e.g., when a transportation vehicle is searching for an AGV which is to receive an item, when a user is wanting an update on the location of an AGV that is delivering an item, etc.). For example, the locator device may wirelessly transmit an electronic signal that enables the position of the AGV to be tracked and/or otherwise determined (e.g., as indicated on a screen of a mobile electronic device, etc.). As another example, the locator device may emit various sounds, activate lights, etc. (e.g., to assist a carrier who is delivering items to multiple AGVs to determine which AGV is the correct AGV for a current item). In various implementations, the locator device may be controlled by the AGV control system 210 and/or a management system (FIG. 3), etc. In various implementations, the AGV 200A may also include an RFID tag, a printed circuit board, or any other object or mechanism that may be detectable and used to identify the AGV 200A for security or other purposes (e.g., by a transportation vehicle, at an access point into a user's residence, etc.).

In various implementations, the AGV 200A may be modular in that the storage compartment portion 202A may be removable (i.e., separated) from the propulsion portion 201A. For example, when the storage compartment portion 202A is coupled to the propulsion portion 201A, a lower surface 231S of the storage compartment portion 202A may be in contact with an upper surface 231P of the propulsion portion 201A. Various coupling portions 236 and 238 may be included for coupling the storage compartment portion 202A to the propulsion portion 201A. For example, the storage compartment portion 202A may include coupling portions 236-1S, 236-2S and 238-S, which may couple to corresponding coupling portions 236-1P, 236-2P and 238-P, respectively, of the propulsion portion 201A. In various implementations, each of the coupling portions 236 and 238 may be utilized for electronic coupling and/or mechanical coupling (e.g., latching, locking, etc.).

In various implementations, the coupling portion 238S and/or 238P may include electronic coupling portions for electronically coupling the storage compartment portion 202A to the propulsion portion 201A. For example, either of the coupling portions 238S or 238P may consist of wired male/female electronic coupling portions (e.g., which may couple together), and/or one or both of the coupling portions 238S or 238P may include a wireless coupling portion that transmits signals for wirelessly coupling the storage compartment portion 202A to the propulsion portion 201A and/or to other systems (e.g., the management system 326 of FIG. 3). In various implementations, the electronic components of the storage compartment portion 202A (e.g., electronic components 204, 211, 271-274, 277, etc.) may be coupled to the control system 210 and power supply 212 of the propulsion portion 201A through the coupling portions 238S and/or 238P which thereby enable electronic communication between the electronic components of the storage compartment portion 202A and the control system 210. In various implementations, the coupling portion 238S may also include a control system, power module and/or other electronic components of the storage compartment portion 202A (e.g., which may perform similar functions as the control system 210 and power module 212 of the propulsion portion 201A). In such a configuration, certain electronic functions of the storage compartment portion 202A and/or the individual electronic components 204, 211, 271-274 may continue to operate after the storage compartment portion 202A and the propulsion portion 201A are separated. For example, the user interface 211 may continue to operate (e.g., to enable interaction with a user, to allow an access code to be entered for unlocking the locking mechanism 277 to enable the storage compartment 257 to be opened, etc.).

In various implementations, the coupling portions 236-1S, 236-2S, 236-1P and/or 236-2P may include mechanical coupling elements (e.g., latches, magnetic, locks, etc.) for physically connecting/attaching the storage compartment portion 202A to the propulsion portion 201A. For example, the coupling portions 236-1S, 236-2S, 236-1P and/or 236-2P may include locking mechanisms for locking the storage compartment portion 202A to the propulsion portion 201A. In such a configuration, an access code (e.g., as provided on the user interface 211 and/or as otherwise provided to the control systems 210 or 238S, etc.) may be required to unlock the locking mechanisms to allow the storage compartment portion 202A to be decoupled (e.g., unlocked, released, separated, etc.) from the propulsion portion 201A.

The storage compartment portion 202A may also include a coupling portion 205S and/or the propulsion portion 201A may also include a coupling portion 205P, each of which may include various electronic and/or mechanical coupling elements. In various implementations, the coupling portions 205S and/or 205P may be utilized to electronically and/or mechanically couple the storage compartment portion 202A and/or the propulsion portion 201A to other systems/components (e.g., a docking station, a charging station, other AGVs, a control station in a pickup area, etc.). For example, at a user's residence, the coupling portion 205S and/or 205P may be utilized to attach/lock/couple the storage compartment portion 202A and/or the propulsion portion 201A to a secure structure (e.g., as part of the user's residence and/or a docking station, etc.), which may also provide recharging and/or electronic communication capabilities. As another example, at a meeting and/or pickup area, the coupling portion 205S and/or 205P may be utilized to attach/lock/couple the storage compartment portion 202A and/or the propulsion portion 201A to another AGV and/or control station, etc., for security, communication, recharging, etc. In configurations where storage compartment portion 202A and propulsion portions 201A are separated, the coupling portions 205S enable different storage compartment portions to be mechanically and/or electronically coupled together, while the coupling portions 205P enable different propulsion portions to be mechanically and/or electronically coupled together (e.g., for group charging, communications, security, etc.). It will be appreciated that while the coupling portions 205S and 205P are only illustrated on one side of the AGV 200A in the example of FIG. 2A, that in various implementations multiple such coupling portion 205S and 205P on multiple sides of an AGV may be included (e.g., for coupling to other AGVs and/or control stations, etc. on opposite sides of the AGV, etc.).

The storage compartment portion 202A and/or the propulsion portion 201A may also include movement mechanisms 234-1 and/or 234-2 (e.g., automated movement mechanisms including rollers, a mechanical actuator, a robotic arm, etc.). In various implementations, the movement mechanisms 234-1 and/or 234-2 may be utilized to assist with the movement of the storage compartment portion 202A relative to the propulsion portion 201A. For example, if the storage compartment portion 202A is to be detached/removed from the propulsion portion 201A (e.g., to be delivered to a location), the movement mechanisms 234-1 and/or 234-2 may be utilized to detach and/or move (e.g., roll) the storage compartment portion 202A off of the propulsion portion 201A at the location (e.g., to be placed on a porch at a user's residence, to be coupled to a docking station at the location, etc.). Once the storage compartment portion 202A has been separated from the propulsion portion 201A, the propulsion portion 201A may navigate along a travel path away from the location where the storage compartment portion 202A has been left.

As another example, when a storage compartment portion 202A is to be coupled to a propulsion portion 201A (e.g., the propulsion portion 201A is picking up the storage compartment portion 202A from a location), the movement mechanisms 234-1 and/or 234-2 may be utilized to move (e.g., roll) the storage compartment portion 202A onto the propulsion portion 201A and/or to a proper coupling position on top of the propulsion portion 201A (e.g., where the coupling portions 236 and 238 are respectively coupled). In various implementations, certain locations may have elevated structures (e.g., as part of docking stations, etc.) that are approximately level with the top surface 231P of the propulsion portion 201A, and on which the storage compartment portion 202A may be made to rest when it is not coupled to the propulsion portion 201A. For example, a docking station may include such an elevated surface, wherein as the storage compartment portion 202A is moved (e.g., rolled, slide, etc.) off of the propulsion portion 201A, it will slide or otherwise be placed on the elevated surface (e.g., and may be positioned such that the coupling portions 205, 236 and/or 238 of the storage compartment portion 202A are made to couple to corresponding coupling portions of the docking station, etc.). In one implementation, such an elevated surface may include a pair of forked surfaces that slide into formed openings (not shown) between the storage compartment portion 202A and the propulsion portion 201A, and which enable the propulsion portion 201A to move beneath the storage compartment portion 202A while it rests on the elevated surface.

In various implementations, the AGV 200A may include a solar charging mechanism 278 (e.g., including one or more solar panels, etc.) to receive sunlight (e.g., to recharge the power module 212, provide power to the propulsion portion 201A, provide power to certain sensors, etc.). In various implementations, the orientation of the solar charging mechanism 278 may be adjustable (e.g., as controlled by one or more movement mechanisms and moved separately from the door 275, etc.) relative to the orientation of the propulsion portion 201A (e.g., so as to be adjustable toward the sunlight, etc.). In various implementations, in addition to being included above the door 275 of the AGV 200A, a solar charging mechanism may be included on and/or extendable (e.g., utilizing hinges, foldable portions, extendable arms, etc.) from one or more alternative and/or additional surfaces of the AGV 200A. For example, the solar charging mechanism 278 may be included on and/or extendable from a side or bottom surface of the storage compartment portion 202A, and/or may be included on and/or extendable from a surface of the propulsion portion 201A, etc. In various implementations, other configurations of AGVs may similarly include solar charging mechanisms (e.g., including the configurations of FIGS. 2B and 2C, as will be described in more detail below).

Figure 2B:
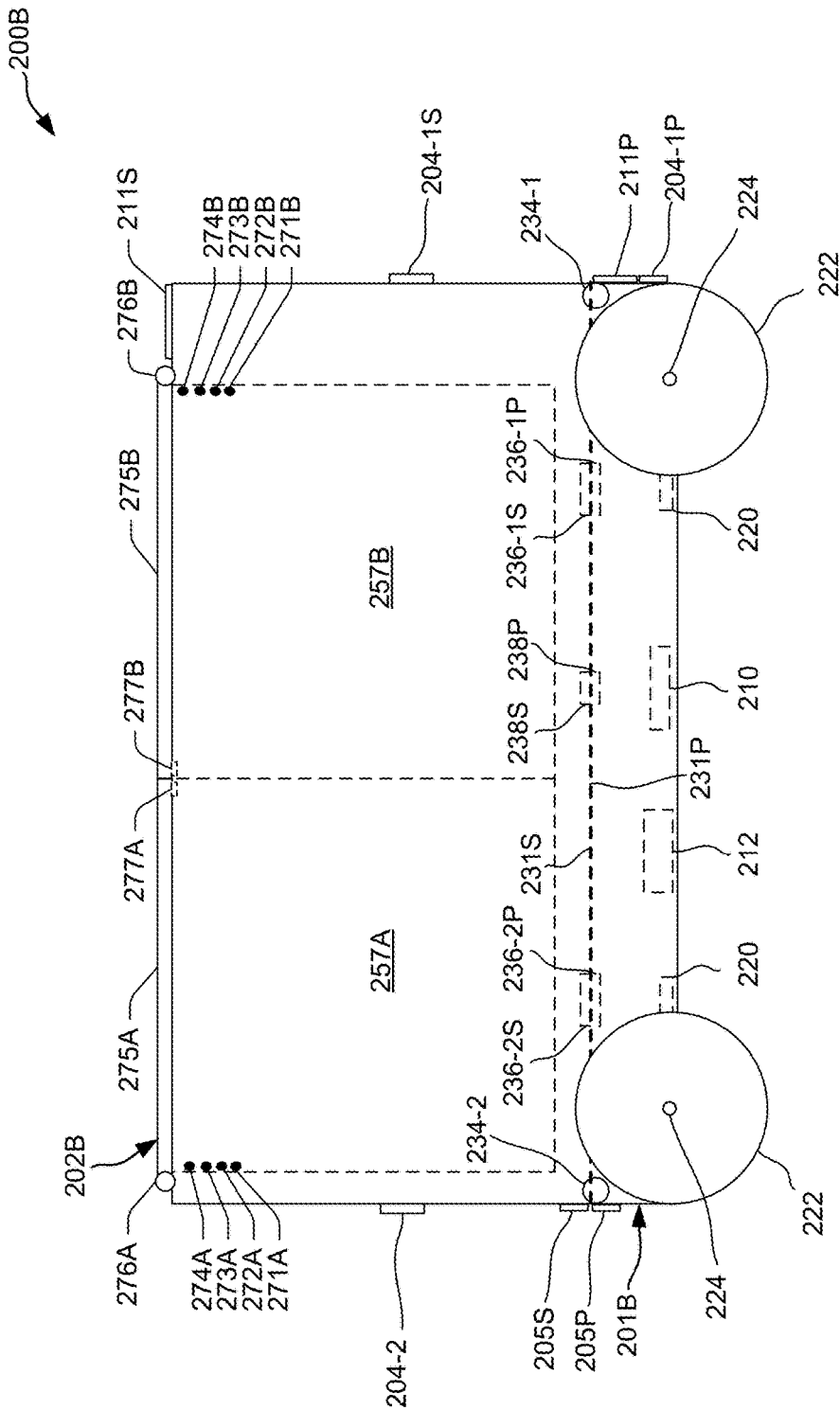
FIG. 2B depicts a block diagram of a side view of another autonomous ground vehicle, according to an implementation.

FIG. 2B depicts a block diagram of a side view of another AGV 200B, according to an implementation. The AGV 200B of FIG. 2B is similar to the AGV 200A of FIG. 2A, and includes a storage compartment portion 202B and a propulsion portion 201B. One difference of the AGV 200B is that the storage compartment 257 has been divided into storage compartments 257A and 257B. The components of the storage compartments 257A and 257B are similar to those of the storage compartment 257, and will be understood to operate similarly, except as otherwise described below. More specifically, the storage compartments 257A and 257B each include respective doors 275A and 275B on hinges 276A and 276B, as well as respective locking mechanisms 277A and 277B. The storage compartments 257A and 257B also each include respective sets of sensors 271A-274A and 271B-274B.

In various implementations, the two storage compartments 257A and 257B may allow the AGV 200B to securely transport different items for different user orders and/or to have a separate storage compartment for different environmental or other needs (e.g., one of the storage compartments may be refrigerated, etc.). For example, an AGV may receive items from a transportation vehicle that are to be delivered to two different delivery locations as separately stored in the storage compartments 257A and 257B. In such a configuration, the AGV may travel to a first delivery location to deliver the item(s) that are stored in the storage compartment 257A, and then travel to a second delivery location to deliver the item(s) that are stored in the storage compartment 257B. A separate access code or other mechanism may be utilized for opening each of the storage compartments, so that each user may only access or otherwise receive the item(s) that are part of their delivery As another example, an AGV may receive items from two different transportation vehicles or other sources, wherein the item(s) from one source may be stored in the storage compartment 257A while the item(s) from another source may be stored in the storage compartment 257B, before the AGV delivers the multiple items to one or more delivery locations.

In various implementations, a transfer mechanism (e.g., an automated mechanism including rollers, a robotic arm, etc.), which may be a type of item engagement mechanism, may also be included that allows items to be transferred from one storage compartment to another. For example, a partition between the storage compartments 257A and 257B may be movable and/or may otherwise have an access point or other mechanism to enable a transfer mechanism to move an item from storage compartment 257A to storage compartment 257B, or vice versa. In various implementations, items may be moved between storage compartments for various purposes. For example, if the AGV includes multiple items in the storage compartment 257A that are to be delivered to different locations, a transfer mechanism may be utilized to move the corresponding items for a respective delivery to the storage compartment 257B (e.g., wherein the user at the delivery location will only be given access to the storage compartment 257B that contains the ordered items). As another example, the AGV may receive items from multiple different transportation vehicles or other sources, wherein the item(s) from each source may initially be placed in the empty storage compartment 257B before being moved by a transfer mechanism to be secured within the storage compartment 257A before additional items are received from another source in the storage compartment 257B. In such a configuration, if the items are all being delivered to a single delivery location, access to the storage compartment 257A may be provided at the delivery location. Alternatively, if the items are being delivered to multiple delivery locations, for each respective delivery the transfer mechanism may be utilized to move the corresponding items for the respective delivery to the storage compartment 257B, as described above.

In various implementations, a transfer mechanism may also be utilized for transferring items between AGVs. For example, doors or panels in the sides, etc. of the AGVs may be movable and/or may otherwise have an access point or other mechanism to enable a transfer mechanism to move an item from one AGV to another (e.g., as the AGVs have moved to be adjacent to one another, etc.). In various implementations, items may be transferred between AGVs for various purposes. For example, if a first user wishes to provide an item to a second user (e.g., without requiring human interaction for the transfer), the first user's AGV that contains the item may be designated as a transportation vehicle and may travel to meet the second user's AGV at a meeting area where the item will be transferred to the second user's AGV for subsequent delivery to the second user. As another example, if an item is to be transported over a long distance, a first AGV that contains the item may be designated as a transportation vehicle and may travel for a first distance to meet a second AGV at a meeting area where the item will be transferred to the second AGV for subsequent transport for a second distance, etc.

Another difference of the AGV 200B as compared to the AGV 200A, is that the storage compartment portion 202B includes a user interface 211S and a sensor 204-1S, and the propulsion portion 201B includes a user interface 211P and a sensor 204-1P. In various implementations, by including such components on each of the storage compartment portion 202B and the propulsion portion 201B, each of the storage compartment portion 202B and the propulsion portion 201B may be able to better operate independently when they are separated. For example, the inclusion of the user interface 211P allows for user input/interaction to be received by the propulsion portion 201B when it is separated from the storage compartment portion 202B (e.g., similar to the operations of the user interface 211 described above with respect to FIG. 2A). As another example, the sensor 204-1P may be utilized for navigation and other functions of the propulsion portion 201B when it is separated from the storage compartment portion 202B (e.g., similar to the operations of the sensor 204-1 described above with respect to FIG. 2A). It will also be appreciated that the inclusion of both of the sensors 204-1S and 204-1P may improve certain navigation and other capabilities of the AGV 200B. For example, once the storage compartment portion 202B is attached to the propulsion portion 201B, the additional height of the storage compartment portion 202B and the corresponding height of the sensor 204-1S may provide additional data (e.g., due to a different angle of perspective, field of view, etc.) that may be useful for navigation by the propulsion portion 201B to avoid obstacles, navigate pathways, etc. Such data that is communicated to the control system 210 (e.g., through the coupling portion 238) may also be useful for more accurately monitoring/determining the clearance requirements for certain obstacles (e.g., wherein the height of the storage compartment portion 202B has a higher clearance requirement than the propulsion portion 201B alone).

Figure 2C:
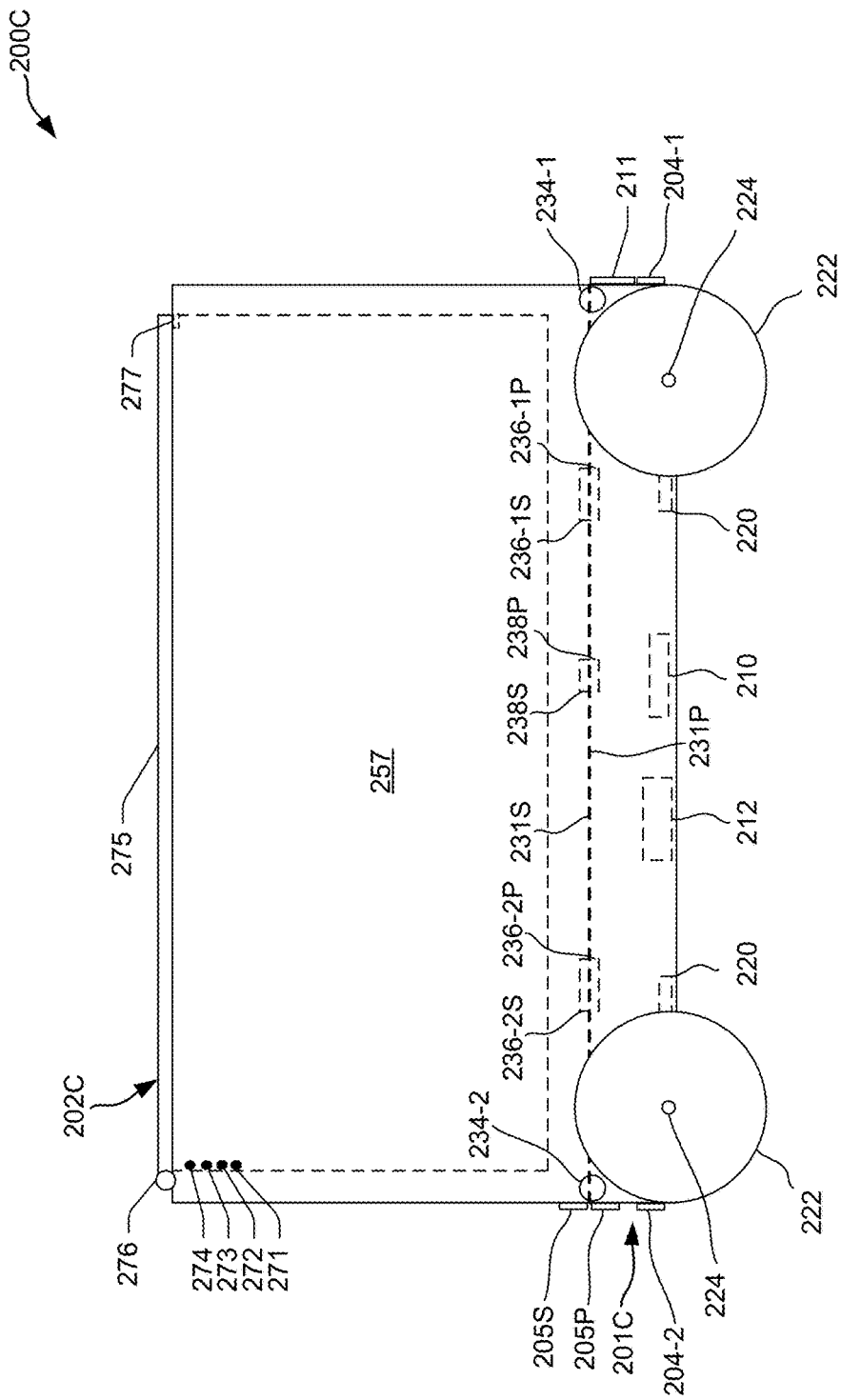
FIG. 2C depicts a block diagram of a side view of another autonomous ground vehicle, according to an implementation.

FIG. 2C depicts a block diagram of a side view of another AGV 200C, according to an implementation. The AGV 200C of FIG. 2C is similar to the AGV 200A of FIG. 2A, and includes a storage compartment portion 202C and a propulsion portion 201C. One difference of the AGV 200C is that the sensors 204-1 and 204-2, and the user interface 211 are located on the propulsion portion 201C rather than on the storage compartment portion 202C. In this configuration, the propulsion portion 201C is more capable (e.g., as compared to the propulsion portion 201A) of operating independently of the storage compartment portion 202C when it is detached. More specifically, the propulsion portion 201C is able to continue to utilize the sensors 204-1 and 204-2 (e.g., for navigation, etc.), as well as the user interface 211 for receiving user input, even when the storage compartment portion 202C is detached. In this configuration, the storage compartment portion 202C is also noted to contain less electronic components as compared to the storage compartment portion 202A. In an alternative configuration, the sensors 271-274 may also be eliminated, such that the storage compartment portion would have no electronic components and would not require any electronic connections, as may be desirable for certain implementations.

In various implementations, AGVs 200 may be provided in different sizes. For example, some AGVs may have length, width and height dimensions that are each under 3 feet, while others may have length dimensions that are under 2.5 feet and width and height dimensions under 1.5 feet. In various implementations, AGVs 200 may be sized to be able to travel along various pathways (e.g., sidewalks, etc.) without causing significant disruption to other vehicles, people, etc. who may also be travelling along the pathways. For example, by having width dimensions that are less than ½ a pathway width dimension, an AGV may be able to travel and/or stop along certain types of pathways, while other vehicles, people, etc. may be able to comfortably pass by to the side of the AGV while also remaining on the pathway. At such sizes, numerous AGVs may be able to congregate in a relatively small area (e.g., 10, 20, 30+ AGVs may be able to congregate in a 9 foot by 18 foot parking space and/or a similarly sized area in an AGV facility, etc.).

In various implementations, AGVs may also be operated during certain hours when pathways are less crowded and/or utilized (e.g., at night, such as between 2 a.m. and 6 a.m., or otherwise when pathways are less crowded in certain delivery areas, etc.). Operating at such hours may also simplify the operations of transportation vehicles, which may travel on regular roadways which may also be significantly less crowded and for which parking locations (e.g., within available parking spaces) may be more readily available (e.g., for parking the transportation vehicles to deploy and/or meet AGVs, etc.). In various implementations, a transportation vehicle that deploys and/or meets AGVs may be parked in a delivery area so as to be relatively close to certain delivery locations. For example, AGVs may in some instances be directed to transporting items over the last 100-500 yards of the travel paths for deliveries, which may in some instances correspond to the distance from a transportation vehicle to a delivery location. In some implementations, AGVs may be utilized to transport items and/or otherwise travel for longer distances (e.g., 10+ miles, etc.)

In various implementations, AGVs 200 may also be operated at relatively low speeds. For example, certain AGVs may have travel speeds between 3 mph and 6 mph. It will be appreciated that by being of relatively smaller sizes and operating at lower speeds, the operating requirements for controlling such AGVs safely may be significantly less complex than the operating requirements for certain other types of autonomous vehicles. For example, autonomous cars for transporting human passengers may be significantly larger and may travel significantly faster, and may therefore have significantly more complex requirements for safe operation than AGVs with the example operating speeds and sizes noted above.

FIG. 3 is a block diagram of an illustrative AGV environment 300 that enables a user 302 to order an item that will be transported by an AGV 200 to a delivery location 308. As will be described in more detail below, once a transportation vehicle 332 reaches a location L1, an AGV 200 (e.g., which may have been transported to the location L1 by the transportation vehicle 332, or may have travelled to the location L1 from a home base location at a user's residence 308, etc.) may transport the item from the location L1 to a user specified delivery location 308 (e.g., to the user's residence, etc.). As will be described in more detail below, in various implementations multiple locations (e.g., similar to the locations 308, L1, etc.) may be included in an AGV environment and may represent delivery locations, locations from which one or more AGVs may transport one or more items, etc. In one configuration, a home base location (e.g., at the user residence), the location L1, and/or the transportation vehicle 332 may include charging stations and/or servicing areas for the AGV 200. In various implementations, the transportation vehicle 332 may be any type of mobile machine, such as a truck, car, watercraft, aircraft, etc., and control of the mobile machine may be manual (e.g., a driver) or automated (e.g., directly or remotely controlled by an automated system, robotic, etc.).

The AGV environment 300 includes a user interface that allows a user 302 to place an order for an item that will be transported by an AGV 200 to a delivery location. As will be described in more detail below with respect to FIG. 6, an AGV 200 may also transport an item to a pickup area that the user will travel to for retrieving the item. In the example of FIG. 3, the user interface may be a graphical user interface, an audio only interface, a multi-mode interface, or any other interface for interacting with the user 302. The user interface may be provided to the user 302 through any type of electronic device 306, such as a tablet, desktop, laptop, smart phone, personal digital assistant, netbook, etc. The user interface may be delivered to the electronic device 306 by one or more remote computing resources 310 that make up part or all of an electronic commerce shopping environment. In other embodiments, the user interface may be in direct communication between a user and an agent.

The remote computing resources 310 may form a portion of a network-accessible computing platform implemented as a computing infrastructure of processors, storage, software, data access, and other components that is maintained and accessible via a network 309. Services, such as e-commerce shopping services, offered by the remote computing resources 310 do not require that the user have knowledge of the physical location and configuration of the system that delivers the services. The electronic device 306 may communicatively couple to the remote computing resources 310 via the network 309 which may represent wired technologies (e.g., wires, USB, fiber optic cable, etc.), wireless technologies (e.g., RF, cellular, satellite, Bluetooth, etc.), and/or other connection technologies. The network 309 carries data between the electronic device 306 and the remote computing resources 310.

After receiving from a user 302 an order for an item that may be transported by an AGV 200 to a delivery location, the electronic device 306 may send this information to the remote computing resources 310 over the network 309. As illustrated, the remote computing resources 310 may include one or more servers, such as servers 320(1), 320(2), ..., 320(N). These servers 320(1)-(N) may be arranged in any number of ways, such as server farms, stacks, and the like that are commonly used in data centers. Furthermore, the servers 320(1)-(N) may include one or more processors 322 and memory 324 that may store a management system 326.

The management system 326 may be configured, for example, to perform order planning and filling of transportation vehicles 332 and/or AGVs with orders (e.g., at a materials handling facility 330) for transport to locations (e.g., location L1) where AGVs may further transport the items to user specified delivery locations. In fulfilling orders that may be transported by an AGV, the materials handling facility 330 may fulfill orders using any of the processes discussed above with respect to FIG. 1. The transportation vehicles 332 and/or AGVs 200 may communicatively couple to the remote computing resources 310 via the network 309. For example, the communications to and from the transportation vehicles 332 and/or AGVs 200 may utilize wireless antennas of the transportation vehicles and AGVs.

The management system 326 may also be configured, for example, to communicate with the transportation vehicles 332 and/or AGVs 200. In various implementations, the general activities of transportation vehicles and AGVs, including those related to the planning and implementation of the transportation vehicles and AGVs receiving and transporting items, may be coordinated and/or otherwise controlled by the management system 326. For example, the management system 326 may receive or determine schedule data for the travel of the transportation vehicles and/or AGVs and/or may otherwise direct the distribution and/or receiving of items by transportation vehicles and/or AGVs.

In various implementations, an AGV 200 may be configured to communicate with other AGVs 200, the management system 326, etc. regarding various types of data and/or information. For example, an AGV 200 may sense and/or receive travel related data (e.g., related to travel conditions, obstacles, etc. for travelling along a travel path). In various implementations, travel related data that is sensed and/or collected by an AGV may be shared with a management system, other AGVs, other vehicles, and/or other entities. The AGVs may also use this information locally, in combination with other received travel related data (e.g., for navigating current travel paths, etc.). Such travel related data may be centrally stored and/or otherwise processed to be utilized for creating and/or updating travel maps, informing other AGVs regarding the availability and/or conditions of certain travel paths, etc.

In various implementations, the remote computing resources 310 and/or management system 326 may also receive tracking data (e.g., GPS) regarding the coordinates of the transportation vehicles and/or AGVs. The GPS data may be utilized for various purposes, such as answering location status requests or for sending notifications regarding the current locations of the transportation vehicles and/or AGVs. For example, a user may request that a notification be sent when a transportation vehicle and/or an AGV with an ordered item is approaching. As another example, a notification may be sent to an AGV when a transportation vehicle is on the way to or otherwise approaching a meeting area where the AGV is to meet the transportation vehicle for acquiring an identified item from the transportation vehicle. Notifications may also be sent from the transportation vehicle 332 and/or AGV 200 to the remote computing resources 310 and/or management system 326 regarding various events (e.g., when an AGV has departed from a transportation vehicle with an item for transport to a delivery location, when an AGV has arrived at a delivery location with an acquired item, etc.). In various implementations, the remote computing resources 310 and/or management system 326 may also receive information and/or otherwise communicate with materials handling facilities 330, delivery locations 308 at users' residences, etc. (e.g., regarding activities related to the deliveries of ordered items, etc.).

In various implementations, the management system 326 may include and/or otherwise be formed from various distributed components and/or various functions of the management system 326 may be performed in a distributed manner. For example, various AGVs, transportation vehicles, locations, etc. may include various types of computing capabilities that may each communicate and/or otherwise perform functions for managing and/or otherwise making determinations regarding the operations of the AGVs, transportation vehicles, etc. In various implementations, travel paths and/or other travel parameters for AGVs and/or transportation vehicles may be determined based on input/data received from multiple sources (e.g., AGVs and/or transportation vehicles within an area and/or other sources may provide data regarding current travel conditions, travel paths, congestion, etc.).

Figure 4:
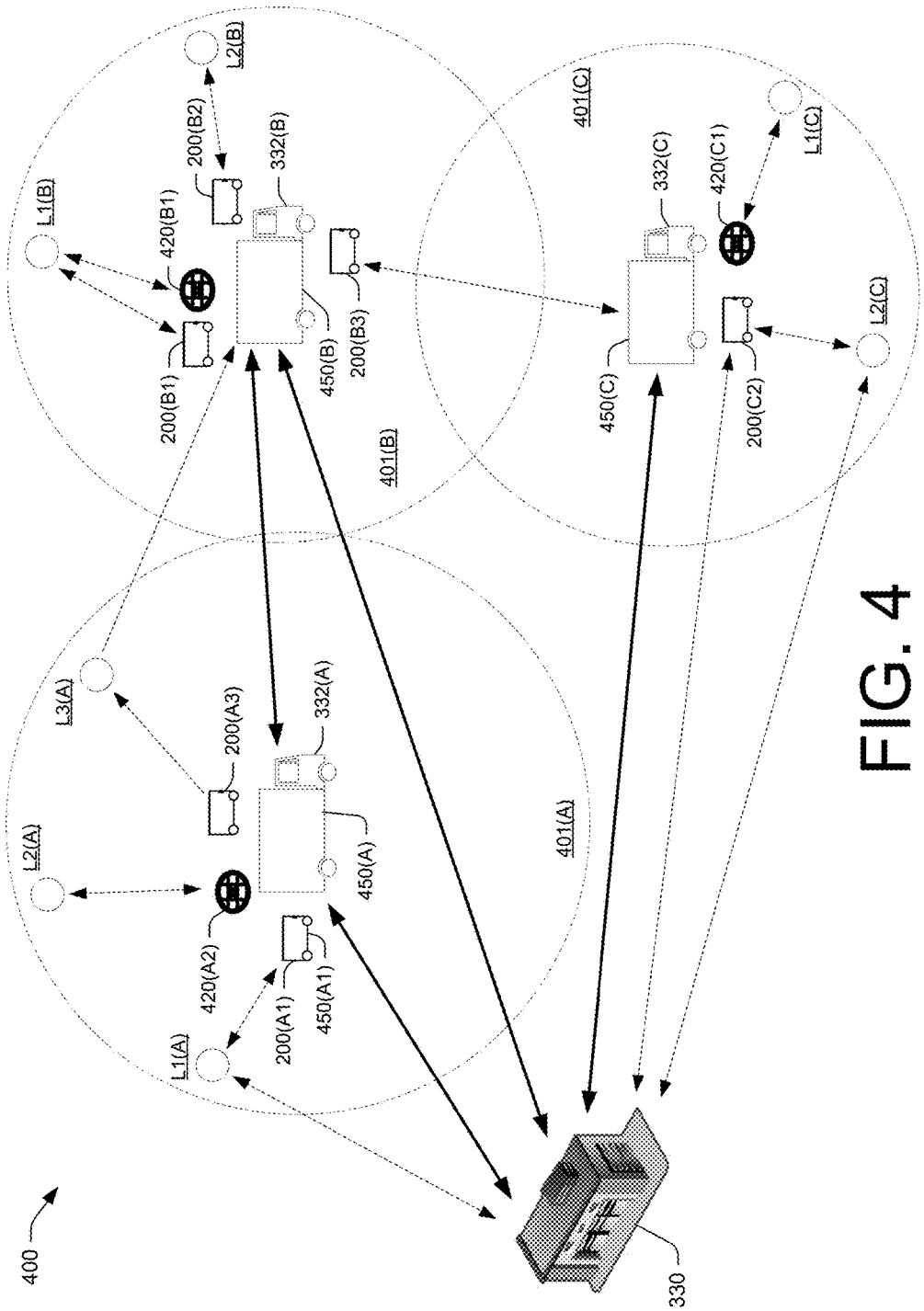
FIG. 4 depicts a block diagram of another autonomous ground vehicle environment, according to some implementations.

FIG. 4 depicts a block diagram of another AGV environment 400, according to some implementations. In the example of FIG. 4, transportation vehicles 332(A), 332(B) and 332(C) may be part of transportation system (e.g., a delivery system and/or a receiving system for delivering and/or receiving items, etc.), as will be described in more detail below. Corresponding geographic areas 401(A), 401(B), 401(C) are served by each transportation vehicle 332(A), 332(B), 332(C), respectively. Each geographic area may include a number of locations (e.g., delivery locations and/or receiving locations). In certain examples that will be described below, the geographic areas 401(A), 401(B) and 401(C) may correspond to delivery areas and/or receiving areas, and locations L1(A)-L3(A), L1(B)-L2(B) and L1(C)-L2(C) within each of the respective geographic areas may correspond to delivery locations and/or receiving locations, depending on the specific example.

Each of the transportation vehicles 332(A)-332(C) is shown to have a number of corresponding autonomous vehicles of different types. As shown, the transportation vehicle 332(A) has associated AGVs 200(A1) and 200(A3) and an autonomous vehicle 420(A2) (i.e., an unmanned aerial vehicle ("UAV")). The transportation vehicle 332(B) is shown to have associated AGVs 200(B1), 200(B2) and 200(B3) and autonomous vehicle 420(B1) (i.e., a UAV). The transportation vehicle 332(C) is shown to have an associated AGV 200(C2) and an autonomous vehicle 420(C1) (i.e., a UAV).

In various implementations, the AGVs 200 and other autonomous vehicles 420 may be carried by, or travel with, the respective transportation vehicles 332 as the transportation vehicles travel to and from delivery and/or receiving areas. For example, AGVs 200 may be carried in storage areas of the transportation vehicles for being deployed from the transportation vehicles (e.g., either with ordered items already placed in the storage compartments of the AGVs, or with ordered items carried separately in the transportation vehicle to be placed in the AGVs before departing from the transportation vehicles). Alternatively, some or all of the AGVs 200 and/or other autonomous vehicles 420 may be stationed at locations within the respective geographic areas, and may be utilized for transporting items to and from the transportation vehicles 332 when the transportation vehicles 332 are in the respective geographic areas. In various implementations, the AGVs 200 and/or other autonomous vehicles 420 that are stationed in the geographic areas may also be utilized for other purposes (e.g., transporting items for local pickups and deliveries). In various implementations, the AGVs 200 and/or other autonomous vehicles 420 may receive instructions and/or be controlled or otherwise directed by the respective transportation vehicles 332 and/or the management system 326. For example, the transportation vehicle 332 and/or the management system 326 may send instructions to the AGVs and/or other autonomous vehicles to transport items from the transportation vehicle 332 to user specified delivery locations when the transportation vehicle 332 is within a delivery area that includes the user specified delivery locations.

In various implementations, a delivery or receiving area may generally be defined as any area that includes delivery or receiving locations. The areas may represent a travel range within a specified period of time for one or more types of AGVs and/or other autonomous vehicles from a stopping location or travel route of a transportation vehicle. The example circular shapes of the geographic areas 401(A)-401 (C) may represent example travel ranges of a type of AGV and/or other autonomous vehicle from a stopping location for a transportation vehicle at the center of the circular area. In one implementation, a single delivery or receiving area may be represented by a combination of geographic areas. For example, the combination of geographic areas 401(A) and 401(B) may represent a single delivery or receiving area for a transportation vehicle (e.g., wherein the transportation vehicles 332(A) and 332(B) may represent the same transportation vehicle as it travels through the different areas). In various implementations, the combined geographic areas 401(A)-401(C) may represent a single delivery and/or receiving area that is serviced by the multiple transportation vehicles 332(A)-332(C).

In operation, when an order for one or more items is placed by a user, a shipment set may be assigned to a materials handling facility 330 for fulfillment and delivery. An order planning system (e.g., as part of, or working in conjunction with, the management system 326) may determine if there is a transportation vehicle, such as transportation vehicle 332(A), that will be within a geographic area 401(A) which includes a delivery location L1(A) where the user may wish to have the items delivered on the desired date during a desired timeframe.

If an identified transportation vehicle will be available, the management system 326 may determine if it is currently indicated that there will be available capacity for the user's order in the transportation vehicle prior to designating the transportation vehicle for transporting the order. For items that have been ordered with a transportation vehicle 332(A) designated for transporting the order, the ordered items may be picked and placed into one or more AGVs 200 and/or other autonomous vehicles that will be carried by the transportation vehicle and/or into one or more storage areas (e.g., bins) of the transportation vehicle 332(A) while the transportation vehicle 332(A) is at the materials handling facility. Other items associated with other orders may also be picked and placed in the AGVs, other autonomous vehicles and/or storage areas of the transportation vehicle 332(A) while the transportation vehicle 332(A) is located at the materials handling facility, after which the transportation vehicle 332(A) may be instructed to travel to the designated geographic area 401(A).

In various implementations, in addition to previously designated user orders, transportation vehicles may also be used to deliver high-volume and/or release day items. A high-volume item may be, for example, an item that is frequently ordered, such as a popular book, shoe, video game, tablet, etc. A release day item may be an item that will become available on the day it is released to the public (e.g., book, movie, game, toy, etc.). For high-volume and/or release day items, they may be picked and placed in AGVs, autonomous vehicles, and/or storage areas (e.g., bins) of various transportation vehicles before the transportation vehicles travel to designated delivery areas so that the items will be immediately available to be delivered by AGVs and/or other autonomous vehicles on the release day. In various implementations, certain storage areas of a transportation vehicle may be reserved for high-volume and/or release day items and/or any available storage areas that have not been filled with user orders may be utilized for the high-volume and/or release day items. For example, when a transportation vehicle is ready to travel to a delivery area, any of the empty storage areas may be filled with high-volume and/or release day items in case those items are ordered by users. When a user orders one of the high-volume and/or release day items, a storage area containing one of those items may be associated with the user's order and the item made immediately available for delivery by an AGV and/or other autonomous vehicle.

As illustrated in FIG. 4, in one example the transportation vehicle 332(A) is shown to initially travel from the materials handling facility 330 on a route that goes through the geographic area 401(A) (e.g., which in this instance may be designated as a delivery area). In various implementations, the transportation vehicle 332(A) may have a single central stopping location within the geographic area 401(A), which AGVs and/or other autonomous vehicles may depart from and/or return to, before the transportation vehicle 332(A) continues to travel. Alternatively, the transportation vehicle 332(A) may have multiple stopping locations and/or may continue to move along the route through the geographic area 401(A) while the AGVs and/or other autonomous vehicles depart from and return to the transportation vehicle 332(A) at different locations along the route.

In various implementations, when an item is to be delivered, a selection may be made between the different types of AGVs and/or other autonomous vehicles for transporting the item. For example, when a delivery is to be made, an AGV and/or other autonomous vehicles may be selected for the delivery based on certain transportation factors. In one implementation, one type of AGV and/or other autonomous vehicle may be preferable over another based on transportation factors such as current traffic conditions, weather, safety, travel speed, travel cost, etc. In the following examples, when an AGV or other autonomous vehicle that is carried by a transportation vehicle is selected or otherwise designated for a delivery of an item, the AGV or other autonomous vehicle may deploy from the transportation vehicle and travel along a travel path to deliver the item to the respective delivery location. In various implementations, such operations may be performed as part of a distributed system and/or may be instructed, coordinated, monitored, etc. by the management system 326 and/or control systems of the AGVs, transportation vehicles, locations, remote computing resources, etc. As noted above, some or all of the AGVs and/or other autonomous vehicles may be stationed at and/or otherwise travel to locations within the respective geographic areas, and may be utilized for transporting items to and from the transportation vehicles and/or other locations.

As another illustrative example, the AGV 200(A1) is shown to deliver an item from the transportation vehicle 332(A) to a delivery location L1(A). As indicated by the dotted lined travel path, the AGV 200(A1) may then travel from the delivery location L1(A) to the materials handling facility 330, rather than back to the transportation vehicle 332(A). This type of travel path may be followed for a number of reasons (e.g., the transportation vehicle 332(A) may have subsequently left the geographic area 401(A) in which case the materials handling facility 330 may be closer to the current location of the AGV 200(A1), the AGV 200(A1) may have an item that is to be delivered to the materials handling facility 330, the transportation vehicle 332(A) may have already returned to the materials handling facility 330, etc.). In an alternative implementation, the travel path may indicate that the AGV 200(A1) has traveled from the materials handling facility 330 to deliver an item to the delivery location L1(A), and then traveled to the transportation vehicle 332(A). For example, the AGV 200(A1) may have delivered an item directly from the materials handling facility 330 to the delivery location L1(A), and then traveled to a meeting area with the transportation vehicle 332(A) (e.g. which may be the closest transportation vehicle) for further transport. As will be described in more detail below with respect to FIGS. 7A and 7B, when arriving at a meeting area for meeting a transportation vehicle, an AGV may join other AGVs that are also waiting at the meeting area for the transportation vehicle (e.g., wherein the other AGVs may also be waiting for further transport by the transportation vehicle after having completed a delivery and/or waiting to acquire items for delivery, etc.).

As another illustrative example, the autonomous vehicle 420(A2) (i.e., a UAV) is shown to travel to a delivery location L2(A) to deliver an item from the transportation vehicle 332(A), and then travel back to the transportation vehicle 332(A). The AGV 200(A3) is shown to travel to a delivery location L3(A) to deliver an item from the transportation vehicle 332(A), and then subsequently travel to a different transportation vehicle 332(B). Such a travel route may be followed by an AGV for a number of reasons (e.g., the transportation vehicle 332(A) may have subsequently left the area and the transportation vehicle 332(B) may be closer, the AGV 200(A2) may have an item that is to be delivered to the transportation vehicle 332(B), etc.). In various implementations, the transportation vehicles 332(A) and 332(B) may be representative of the same transportation vehicle as it travels from the geographic area 401(A) to the geographic area 401(B), in which case the AGV 200(A3) may be described as returning to the transportation vehicle that it originated from after the transportation vehicle has moved to a different location.

With respect to the transportation vehicle 332(B), the AGV 200(B1) and another autonomous vehicle 420(B1) (e.g., a UAV) are shown to follow at least part of a travel path together to deliver an item from the transportation vehicle to the delivery location L1(B), and then return to the transportation vehicle 332(B). In various implementations, one of the AGV 200(B1) or the autonomous vehicle 420(B1) may provide assistance to the other for delivering the item to the delivery location L1(B) (e.g., as instructed by the management system 326, control system of the transportation vehicle, and/or as determined through coordination between the vehicles, etc.). For example, the AGV 200(B1) may require assistance to navigate past an obstacle (e.g., a barrier, etc.), for which the autonomous vehicle 420(B1) may engage the AGV 200(B1) and temporarily fly or lift the AGV 200(B1) or otherwise assist in navigating over or otherwise past the obstacle. As another example, it may be undesirable for the autonomous vehicle 420(B1) to navigate (e.g., fly) along the final portion of the travel path to the delivery location (e.g., due to undesirable noise levels, safety issues in proximity to the delivery location, etc.) for which it may be preferred to have the AGV 200(B1) carry or otherwise assist the autonomous vehicle 420(B1) and/or the item to be delivered in reaching the delivery location. In various implementations, the AGV 200(B1) may alternatively be based at the location L1(B) (i.e., rather than carried on the transportation vehicle 332(B)), for which as the autonomous vehicle 420(B1) flies toward the delivery location L1(B) from the transportation vehicle 332(B), the AGV 200(B1) may travel out to meet the autonomous vehicle 420(B1) at a safer/quieter landing distance from the delivery location L1(B) (e.g., at a user's residence, etc.). The AGV 200(B1) may then carry the autonomous vehicle 420(B1) and/or the item for delivery back to the delivery location L1(B), and after the item is retrieved by a user or otherwise delivered, the AGV 200(B1) may carry the autonomous vehicle back out to a safer/quieter distance from the location L1(B) for taking off and flying back to the transportation vehicle 332(B), materials handling facility 330, or other location.

With respect to the other AGVs from the transportation vehicle 332(B), the AGV 200(B2) is shown to deliver an item from the transportation vehicle 332(B) to the delivery location L2(B), and then return to the transportation vehicle 332(B). The AGV 200(B3) is shown to travel directly from the transportation vehicle 332(B) to a transportation vehicle 332(C). In various implementations, an AGV may travel between transportation vehicles for various reasons (e.g., to deliver or receive items or supplies from one transportation vehicle to another, to be transported by a different transportation vehicle back to a materials handling facility or other destination, to return to a transportation vehicle that the AGV was originally assigned to, as following instructions after delivering an item to return to whichever transportation vehicle is closest, etc.). In various implementations, AGVs may generally receive resources from transportation vehicles (e.g., electricity, power modules, parts, etc.) and an AGV may travel to a different transportation vehicle for receiving such resources if the other transportation vehicle is closer or otherwise more convenient, or if the original transportation vehicle has run out of such resources, etc.

With respect to the transportation vehicle 332(C), the autonomous vehicle 420(C1) and the AGV 200(C2) are shown to deliver items from the transportation vehicle 332(C) to delivery locations L1(C) and L2(C), respectively, and to return to the transportation vehicle. Additionally, the AGV 200(C2) is illustrated as traveling to and from the materials handling facility 330. In various implementations, an AGV may travel between a transportation vehicle and a materials handling facility for a variety of reasons (e.g., to transport items from the transportation vehicle to the materials handling facility, to receive needed items or supplies from the materials handling facility, etc.). As another example, if the transportation vehicle 332(C) is travelling to transport received items to the materials handling facility 330, but a determination is made that subsequent travel of the transportation vehicle 332(C) to the materials handling facility 330 is inhibited, instructions may be sent directing one or more AGVs (e.g., AGV 200(C2)) to travel to transport items to the materials handling facility 330.

In various implementations, in a geographic area with an increasing or decreasing volume of deliveries or receiving of items, the management system 326 may correspondingly increase or decrease the frequency or number of transportation vehicles and/or carried AGVs and other autonomous vehicles that travel through the geographic area. The management system 326 may also monitor the patterns of deliveries or receiving of items over time and may adjust the schedules for the transportation vehicles and/or AGVs and other autonomous vehicles to better meet the corresponding demand for delivering and/or receiving items. The locations that the transportation vehicles travel to and/or stop at for sending out and/or meeting AGVs and other autonomous vehicles to make deliveries and/or receive items may also be adjusted to optimize the network.

As noted above, a transportation vehicle may travel to a first geographic area, such as geographic area 401(A), before traveling to a second geographic area, such as geographic area 401(B). In such an instance, the transportation vehicles 332(A) and 332(B) may be representative of the same transportation vehicle as it travels to the different respective geographic areas. In one implementation, as described above, the first and second geographic areas 401(A) and 401(B) may each represent delivery areas where ordered items may be delivered by the respective AGVs and/or other autonomous vehicles to user specified delivery locations. In one example, the geographic areas 401(A) and 401(B) may have been predetermined and/or otherwise be on a regular route for the transportation vehicle. As another example, the transportation vehicle may have initially been instructed to travel to the geographic area 401(A) based on one or more transportation factors (e.g., based on a number of scheduled deliveries to the locations L1(A)-L3(A)), and then may be instructed to move to the different geographic area 401(B) due to a change in one or more of the transportation factors (e.g., newly scheduled or anticipated deliveries for the locations L1(B) and L2(B)).

In another implementation, the first geographic area 401(A) may represent a receiving area where the transportation vehicle receives items (e.g., from merchants, vendors, etc.), after which the transportation vehicle may travel to the geographic area 401(B) which represents a delivery area where the received items may be delivered by AGVs and/or other autonomous vehicles to user specified delivery locations. In various implementations, a given geographic area may also represent both a delivery area and a receiving area, wherein delivery locations and receiving locations may be included within the same geographic area. For example, the geographic area 401(A) may represent a receiving area that includes receiving locations L1(A) and L2(A), and may also represent a delivery area that includes a delivery location L3(A).

In various implementations, an item received at a receiving location by an AGV may be delivered directly to a user specified delivery location by the AGV rather than back to the transportation vehicle. For example, instructions may be provided that an item received by an AGV from a receiving location L2(A) should be delivered directly to a user specified delivery location L3(A) rather than back to the transportation vehicle 332(A). In various implementations, an AGV may receive multiple items from different receiving locations (e.g., locations L1(A) and L2(A)) before delivering the multiple items to one or more transportation vehicles (e.g., transportation vehicle 332(A)) or delivery locations (e.g., location L3(A)). Similarly, an AGV may receive multiple items from a single transportation vehicle (e.g., transportation vehicle 332(A)) or receiving location (e.g., location L1(A)), and then travel to deliver the items to multiple delivery locations (e.g., locations L2(A) and L3(A)). In instances where items are being received from or delivered to multiple locations, it may be desirable to utilize an AGV with multiple storage compartments (e.g., FIG. 2B). More specifically, items that are received from or delivered to different locations may each be stored in a separate storage compartment (e.g., for security, etc.). In various implementations, multiple AGVs and/or transportation vehicles may be utilized for delivering different parts or items of a single user order (e.g., one item from a user order may be transported by an AGV 200(A1) while another item from the user order may be transported by an AGV 200(A3)).

Several of the examples described above regarding deliveries to delivery locations may alternatively be described for receiving items from receiving locations. For example, the AGV 200(A1) may have originated at the transportation vehicle 332(A) and travelled to a receiving location L1(A) for receiving an item which the AGV 200(A1) subsequently transported to the materials handling facility 330. Alternatively, the AGV 200(A1) may have originated at the materials handling facility 330 and travelled to the receiving location L1(A) for receiving the item and subsequently transported the received item to the transportation vehicle 332(A). As a similar example, the AGV 200(A3) may have originated at the transportation vehicle 332(A) and travelled to a receiving location L3(A) for receiving an item and subsequently transported the received item to the transportation vehicle 332(B) (which as described above may be a different transportation vehicle or may be the same transportation vehicle 332(A) as having travelled from the geographic area 401(A) to the geographic area 401(B)). In either case, as part of transporting the item to the transportation vehicle 332(B), the AGV 200(A3) may subsequently navigate into (e.g., up a ramp into the transportation vehicle 332(B)) or otherwise be engaged by the transportation vehicle 332(B) for subsequently travelling with the transportation vehicle 332(B).

In various implementations, a transportation vehicle may itself travel to delivery locations and/or receiving locations for delivery and/or receiving of items. For example, in one implementation the transportation vehicle 332(A) may travel to the receiving location L3(A) to receive items, and then may travel to the geographic area 401(B) where the items will be delivered by AGVs 200(B1) and 200(B2) to delivery locations L1(B) and L2(B). Alternatively, or in addition, the transportation vehicle 332(A) may receive items as transported by AGVs 200(A1) and 200(A3) from receiving locations L1(A) and L3(A), and then may travel to the delivery location L1(B) where the transportation vehicle may deliver the items. In various implementations, the materials handling facility 330 may also be designated as a delivery and/or receiving location that transportation vehicles and/or AGVs may travel to and from for delivering and/or receiving items.

In various implementations, the receiving locations may also represent locations for receiving an item that is to be returned by a user. For example, when a user wishes to return an item, the user may schedule a receiving location (e.g., at or near the user's residence or place of work), where the item may be received by an AGV and subsequently transported back to a transportation vehicle. In another implementation, a user may request that an AGV be utilized to deliver an item to a user specified delivery location, and then wait for the user to determine whether the user wishes to keep the item. For example, a user may have a pair of shoes delivered by an AGV, and then determine that the shoes are the wrong size or color, for which the user may wish to have the AGV subsequently transport the shoes back to a transportation vehicle for a return. In another implementation, a return may be expected as part of a delivery process for an item. For example, when an item is delivered, the AGV that delivered the item may be utilized for certain types of returns (e.g., returning a defective or worn-out item in exchange for the new item that has been delivered, returning packaging that was utilized for protecting the item during delivery but which is no longer needed, etc.).

In various implementations, when a user returns an item, a credit or other compensation may be issued for the received item that may initiate a refund or replacement process, once the item is received by an AGV or a transportation vehicle. Similarly, merchants or vendors may have a credit issued or receive other compensation for an item once the item is received by an AGV or at the transportation vehicle. It will be appreciated that by issuing credits or other compensation for received items when they are received by an AGV or transportation vehicle, refunds, payments, etc. may be initiated more quickly (e.g., as compared to traditional systems where an item would need to be received at a materials handling facility before a credit for the item would be issued).

In the example of FIG. 4, each of the transportation vehicles 332(A)-332(C) is illustrated as being at a respective stopping location 450(A)-450(C) within the delivery areas of each of the respective geographic areas 401(A)-401(C). In various implementations, each of the respective stopping locations 450(A)-450(C) may be a location at which the respective transportation vehicle may stop (e.g., be parked), and from which various AGVs that are carried by the transportation vehicle may be deployed. For example, after the transportation vehicle has stopped (e.g., parked) at a respective stopping location, the AGVs may disembark (e.g., down a ramp to an adjacent sidewalk and/or as otherwise deployed, etc.) from the transportation vehicle, and then may travel to respective delivery and/or receiving locations for delivering and/or receiving items.

As will be described in more detail below with respect to FIGS. 7A-7C, the respective stopping locations 450(A)-450(C) may also be within respective meeting areas where other AGVs that have travelled from other locations (e.g., from home base locations at user residence's) may meet the transportation vehicles. For example, the stopping location 450(A) of the transportation vehicle 332(A) may be within a meeting area that includes a stopping location 450(A1) that the AGV 200(A1) has travelled to and stopped at for meeting the transportation vehicle 332(A) (e.g., for acquiring an item that is to be delivered to the location L1(A)). In various implementations, the stopping location 450(A1) may be adjacent to the stopping location 450(A). For example, the stopping location 450(A1) may be on a sidewalk that is adjacent to the stopping location 450, which may be in a parking location (e.g., in an available parking space) for the transportation vehicle 332(A). In various implementations, as will be described in more detail below, multiple AGVs may travel out and congregate in a meeting area for meeting with a transportation vehicle. As part of this process, the AGVs may stop in respective AGV stopping locations within the meeting area, which may be adjacent to each other (e.g., on a sidewalk), as well as being adjacent to a transportation vehicle stopping location (e.g., a parking location on the street) that is also within the meeting area. In some instances, the AGVs may travel to the respective AGV stopping locations in the meeting area before the transportation vehicle arrives, and in some instances one or more of the AGV stopping locations may be within or otherwise the same as the transportation vehicle stopping location. For example, the AGVs may move into the stopping/parking location (e.g., in the parking space) that will be for the transportation vehicle once it arrives so as to save the stopping location for the transportation vehicle and/or to allow the AGVs to congregate in a meeting area that occupies a parking space rather than taking up space on a sidewalk, etc. Once the transportation vehicle arrives, the AGVs may move (e.g., within the parking space, or to another adjacent parking space, or up on a sidewalk, or to other area, etc.) so as to make room for the transportation vehicle to park.

In various implementations, an AGV environment may include multiple materials handling facilities, associated transportation vehicles and/or AGVs (e.g., similar to the materials handling facility 330, transportation vehicles 450 and/or AGVs 200 of the AGV environment 400, etc.) In such configurations with multiple materials handling facilities, the geographic areas (e.g., areas 401) serviced by the different materials handling facilities and/or vehicles may overlap and/or the vehicles (e.g., transportation vehicles, AGVs, etc.) may travel between the different materials handling facilities, geographic areas, etc. In various implementations, one or more of the locations of the AGV environment 400 as illustrated in FIG. 4, or other locations, may be representative of locations of other materials handling facilities, etc. For example, in one implementation, one or more of the locations L1(A), L2(B) and/or L2(C), etc. may be representative of locations of one or more additional materials handling facilities 330, wherein the AGVs 200 and/or the transportation vehicles 332 may travel between the different materials handling facilities and/or to or from the various locations to perform functions such as those described above (e.g., for transporting items, etc.).

In various implementations, the transportation vehicles and/or AGVs may also have capabilities for on-demand production of items. For example, books may be produced through an on-demand printing process utilizing a printer within a transportation vehicle or AGV. As another example, a three-dimensional printer may be utilized within a transportation vehicle or AGV for producing items. As another example, an oven within a transportation vehicle or AGV may be utilized to cook an item (e.g., a pizza) that is carried within the transportation vehicle or AGV in an uncooked state (e.g., as stored in a refrigerated storage compartment, etc.) or is otherwise acquired along a travel path of the transportation vehicle or AGV.

Such items may be produced on-demand to fulfill user orders that may be placed at various times (e.g., after the transportation vehicle and/or AGV has left a materials handling facility, while the transportation vehicle and/or AGV is travelling along a travel path or is at a stopping location, etc.). With respect to items that are produced on-demand by a transportation vehicle, in various implementations the items may be subsequently transported from the transportation vehicle (e.g., to a delivery location, etc.) by an AGV, etc. In various implementations, on-demand production capabilities of an AGV may be provided by a device and/or machine (e.g., printer, oven, etc.) that is included as part of an AGV storage compartment portion and/or may be sized and configured to fit and operate within an AGV storage compartment portion. In various implementations, an on-demand production device and/or machine may be inserted inside an AGV storage compartment portion at a materials handling facility, or may be carried inside a transportation vehicle to be inserted inside an AGV storage compartment portion, after which an on-demand item may be produced within the AGV (e.g., while travelling) for delivery to a delivery location, etc.

In various implementations, different types of AGVs 200 may be utilized within the AGV environment 400. For example, while some AGVs may primarily be utilized for transporting items, other AGVs may operate and/or may otherwise be utilized to provide services and/or support to other AGVs and/or transportation vehicles. For example, an AGV 200 may be configured to provide charging capabilities (e.g., including a large power module and/or other power source that may be utilized for charging other AGVs that couple to the AGV through a coupling portion, etc.). As another example, an AGV may provide supplies to other AGVs (e.g., carrying replacement power modules, items, etc.). As another example, an AGV may primarily travel through a geographic area (e.g., a delivery area, etc.) gathering data (e.g., searching for available stopping/parking locations for transportation vehicles and/or AGVs and/or otherwise gathering data regarding travel conditions, travel paths, congestion, etc.). In various implementations, AGVs may also perform such data gathering functions as part of other routine operations (e.g., while travelling to and/or from delivery locations, etc.). In addition to sending notifications regarding data, AGVs may also send notifications for other purposes. For example, an AGV that needs to receive maintenance may send a notification regarding the maintenance and/or requesting that a replacement AGV be sent to replace the AGV.

Figure 5:
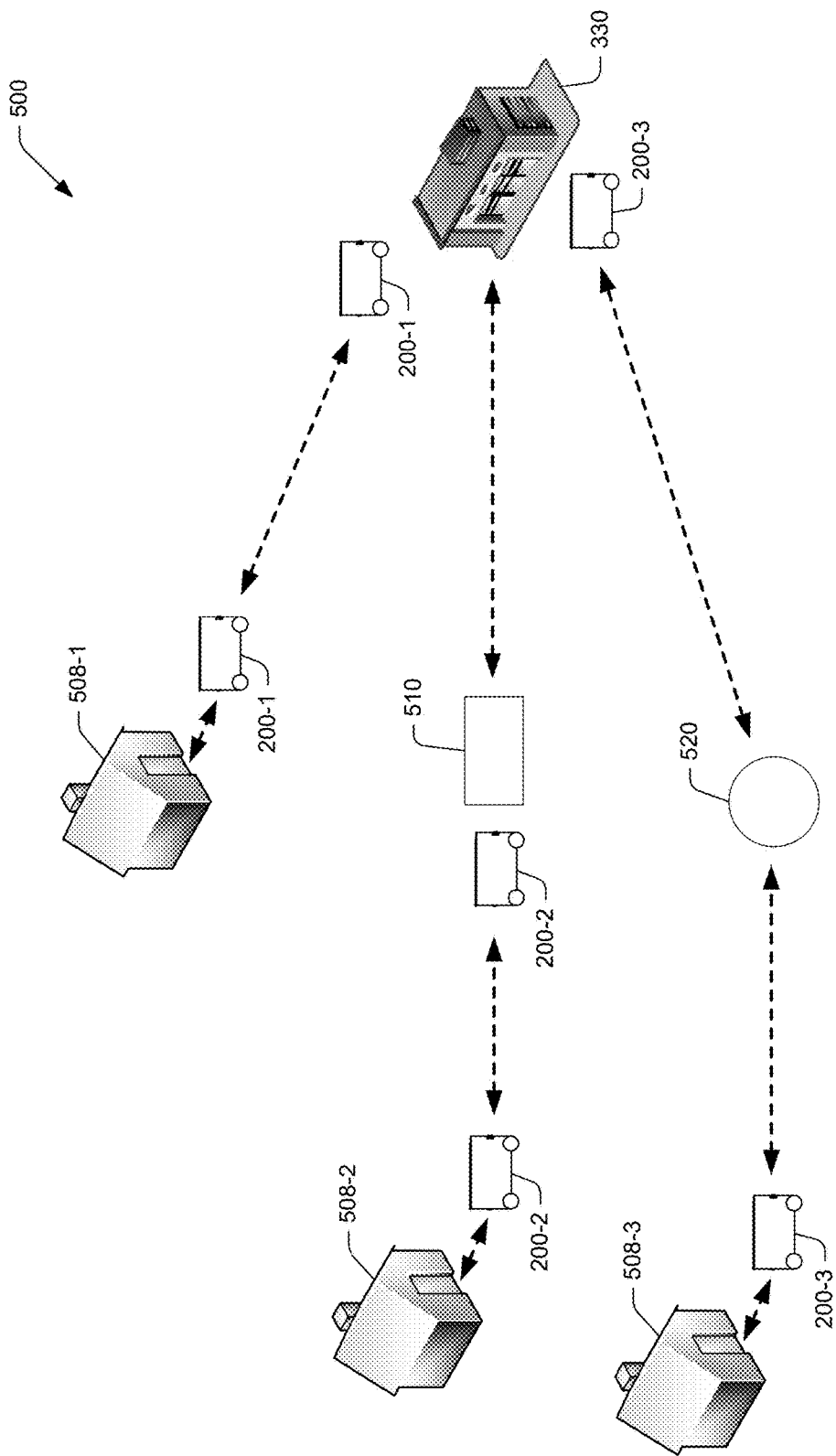
FIG. 5 depicts a block diagram of another autonomous ground vehicle environment, according to some implementations.

FIG. 5 depicts a block diagram of another AGV environment 500, according to some implementations. In the example of FIG. 5, the environment 500 includes a materials handling facility 330, three delivery locations 508-1, 508-2 and 508-3 and an AGV facility 510 in a delivery area, and a charging station 520. An AGV 200-1 travels directly between the materials handling facility 330 and the delivery location 508-1, while an AGV 200-2 travels directly between the AGV facility 510 and the delivery location 508-2, and an AGV 200-3 travels between the materials handling facility 330, the charging station 520 and the delivery location 508-3. As described above with respect to FIGS. 2A-2C, in various implementations, the AGVs 200-1, 200-2 and 200-3 may include storage compartments with locking mechanisms, control systems to control the locking mechanisms, propulsion portions, etc.

In various implementations, the materials handling facility 330 may contain ordered items that are to be delivered to delivery locations by AGVs that are deployed from the materials handling facility (e.g., as described in more detail above with respect to FIGS. 1, 3 and 4). For example, a control system 210 of the AGV 200-1 may control the propulsion portion of the AGV (e.g., as described above with respect to FIGS. 2A-2C) to deploy the AGV 200-1 from the materials handling facility 330 with an ordered item contained in a storage compartment of the AGV, and to further navigate the AGV along a travel path from the materials handling facility 330 to the delivery location 508-1. Once the AGV 200-1 arrives at the delivery location 508-1, the control system may control the locking mechanism to unlock the storage compartment to enable the ordered item to be removed from the storage compartment (e.g., as will be described in more detail below with respect to FIG. 14). In various implementations, the distance between the materials handling facility 330 and the delivery location 508-1 may be relatively long (e.g., 10 miles, 30 miles, or 60 miles or more), for which the AGV 200-1 may utilize various techniques for long-range travel. For example, various energy conservation and/or recharging techniques (e.g., solar charging, propellers for generating electricity from wind power, regenerating electricity from wheel motors when travelling downhill, directing travel with the wind, avoiding pathways with large hills, generally determining and following energy efficient travel paths, etc.) may be utilized. AGVs with such long range capabilities may also be capable of traveling from one materials handling facility 330 to another, even if the materials handling facilities 330 are separated by relatively long distances (e.g., 10 miles, 30 miles, 60+ miles, etc.).

In various implementations, various factors may be analyzed to determine where and when AGVs will utilize such energy conservation and/or recharging techniques. For example, based on the current charge level of the power module of the AGV 200-1, the distance to be travelled to the delivery location 508-1, the current travel conditions, etc., it may be determined that the AGV 200-1 will be required to perform at least one recharging procedure along the travel path to the delivery location 508-1 to recharge the power module of the AGV. In various implementations, the AGV 200-1 may include a solar charging mechanism, and the recharging procedure may include utilizing the solar charging mechanism to receive sunlight to recharge the power module. As described above with respect to FIG. 2A, the orientation of the solar charging mechanism may be adjustable relative to the orientation of the propulsion portion, and the recharging procedure may include adjusting the orientation of the solar charging mechanism toward the sunlight. In such configurations, the recharging procedure may also include controlling the propulsion portion to stop the AGV at a stopping location where the solar charging mechanism will receive sunlight to recharge the power module.

In one example scenario, as part of the recharging procedure, the AGV (e.g., which may primarily travel during nocturnal hours), may travel to a stopping location that is determined (e.g., by the control system of the AGV, by a management system, etc.) where there is sunlight during the day, and where the AGV will stop and remain during the daylight hours to recharge the power module. It will be appreciated that by determining an optimized location and orientation for solar charging (e.g., where there is determined to be maximum sunlight exposure in an area, orientation, etc.) and stopping at that location during daylight hours, the AGV may achieve a higher efficiency for solar charging than a vehicle that continues to move while utilizing solar charging (e.g., which may travel through less optimal locations and/or orientations for solar charging while moving). It will also be appreciated that such solar charging techniques that involve remaining at a stopping locations during daylight hours are compatible with operating procedures for AGVs that primarily travel during nocturnal hours (e.g., during which there is less congestion for the travel of the AGVs and/or delivery vehicles, etc.). In various implementations, the recharging procedure may also or alternatively include utilizing a charging station (e.g., similar to the charging station 520) that is located along a travel path to a delivery location, as will be described in more detail below.

In various implementations, the charging station 520 may be utilized to increase the travel range of AGVs. For example, in some instances the AGV 200-3 may be able to approximately double its effective travel range by utilizing the charging station 520 between the materials handling facility 330 and the delivery location 508-3. In various implementations, a network of such charging stations 520 may be provided at determined intervals for utilization by AGVs to increase the effective travel ranges. In various implementations, the charging station 520 may be of various types (e.g., utilizing inductive charging where the AGV simply moves proximate to the charging station, or which may be coupled to by coupling portions 205S and/or 205P, etc.). In various implementations, the charging station 520 may also provide various supplies and/or other services for the AGVs. For example, the charging station 520 may provide fully charged replacement power modules for AGVs. In various implementations, the charging station 520 may also require an access code to use (e.g., wherein the AGV may include an access mechanism that wirelessly transmits the access code to enable the AGV to utilize the charging station to recharge a power module, etc.).

In various implementations, the AGV facility 510 may supply items to the AGV 200-2 (and other AGVs) for transport to delivery locations (e.g., delivery location 508-2). The AGV facility 510 may be a type of materials handling facility that is smaller than the materials handling facility 330, and may receive limited items, supplies, etc. from the materials handling facility 330 and/or from other sources (e.g., local vendors, etc.). Due to the smaller size of the AGV facility 510, it may be more easily located in compressed urban areas (e.g., to be closer to the delivery locations 508-1, 508-2 and 508-3). In one implementation, the AGV facility 510 may be the size of, or smaller than, a 9' by 18' parking space, such that it may be temporarily located in a delivery area where parking locations (e.g., within parking spaces) are available. In various implementations, the AGV facility 510 may also be mobile. In such instances, a process for searching for a stopping location (e.g., a parking location) for the AGV facility 510 may be identical to the process described below with respect to FIG. 12 for determining a stopping location for a transportation vehicle.

In various implementations, the AGV facility 510 may be a home base location for one or more AGVs and/or may be configured to interact with and provide items to AGVs. For example, the AGV facility 510 may include an item engagement mechanism (e.g., a mechanical arm) that is capable of placing items in, and removing items from, a storage compartment of an AGV. As another example, the AGV facility 510 may include an AGV access door that is specifically sized to match the outer dimensions of the AGV, and which can only be accessed through use of a code/signal that the AGV is configured to provide/transmit. As another example, the AGV facility 510 may include one or more docking stations that may be coupled to by coupling portions of the AGVs (e.g., coupling portions 205S and/or 205P). Such docking stations may include communication and/or charging capabilities and/or separate charging stations may be provided (e.g., inductive charging stations for charging the power modules 212, etc.). Wireless communication capabilities may also be provided in the AGV facility 510 for communicating with the control systems 210 of the AGVs.

In various implementations, the AGV facility 510 may consist of a structure that is sized to hold a specified number of AGVs (e.g., at least 4, 9, 16, etc.). For example, the AGV facility 510 may operate as a home base location for the AGVs 200-1, 200-2 and 200-3 and/or a location where items may be dropped-off by a transportation vehicle for later retrieval and delivery by the AGVs. A transportation vehicle may transport ordered items from the materials handling facility 330 (e.g., or from another source of items, such as a local vendor, etc.) to the AGV facility 510 (e.g., during the day) where the items for delivery are placed (e.g., either directly from the transportation vehicle or at a later time) in the storage compartments of the AGVs 200-1, 200-2 and 200-3. At a specified delivery time (e.g., between 2 a.m. and 6 a.m.) the AGVs 200-1, 200-2 and 200-3 may follow travel paths from the AGV facility 510 to the delivery locations 508-1, 508-2 and 508-3. After the items have been delivered (e.g., as removed from the storage compartments of the AGVs 200-1, 200-2 and 200-3 by users, item engagement mechanisms, etc.), the AGVs 200-1, 200-2 and 200-3 may remain at the delivery locations (e.g., if stationed there), or may follow travel paths back to the AGV facility 510 or other home base location(s), either immediately after delivery, or at a specified travel time (e.g., between 2 a.m. and 6 a.m.).

In various implementations, a management system (e.g., including centralized and/or distributed elements, such as remote computing resources, control systems of AGVs and/or transportation vehicles, cloud based elements, etc.) may at least partially monitor, coordinate and/or direct, etc. the transportation of items from the AGV facility 510, the materials handling facility 330, and/or transportation vehicles, etc. In one example scenario for the distribution of items from the AGV facility 510, a management system may receive orders for items and may direct the items to be transported (e.g., by a transportation vehicle) from the materials handling facility 330 to the AGV facility 510. The management system may then instruct the AGVs 200-1, 200-2 and 200-3 to receive the items in respective storage compartments of the AGVs (e.g., as removed from the transportation vehicle and/or AGV facility and placed in the storage compartments of the AGVs while the AGVs are inside or outside the AGV facility 510, etc.). In various implementations, messages may be sent (e.g., to users who ordered the items) indicating when the AGVs have received the items and identifications of the items (e.g., a message may include a picture of an item, a description of an item, etc.)

The AGVs may then be instructed to deploy from the AGV facility 510 and to follow respective travel paths to deliver the items to the respective delivery locations 508-1, 508-2 and 508-3. One or more of the AGVs 200-1, 200-2 and 200-3 may further be instructed to follow respective travel paths to return to the AGV facility 510 after completing the deliveries of the items to the respective delivery locations 508-1, 508-2 and 508-3 (e.g., wherein the AGV facility 510 may be a home base location for one or more of the AGVs 200-1, 200-2 and 200-3), or alternatively to remain at the respective delivery locations (e.g., wherein or more of the AGVs 200-1, 200-2 and 200-3 may be stationed at respective home base locations at the respective delivery locations). In an implementation where one or more of the AGVs 200-1, 200-2 and 200-3 are stationed at respective home base locations at the respective delivery locations, the respective AGVs may have initially been instructed to follow respective travel paths from the respective delivery locations to the AGV facility 510 before the respective AGVs received the items at the AGV facility 510.

As noted above, the AGV facility 510 may be of a particular size (e.g., large enough to contain all of the AGVs 200-1, 200-2 and/or 200-3 at the same time). In various implementations, one or more of the AGVs 200-1, 200-2 and/or 200-3 may be instructed or otherwise operate to utilize respective coupling portions of the AGVs to couple to respective docking stations inside the AGV facility (e.g., for recharging, communications, etc.). In an implementation where the AGV facility 510 is mobile and is of a size that fits within a parking space (e.g., a 9' by 18' parking space), the AGV facility to be positioned at a stopping location (e.g., within a parking space) that is within a delivery area that includes the delivery locations 508-1, 508-2 and 508-3, and from which the AGVs 200-1, 200-2 and 200-3 will deploy to deliver the items to the respective delivery locations 508-1, 508-2 and 508-3.

As will be described in more detail below with respect to FIG. 11, as part of the travel between the various locations, the AGVs 200-1, 200-2 and 200-3 may encounter various obstacles and/or access barriers (e.g., doors, gates, etc.) The AGVs 200-1, 200-2 and 200-3 may be enabled with navigation capabilities for navigating around obstacles and for opening or otherwise gaining access past access barriers (e.g., to allow an AGV to bring an item and/or storage compartment into a user's residence as instructed by the user, to enter or depart from a materials handling facility 330, AGV facility 510, charging station 520, etc.). Once an item and/or storage compartment has been delivered by the AGV to a delivery location 308 (e.g., as retrieved by the user from the AGV, or as otherwise removed from the AGV by a robotic arm of the AGV or delivery location, etc.), the AGV may be instructed to return to the materials handling facility 330, AGV facility 510 and/or charging station 520 (e.g., requiring navigation back out a door or other access point of the user's residence, and/or through a door or other access point of the materials handling facility 330, AGV facility 510 and/or charging station 520, etc.).

In various implementations, the AGV may include an access mechanism that is configured to transmit a signal, or otherwise include an identification mechanism to cause the access barrier (e.g., a door, etc.) to be opened or otherwise unlocked to allow the AGV to navigate through or otherwise past the access barrier at each location. In this manner, the delivery locations 508-1, 508-2 and 508-3 may each be secure, wherein the respective AGVs 200-1, 200-2 and 200-3 (e.g., as trusted devices by the users at the respective delivery locations) may each have the unique access codes/signals required for entrance and/or exit, etc. Similarly, the materials handling facility 330, AGV facility 510 and charging station 520 may each be secure, wherein the respective AGVs 200-1, 200-2 and 200-3 (e.g., as trusted devices by the various locations) may have the unique access codes/signals required for entrance and/or exit, etc.

In various implementations, AGVs may be utilized for different types of transactions (e.g., as facilitated by the management system 326, etc.). For example, a location 508-1 may be a business (e.g., a corner grocery store, a restaurant, an office supply store, etc.) to which items are delivered directly from the materials handling facility 330 by the AGV 200-1, and for which an AGV (e.g., AGV 200-1 and/or AGV 200-2) may be utilized to deliver an item from the location 508-1 to a location 508-2 (e.g., which may be a user's residence, another business, etc.). In various implementations, a single AGV (e.g., AGV 200-1) may include two or more storage compartments (e.g., see FIG. 2B) and may be utilized to deliver items from the materials handling facility 330 to multiple delivery locations (e.g., the delivery locations 508-1 and 508-2). In such a scenario, the AGV 200-1 may receive items from the materials handling facility 330 that are placed in the first and second storage compartments, according to the different orders. The AGV 200-1 may then deliver the items to the delivery locations 508-1 and 508-2, wherein at the delivery location 508-1 only the first storage compartment may be opened, and at the delivery location 508-2 only the second storage compartment may be opened. In such a configuration where an AGV has multiple storage compartments for delivering multiple orders, a separate access code or other mechanism may be utilized for each of the storage compartments, so that each user may only access or otherwise receive the item(s) that are part of their order. In such a configuration, the AGV 200-1 may be provided with the unique access codes/signals required for entrance to the delivery locations 508-1 and 508-2 (e.g., as a trusted device by the users at each of the respective delivery locations 508-1 and 508-2), as well as a unique access code/signal required for entrance to the materials handling facility 330.

Similarly, the AGV 200-2 may have multiple storage compartments and may deliver items from the AGV facility 510 to the delivery locations 508-1 and 508-2 in a similar manner. In such a configuration, the AGV 200-2 may be provided with the unique access codes/signals required for entrance to the delivery locations 508-1 and 508-2 (e.g., as a trusted device by the users at each of the respective delivery locations 508-1 and 508-2), as well as a unique access code/signal required for entrance to the AGV facility 510. In various implementations, the AGV facility 510 may be associated with a community (e.g., a housing community including the user residences 508-1 and 508-2), along with the AGV 200-2, which may operate as a trusted device and be offered as a service to the residents of the community.

Figure 6:
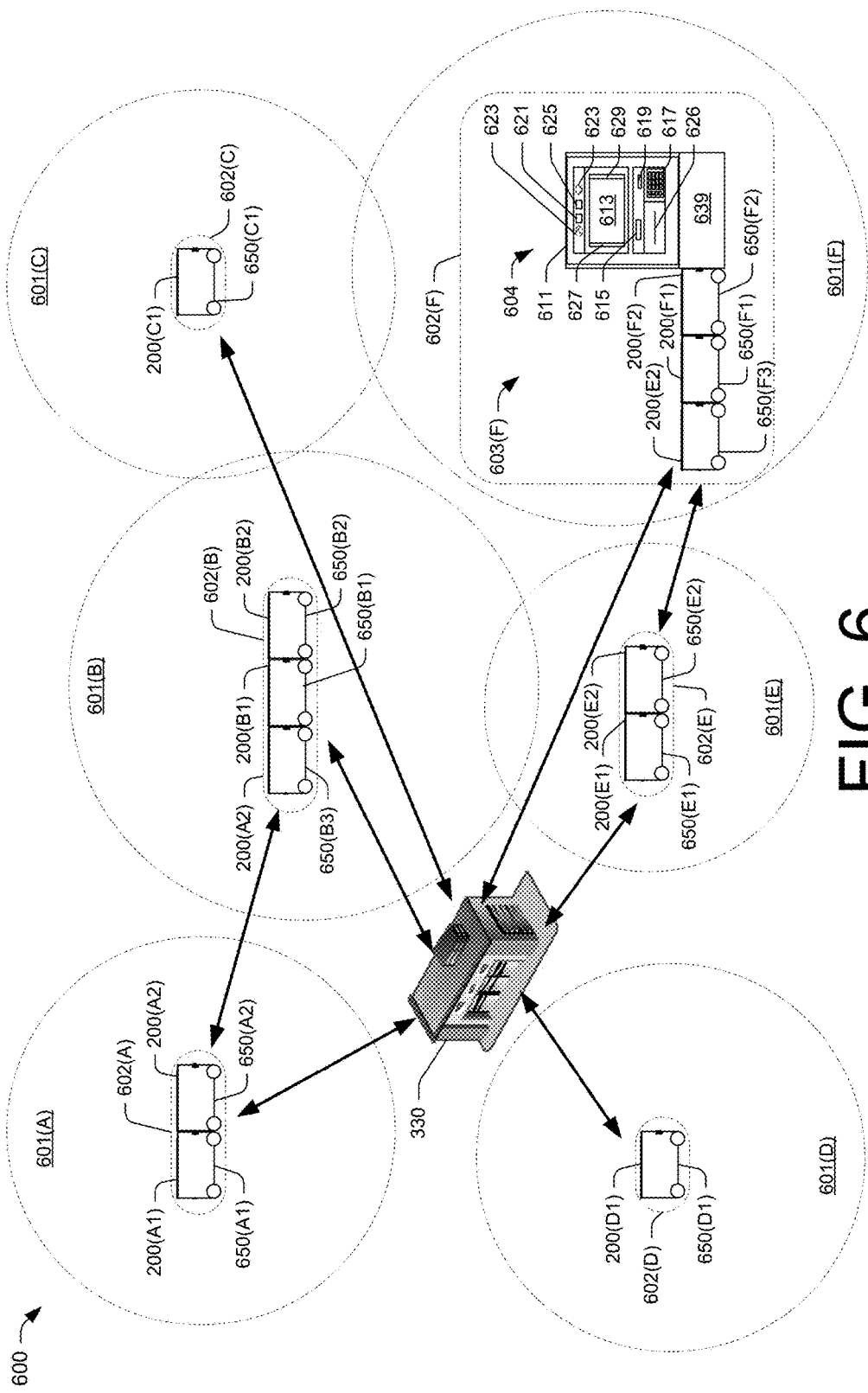
FIG. 6 depicts a block diagram of another autonomous ground vehicle environment, according to some implementations.

FIG. 6 depicts a block diagram of another AGV environment 600, according to some implementations. In the example of FIG. 6, the AGV environment 600 includes geographic regions 601(A)-601(F) that are served by respective distributed pickup areas 602(A)-602(F), each including AGVs. In various implementations, the positions of each of the pickup areas 602(A)-602(F) and the associated AGVs within each of the geographic regions may correspond to locations where the AGVs can safely stop, park and/or congregate for an appropriate period of time. For example, at least some of the pickup areas may be at fixed positions that are determined ahead of time (e.g., including a designated space that is reserved for the AGVs, etc.). As another example, at least some of the pickup areas may be determined dynamically (e.g., depending on available space and preferred locations when the AGV(s) arrive in the area, etc.). In various implementations, pickup areas and/or associated AGVs may also be relocated based on various factors. For example, if a pickup area is determined to no longer have sufficient space for AGVs to safely congregate and/or otherwise perform pickup area operations (e.g., due to crowding by people, other vehicles, etc.), a relocation process may be performed to determine a new pickup area. In various implementations, the pickup areas 602(A)-602(F) may in some instances be associated with or near various locations that may be within the geographic regions and convenient to users (e.g., near transit stations, shopping areas, campuses, residential neighborhoods, next to community mailboxes, next to a sporting event, etc.).

In various implementations, the pickup areas 602(A)-602(F) may include varying numbers of AGVs, which may change over time as the AGVs travel to and from the pickup areas. For example, the pickup area 602(A) may initially include AGVs 200(A1) and 200(A2) (e.g., that have travelled from the materials handling facility 330) in stopping locations 650(A1) and 650(A2), respectively, after which the AGV 200(A2) may travel to the pickup area 602(B), which may then include the AGV 200(A2) in a stopping location 650(B3), as well as AGVs 200(B1) and 200(B2) (e.g., that have travelled from the materials handling facility 330) in stopping locations 650(B1) and 650(B2), respectively. As another example, the pickup area 602(E) may initially include AGVs 200(E1) and 200(E2) (e.g., that have travelled from the materials handling facility 330) in stopping locations 650(E1) and 650(E2), respectively, after which the AGV 200(E2) may travel to the pickup area 602(F), which may then include the AGV 200(E2) in a stopping location 650(F3), as well as AGVs 200(F1) and 200(F2) (e.g., that have travelled from the materials handling facility 330) in stopping locations 650(F1) and 650(F2), respectively. The pickup areas 200(C) and 200(D) are shown to include AGVs 200(C1) and 200(D1), (e.g., that have travelled from the materials handling facility 330), in stopping locations 650 (C1) and 650(D1), respectively.

When an order for one or more items is placed by a user, a shipment set may be assigned to a materials handling facility 330 for fulfillment and delivery. As will be described in more detail below with respect to FIG. 9, a user may select to meet and pick up the item from an AGV, such as AGV 200(A1), that will be at a pickup area 602(A) as a delivery destination (e.g., at either a set or dynamically determined location) within a geographically convenient region 601(A), rather than having the order delivered to their house, apartment, office or other location. This may be convenient to the user if they may not be available when the item would otherwise be delivered, may not want others located at alternative delivery locations to know that they have ordered an item (e.g., a mother may not want a gift for their child delivered to the house) or may not want the item left at an unsecure location (e.g., front porch, mailroom) if they are not present when the item is delivered.

When a user places an order for one or more items, an order planning system may determine if there is an AGV, such as AGV 200(A1), that will be available to travel within a geographic region 601(A) of where the user may wish to have the items delivered/available on the desired date during a desired timeframe. In some instances, a user may designate or preselect preferred pickup areas 602, such as pickup areas 602(A) and 602(B) (e.g., either at set locations or at approximate locations for which the final locations are dynamically determined). For example, a user may designate one pickup area 602(A) as a preferred pickup area near the user's home and a second pickup area 602(B) as a preferred pickup area near the user's work. A user may also designate multiple pickup areas as being acceptable for delivery in case one pickup area is not available (e.g., no available AGVs for travelling to the pickup area), such as designating either of pickup areas 602(A) or 602(B) as being acceptable delivery locations near the user's home.

For an item that has been ordered with a pickup area and associated AGV 200(A1) designated for the delivery, the ordered item may be picked and placed into a storage compartment of the AGV 200(A1) while the AGV 200(A1) is at a materials handling facility 330 or at another source for the item (e.g., from a vendor). Other items associated with other orders may also be picked and placed in other storage compartments of the AGV 200(A1) while the AGV 200(A1) is located at the materials handling facility or other source of items, and then the AGV 200(A1) may begin travel toward the pickup area 602(A) within the corresponding geographic region 601(A). In an instance where an order is to be delivered to the AGV 200(A1) after the AGV 200(A1) has already begun travel and/or reached the pickup area 602(A), the order may be picked into one or more delivery containers, transported to the AGV 200(A1) (e.g., by a transportation vehicle, courier, etc.), and may be placed in a storage compartment of the AGV 200(A1) and made available for retrieval by the user.

AGVs (e.g., which may travel to pickup areas) may also be used to deliver high-volume and/or release day items. A high-volume item may be, for example, an item that is frequently ordered, such as a popular book, shoe, video game, tablet, etc. A release day item may be an item that will become available on the day it is released to the general public (e.g., book, movie, game, toy). For high-volume and/or release day items, they may be picked and placed in storage compartments of various AGVs before the AGVs travel to pickup areas so that the items will be immediately available to users or available for pickup on the release day. In various implementations, certain storage compartments of certain AGVs may be reserved for high-volume and/or release day items and/or any available storage compartments (e.g., in an AGV with multiple storage compartments, as illustrated in FIG. 2B) that have not been filled with user orders may be utilized for the high-volume and/or release day items. For example, when an AGV is ready to travel to a pickup area, any empty storage compartments may be filled with high-volume and/or release day items in case those items are ordered by users. When a user orders one of the high-volume and/or release day items, a storage compartment containing one of those items may be associated with the user's order and the item made immediately available for retrieval by the user. In an AGV with first and second storage compartments and a transfer mechanism (e.g., as described above with respect to FIG. 2A), multiple high-volume and/or release day items may be placed in the first storage compartment, and the transfer mechanism may be utilized to transfer one item at a time to the second storage compartment (e.g., each time after a transaction wherein a user orders and retrieves one of the items from the second storage compartment, etc.).

Each of the AGVs may travel to and remain at a pickup area in the respective geographic regions 601(A)-601(F) for a specified period of time before leaving the pickup area (e.g., to return to a materials handling facility 330, to travel to another pickup area, to travel to a designated delivery location, etc.). For example, on a given date, the AGV 200(A1) may be scheduled to be at the designated pickup area 602(A) from 12:00 noon until 4:00 pm, during which an ordered item may be retrieved by a user from the AGV 200(A1). The AGV 200(A1) may thus be scheduled to travel to the pickup area 602(A) by 12:00 noon, and then leave the pickup area 602(A) at 4:00 pm (e.g., to return to a materials handling facility 330, to travel to another pickup area, to travel to a designated delivery location, etc.). In various implementations, AGVs may in some instances be transported to and/or from various pickup areas or other locations (e.g., by a transportation vehicle 332) rather than utilizing the propulsion portion of the AGV for travel.

In one implementation, when an AGV leaves a pickup area, another AGV may travel to take the place at the pickup area for another timeframe (e.g., from 4:00 pm to 8:00 pm). As illustrated in FIG. 6, multiple AGVs may be at a pickup area at the same time. For a geographic region and/or pickup area with an increasing or decreasing volume of order retrievals by users, a management system 326 may correspondingly increase or decrease the frequency or number of AGVs that travel to the respective pickup areas. The management system 326 may also monitor the patterns of orders by users over time and may adjust the schedules for the AGVs so as to better meet the demand from users (e.g., for preferred order retrieval times). It will be appreciated that the ability of the AGVs to travel to and depart from the pickup areas 602(A)-602(F) supports the ability to easily and quickly expand or remove capacity so that the demand for that pickup area can be satisfied. For example, during the Christmas holiday season, additional AGVs may need to travel to a pickup area to support the increased demand for items ordered by users.

In various implementations, an AGV may also travel to a first geographic region before continuing travel to a second geographic region. For example, as noted above the AGV 200(A2) is shown to travel from the pickup area 602(A) in the geographic region 601(A) to the pickup area 602(B) in the geographic region 601(B), and the AGV 200(E2) is shown to travel from the pickup area 602(E) in the geographic region 601(E) to the pickup area 602(F) in the geographic region 601(F). With respect to the example of the AGV 200(A2), in one implementation, the first and second pickup areas 602(A) and 602(B) may each represent stopping locations where ordered items may be retrieved by users from the AGV 200(A2) during different times of day. In another implementation, the first pickup area 602(A) may represent a stopping location where the AGV 200(A2) receives one or more items (e.g., from a vendor), after which the AGV 200(A2) travels to the pickup area 602(B) where the one or more items may be retrieved by users. For example, produce or refrigerated items may be able to be delivered in a fresher state and/or require less time and/or energy for refrigeration during transport if the items are picked up from one or more vendors in the geographic region 601(A) on the way to the geographic region 601(B). As another example, the AGV 200(A2) may also receive some items from one or more materials handling facilities 330 before travelling to one or more pickup areas (e.g., pickup areas 602(A) and 602(B) in geographic regions 601(A) and 601(B)) to receive additional items (e.g., from one or more vendors), after which it may travel to one or more additional pickup areas (e.g., pickup areas 602(E) and 602(F) in geographic regions 601(E) and 601(F)) where the items may be retrieved by users.

In various implementations, the AGVs at the pickup areas may also be utilized for returns of items by users. For example, a user may place an item that is to be returned into one of the storage compartments of the AGVs. A user may also indicate that they will not be retrieving an ordered item from a storage compartment of an AGV, and that they wish to instead have the item returned. In some instances, a refund or replacement process may be initiated when an item is received or left in the AGV for a return. When the AGV travels back to the materials handling facility 330, the returned item may be removed from the storage compartment and further processed for the return.

In the example of FIG. 6, the pickup area 602(F) is shown to include a pickup area configuration 603(F) that includes a control station 604 to which the AGVs 200(E2), 200(F1) and 200(F2) are coupled (e.g., wirelessly and/or mechanically). The control station 604 includes a user interface 611 and a storage compartment 639. The user interface 611 is configured to receive and provide information to one or more users of the pickup area configuration 603(F) and may include, but is not limited to, a display 613, such as a touch-screen display, a scanner 615, a keypad 617, a biometric scanner 619, an audio transducer 621, one or more speakers 623, one or more image capture devices 625, such as a video camera, and any other types of input or output devices that may support interaction between the pickup area configuration 603(F) and one or more users. For example, the user interface 611 may also include a credit card reader, the ability to accept money (such as cash or coins) and/or the ability to vend items (e.g., stamps, labels, envelopes, shipping packages) using a vending slot 626. Providing the ability for the pickup area configuration 603(F) to accept credit cards and/or money enables the delivery of orders in AGVs and/or to the storage compartment 639 of pickup area configuration 603(F) for which the items are paid for at the time of pickup (e.g. cash on delivery). Likewise enabling vending of items, such as stamps or envelopes, supports the ability for users to utilize a pickup area configuration to ship or deliver goods, as described in more detail below.

In addition to including user input and output devices, the user interface 611 may also include the ability to collect particulates, such as for use in detection of hazardous (e.g., explosives) or banned substances (e.g. drugs). In one implementation, the user interface 611 may include a particulate sensor that includes a forced air ejection component 627 and an air intake component 629. The air ejection component expels air from a left side of the display 613 while a user is interacting with or otherwise within a predetermined range of the display 613. Opposite the air ejection component 627, the air intake component 629 collects the ejected air and any particulates that are collected as the air passes over the display 613 and past the user's hand or fingers as they interact with the display 613. Collected particulates may be scanned or otherwise processed to determine if potentially hazardous or banned substances may be placed into a storage compartment of an AGV or the control station 604 using any known particulate testing technique. If particulates indicating the potential presence of hazardous or banned substances are detected, the control station 604 may determine to not open a storage compartment of an AGV or the control station 604, may alert the authorities, or take other protective actions (such as shutting down the pickup area configuration or performing additional tests). For example, if the air intake component 629 detects hazardous vapor particulates, the control station 604 may contact the appropriate authorities (e.g., police, fire, etc.).

In certain smaller implementations for a pickup area configuration 603(F), the user interface 611 may include more limited features. For example, in one implementation the user interface 611 may include a relatively small display 613 with only a keypad 617 for providing input. In certain other implementations, these and other features may also be eliminated, wherein control of the pickup area configuration 603(F) may primarily be provided remotely. For example, in order to access a storage compartment of an AGV or the control station 604, a user may send or reply to a text message to or from a centralized remotely located control system (e.g., a management system), which controls the pickup area configuration 603(F) to open the storage compartment of the AGV or control station 604 so that the user can retrieve the ordered item.

The control station 604 may include one or more coupling portions configured to provide wired and/or wireless network connectivity with the AGVs, as well as to remote computing resources 310, a management system 326, etc. In various implementations, one or more of the AGVs may be instructed to utilize a coupling portion to couple to the control station 604 after arriving in the pickup area 602(F). In various implementations the control station may include coupling portions similar to and/or compatible with the coupling portions 205S and/or 205P of the AGVs described above with respect to FIGS. 2A-2C. In one configuration, the control station and AGVs may have such coupling portions 205S and/or 205P on multiple sides, such that the AGV 200(F2) may be coupled through such coupling portions to the control station 604, while the AGV(F1) may be coupled through such coupling portions to the AGV 200 (F2), and the AGV 200(E2) may be coupled through such coupling portions to the AGV 200(F1). In various implementations, the coupling portions (e.g., coupling portions 205S and/or 205P) of the control station 604 may provide power and/or communications with the coupled AGVs. In such a configuration, when one AGV departs from the pickup area 602(F) (e.g., to return to the materials handling facility 330), the remaining AGVs may come together to recouple to one another in a similar fashion. In an alternative implementation, rather than physically coupling to each of the AGVs, the control station 604 may wirelessly couple to and/or otherwise communicate with each of the AGVs. Wireless connectivity may be implemented using wireless antennas (not shown), which may provide both receive and transmit functionality. Power and/or network communication with remote computing resources and/or devices may be obtained from a main access point of the control station 604.

The storage compartment 639 of the control station 604 may be of any size or configuration, and in various implementations multiple such storage compartments may be included as part of the control station 604. Similar to the storage compartments of the AGVs (e.g., as described above with respect to FIGS. 2A-2C), the storage compartment 639 may include an automated locking mechanism, image capture device, a motion or presence detection mechanism, temperature sensor, etc. Alternatively, in some implementations the storage compartment 639 may be utilized as an additional user interface. For example, the storage compartment 639 may be removed and the space remaining may be utilized to provide a scale or other type of weight determination component to allow users to weigh items for shipment, determine the cost necessary to ship the item, and pay for shipping using the user interface 611. In various implementations, multiple storage compartments may be included as part of the control station 604 and/or additional storage compartment modules that couple to the control station, etc.

In addition to including storage compartments, power and connectivity coupling portions, as described above with respect to FIGS. 2A-2C, each of the AGVs may also include one or more wireless antennas (not shown) and one or more AGV control systems (e.g., FIG. 16), and/or a simpler computing system such as a printed circuit board, RFID tag, or anything else that may be detectable by the control station 604 and used to identify the AGV. The computing component(s) of each AGV may include a unique identifier of the AGV and configuration information of the storage compartment(s) of the AGVs, which includes dimension information and location information of each storage compartment of each AGV. The AGV control systems may also be configured to control the actuators that enable locking and unlocking of the storage compartments of the AGVs in response to receiving commands or instructions from the control station 604.

In various implementations, a coupled AGV may act as a slave component for the control station 604, receiving instructions (e.g., open storage compartment, close storage compartment, activate image capture device, monitor motion sensor) from a command component of the control station 604 and providing responses (e.g., closed-door, open-door, object/movement detected) to the control station 604. In various implementations, a locking mechanism (e.g., locking mechanism 277 of FIGS. 2A-2C) of each of the AGVs at the pickup area may be controlled by the control station 604, either through wired or wireless communication, to effect locking and unlocking of the associated door (e.g., door 275) of the storage compartment of the AGV. For example, when a user interacts with the control station 604 via the display 613 and provides an access code or other identifier, the control station 604 may identify a specific storage compartment 257 of an AGV associated with the access code or other identifier and the command component may wirelessly send instructions to the AGV to unlock a corresponding storage compartment door 275. The instructions may include a command (e.g., unlock), an address or identifier of the specific storage compartment 257 and any other information necessary for communication between the control station 604 and the AGV. In response to receiving the instructions from the command component, the control system of the AGV may activate a locking mechanism (e.g., that moves the pins of the locking mechanism 277 on the door 275) of the identified storage compartment 257 of the identified AGV such that the pins retract, thereby disengaging the lock of the storage compartment 257 allowing the door 275 to open. In some implementations, the storage compartment 257 may also include a spring mechanism (not shown) such that when the locking mechanism 277 of the storage compartment 257 is disengaged, the spring mechanism propels the door 275 upward, thereby identifying to a user that the door 275 is unlocked and the storage compartment 257 is accessible.

As will be described in more detail below with respect to FIG. 12, the stopping locations 650 within each of the geographic areas 601 may be determined by a process which evaluates various possible stopping locations based on certain criteria. In various implementations, the determinations of the stopping locations 650 may determine where the pickup areas 602 will be (e.g., as including the stopping locations), or the pickup areas 602 may be predetermined in which case the stopping locations may be determined within the predetermined pickup areas. In the example of FIG. 6, the pickup areas 602(A), 602(B), 602(E) and 602(F) are also each meeting areas (e.g., for a meeting of at least two vehicles, in these instances at least two AGVs). As will be described in more detail below with respect to FIG. 13, the positioning of AGVs within a meeting area may also be determined by a process. As one example scenario for a repositioning of an AGV, the AGV 200(F1) may depart from the pickup area/meeting area 602(F) (e.g., to return to the materials handling facility 330 after an item is retrieved from a storage compartment of the AGV 200(F1)). After the AGV 200(F1) departs from the stopping location 650(F1), the AGV 200(E2) may move for repositioning (e.g., may move to the stopping location 650(F1) so as to take the place of the AGV 200(F1) after it has departed). As another example scenario for repositioning, it may be determined for various reasons that the AGVs 200(F1) and 200(E2) should swap positions (e.g., to move the AGV 200(F1) into the stopping location 650(F3) and the AGV 200(E2) into the stopping location 650(F1)). For example, if it determined that the AGV 200(F1) will need to depart sooner that the other AGVs in the pickup area 602(F) (e.g., due to a scheduled pick up from the storage compartment of the AGV 200(F1)), it may advantageous to position the AGV 200(F1) on the outside of the configuration at a time when it is convenient to do so (e.g., as opposed to a later time when the pickup area configuration 603(F) may be in use by one or more users, etc.).

As another example scenario, orders for first and second items may be received from respective first and second users, and the pickup area 602(F) may be determined as the pickup area where the first and second users will retrieve the respective items from respective AGVs. Instructions may be provided for the first and second ordered items to be placed in respective storage compartments of the AGVs 200(F1) and 200(F2) while the AGVs 200(F1) and 200(F2) are at the materials handling facility 330, and for the respective locking mechanisms to lock the respective storage compartments of the AGVs 200(F1) and 200(F2) after the respective items have been placed in the respective storage compartments. Instructions may further be provided for the AGVs 200(F1) and 200(F2) to utilize the respective propulsion portions to travel from the materials handling facility 330 to the pickup area 602(F) and to remain in the pickup area 602(F) for respective first and second designated timeframes during which the respective first and second items may be retrieved by the respective first and second users. In various implementations, the respective first and second designated timeframes may be the same, may be different, may overlap, etc. For example, the first designated timeframe may correspond to a 1 day time window for the first user to retrieve the first item from the AGV 200(F1), while the second designated timeframe may correspond to a 2 day time window for the second user to retrieve the second item from the AGV 200(F2), wherein the respective designated timeframes may or may not overlap.

In various implementations, respective notifications may be sent to the first and second users indicating the pickup area 602(F) and instructions for retrieving the respective first and second items from the respective storage compartments of the AGVs 200(F1) and 200(F2) in the pickup area 602(F), wherein the respective first and second users may be assigned respective first and second access codes to enable access to the respective storage compartments of the AGVs 200(F1) and 200(F2). The instructions may include an action that is to be performed by the respective first and second users when the respective first and second users are in the pickup area 602(F) to enable the respective first and second users to retrieve the respective first and second items. In one implementation, the action may be the input of an access code that is to be entered by the respective user on a user interface of at least one of the respective AGV or the control station 604 of the pickup area 602(F). In another implementation, the action may be performed with a mobile device (e.g., responding to text message, etc.) to enable the respective first or second user to retrieve the respective first or second item.

In various implementations, the respective first and second items may be retrieved in accordance with a receipt of an input (e.g., an entry of the respective first or second access code on a user interface of the respective AGV or otherwise) that indicates that the respective first or second user has arrived in the pickup area 602(F) to retrieve the respective first or second item. In response to the receipt of a respective input, the respective locking mechanism of the respective storage compartment of the respective AGV 200(F1) or 200(F2) may be controlled to unlock the respective storage compartment to enable the respective first or second item to be retrieved from the respective storage compartment by the respective first or second user. In various implementations, the AGVs 200(F1) and 200(F2) may include locator devices (e.g., which are configured to transmit electronic signals, emit various sounds and/or activate lights, etc.) to assist the respective first and second users with locating the respective AGVs 200(F1) and 200(F2) in the pickup area 602(F).

In various implementations, when one of the AGVs 200(F1) or 200(F2) arrives in the pickup area 602(F), a determination may be made (e.g., by a management system and/or by a control system of the AGV, etc.) as to whether one or more other AGVs are already present in the meeting area 602(F). In response to a determination that other AGVs are present, the control system of the AGV may control the propulsion portion to navigate the AGV to be positioned relative to the other AGV(s) in the pickup area according to a designated order (e.g., as will be described in more detail below with respect to FIGS. 7A-7C). In various implementations, an AGV coupling mechanism (e.g., of one of the AGVs) may be utilized to physically couple the AGV 200(F2) to the AGV 200(F1) in the pickup area 602(F) after the respective AGVs 200(F1) and 200(F2) each independently travel to the pickup area 602(F).

In various implementations, the pickup area 602(F) may include the control station 604, and a coupling mechanism may be utilized to couple one or both of the AGVs 200(F1) and 200(F2) to the control station 604. In one implementation, the control station 604 may be configured to communicate with the control system of the AGV 200(F1) to control the locking mechanism to unlock the storage compartment of the AGV 200(F1) in response to an input that is received from the first user at the control station 604. The control station may further be configured to communicate with the control system of the AGV 200(F2) to control the locking mechanism to unlock the storage compartment of the AGV 200(F2) in response to an input that is received from the second user at the control station 604. In various implementations, the input from the first user may include an input of the first access code on the user interface 611 of the control station 604, and the input from the second user may include an input of the second access code on the user interface 611.

Travel instructions may be provided for the AGV 200(F1) to utilize the propulsion portion of the AGV to depart from the pickup area 602(F) in response to either the first item having been retrieved by the first user or the end of the first designated timeframe having been reached, and for the AGV 200(F2) to utilize the propulsion portion of the AGV to depart from the pickup area 602(F) in response to either the second item having been retrieved by the second user or the end of the second designated timeframe having been reached. In various implementations, a determination that an item has not been retrieved from a respective storage compartment by a respective user within a designated timeframe may be made at least in part through utilization of various sensors in the storage compartments to verify the presence and/or absence of items (e.g., as described in more detail above with respect to FIGS. 2A-2C). In various implementations, the AGVs may utilize the propulsion portions of the AGVs to travel from the pickup area 602(F) to different types of locations. For example, the AGVs may return to the materials handling facility 330 or may travel to a different materials handling facility. As another example, if the respective first or second items have not been retrieved within the respective designated timeframes, the respective AGVs 200(F1) or 200(F2) may travel to a different pickup area (e.g., where the respective users may travel to retrieve the respective items), or may travel to a respective delivery location to deliver the respective first or second item to the respective first or second user (e.g., as a premium service or other service provided when a respective user is unable to travel to the pickup area 602(F) within the respective designated timeframe to retrieve the item, etc.).

In an implementation where the AGV 200(F1) includes a second storage compartment, a third order may be received from a third user for a third item that is to be retrieved from a second storage compartment of the AGV 200(F1), wherein the third item may be placed in the second storage compartment while the AGV 200(F1) is at the materials handling facility 330. A notification may be sent to the third user indicating the pickup area 602(F) and that the third item may retrieved from the second storage compartment of the AGV 200(F1) in the pickup area 602(F) within a designated timeframe (e.g., which may be the same timeframe that is provided to the first user for retrieving the first item from the first storage compartment of the AGV 200(F1)). The notification to the third user may include instructions for retrieving the third item from the second storage compartment of the AGV 200(F1) in the pickup area 602(F), wherein the third user is assigned a third access code to enable access to the second storage compartment of the AGV 200(F1). When the third user arrives in the pickup area 602(F), an input may be received from the third user that indicates the third user has arrived in the pickup area to retrieve the third item that is stored in the second storage compartment of the AGV 200(F1). In response to the input that is received, the respective locking mechanism may be controlled to unlock the second storage compartment of the AGV 200(F1) to enable the third item to be retrieved from the second storage compartment by the third user.

Figure 7A:
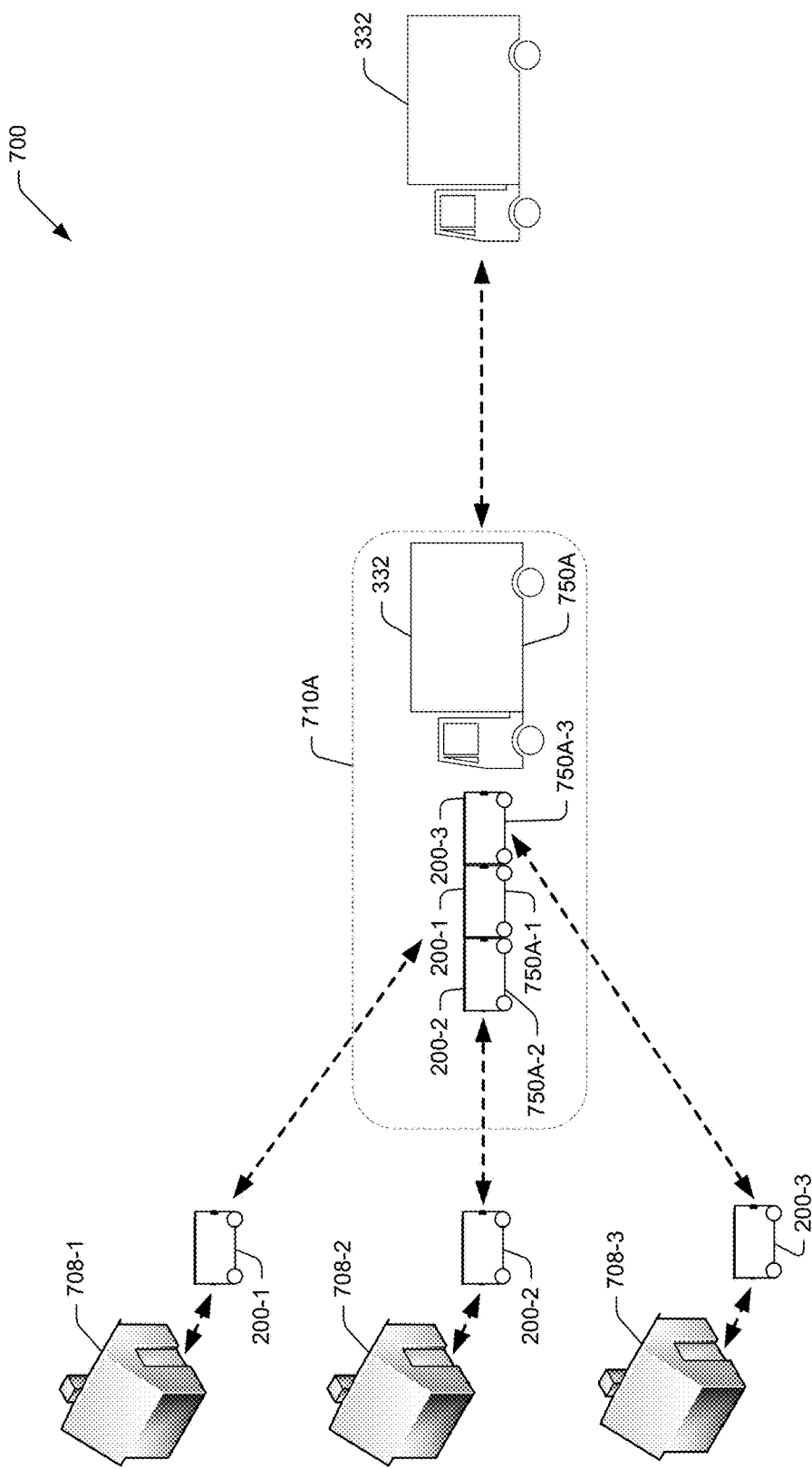
FIGS. 7A-7C depict block diagrams of another autonomous ground vehicle environment, according to some implementations.
Figure 7B:
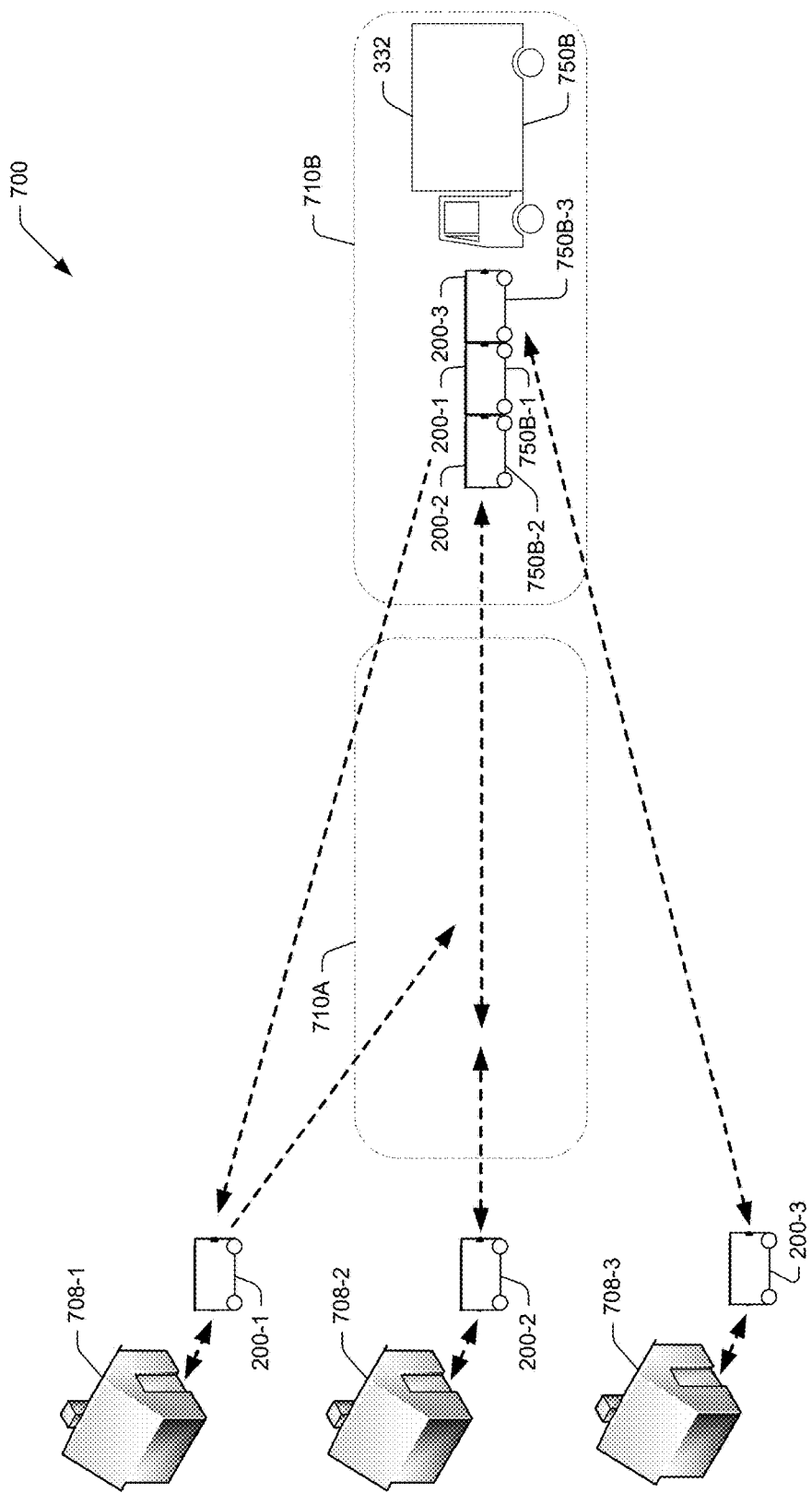
Figure 7C:
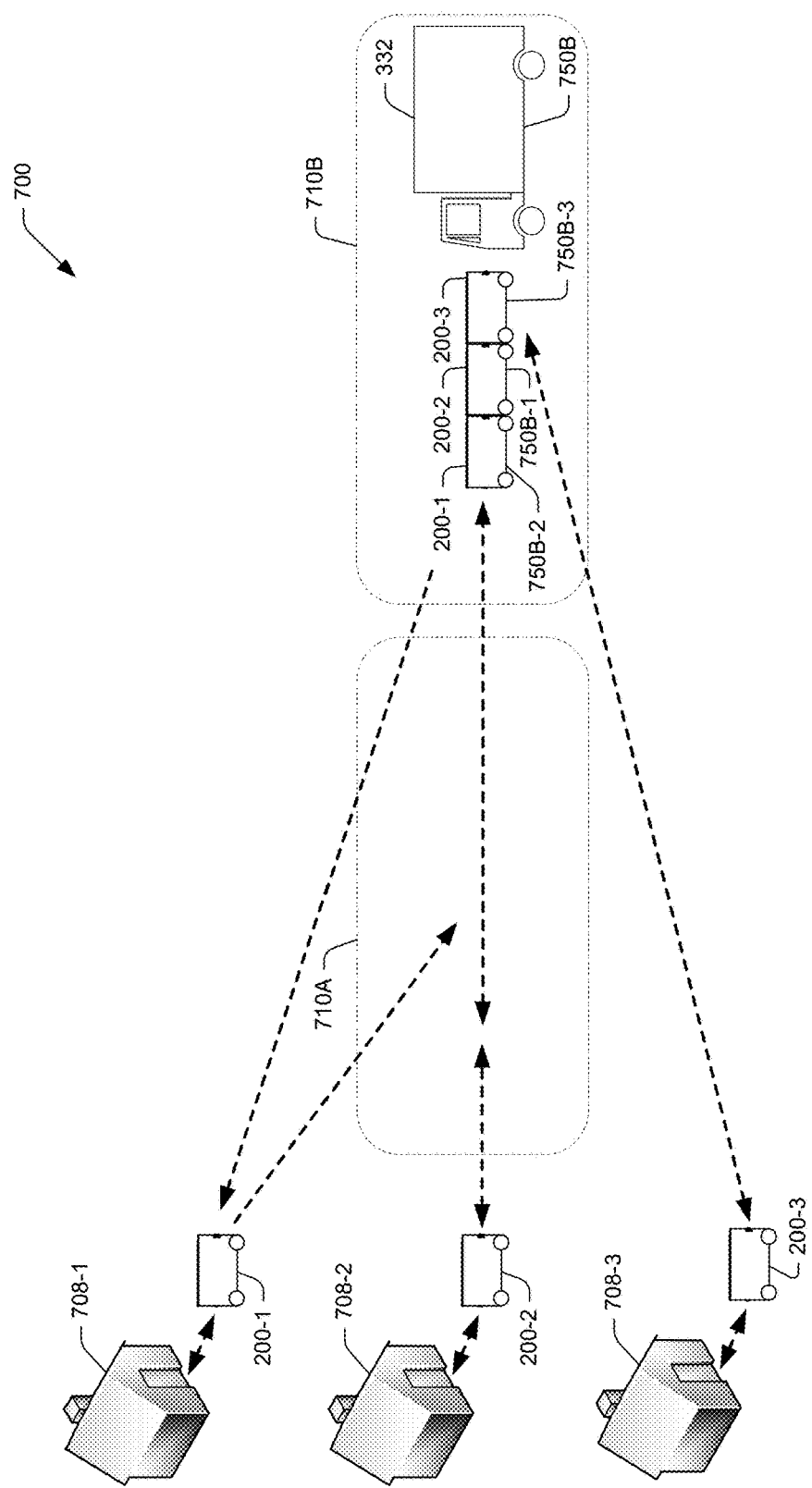

FIGS. 7A-7C depict block diagrams of another AGV environment 700, according to some implementations. In the example of FIG. 7A, three delivery locations 708-1, 708-2 and 708-3 in a delivery area are illustrated (e.g., corresponding to user residences, etc.), which may also correspond to home base locations for three AGVs 200-1, 200-2 and 200-3. In one example scenario, a transportation vehicle 332 travels (e.g., from a materials handling facility) with items to a stopping location 750A in a meeting area 710A. The AGVs 200-1, 200-2 and 200-3 may control respective propulsion portions to navigate along respective travel paths from respective home base locations (e.g., corresponding to the respective delivery locations 708-1, 708-2 and 708-3 at the respective user residences) to respective stopping locations 750A-1, 750A-2 and 750A-3 within the meeting area 710A. In the meeting area 710A, the AGVs 200-1, 200-2 and 200-3 acquire respective items from the transportation vehicle 332, and follow respective travel paths back to the respective delivery locations 708-1, 708-2 and 708-3. As described above with respect to FIGS. 2A-2C, the AGVs 200-1, 200-2 and 200-3 may include storage compartments with locking mechanisms, control systems to control the locking mechanisms, propulsion portions, etc.

In various implementations, the stopping location 750A and/or the meeting area 710A that the transportation vehicle 332 is travelling to for meeting the AGVs 200-1, 200-2 and 200-3 may be determined in various ways. For example, the stopping location 750A and/or meeting area 710A may be determined according to a notification that is received from a management system 326 or remote computing resource that indicates the meeting area. As another example, the transportation vehicle 332 may follow a scheduled delivery route for which the stopping location 750A and/or meeting area 710A may be determined according to a scheduled stop of the transportation vehicle 332 at a particular time. As another example, coordination may be performed between the transportation vehicle 332, management system 326, and/or AGVs 200 to determine the stopping location 750A and/or meeting area 710A. Various processes for determining stopping locations and positioning of AGVs within meeting areas are also described in more detail below with respect to FIGS. 12 and 13. In various implementations, once the stopping location 750A and/or meeting area 710A is determined, the AGVs 200-1, 200-2 and 200-3 may each receive messages or otherwise be instructed to receive one or more items from the transportation vehicle 332 in the meeting area 710A, wherein the items are to be delivered by the AGVs from the stopping location 750A in the meeting area 710A to the respective delivery locations 708-1, 708-2 and 708-3 at the respective user residences.

Such messages or instructions may indicate a time when the transportation vehicle 332 is expected to arrive at the stopping location 750A and/or meeting area 710A. The AGVs 200-1, 200-2 and 200-3 may begin travel toward the meeting area 710A far enough in advance so as to arrive before or at the same time as the transportation vehicle 332. In various implementations, the AGVs 200-1, 200-2 and 200-3 may congregate in specified patterns or arrangements at the meeting area 710A (e.g., in the stopping locations 750A-1, 750A-2 and 750A-3). For example, the AGVs 200-1, 200-2 and 200-3 may line up at the meeting area 710A in a particular order, which may simplify the transfer of items from the transportation vehicle 332 to the AGVs 200-1, 200-2 and 200-3. The AGVs 200-1, 200-2 and 200-3 may also include markings or other identifying symbols or devices (e.g., lights, sounds, etc.) for simplifying the identification and transfer of corresponding items from the transportation vehicle 332 to the AGVs.

In one example scenario, the items in the transportation vehicle 332 may be arranged in an order that corresponds to the order of the addresses of the delivery locations, such as the items for the AGVs 200-1, 200-2 and 200-3 being arranged in order in first, second and third positions, and the AGVs 200-1, 200-2 and 200-3 correspondingly being positioned in that order in the meeting area. In another example scenario, the items in the transportation vehicle 332 may be arranged in an order that does not correspond to the order of the delivery addresses, such as when an item for the AGV 200-3 is in a first position, an item for the AGV 200-1 is in a second position, and an item for the AGV 200-2 is in a third position (e.g., wherein the first, second and third positions are in order on a shelf or otherwise in order as arranged in the transportation vehicle 332). In accordance with this order of the items in the transportation vehicle 332, the AGVs may be directed to be positioned in the meeting area 710A in an arrangement such as that shown in FIG. 7A, wherein the AGVs are in an order of the AGV 200-3 first, the AGV 200-1 second, and the AGV 200-2 third (e.g., relative to the transportation vehicle 332). As noted above, the positioning/arrangement of the AGVs in this order may simplify the transferring of the items from the transportation vehicle 332 to the AGVs (e.g., wherein the items may be transferred to the AGVs in the same order that the items are arranged on the transportation vehicle 332). Such an order may be determined based on various factors (e.g., based on priority of delivery, according to an order in which items were received from various vendors, etc.).

In various implementations, when an AGV arrives in a meeting area, a determination may be made (e.g., by a management system and/or by a control system of the AGV, etc.) as to whether one or more other AGVs are already present in the meeting area. For example, various sensors of the AGV may be utilized to provide sensed data indicating the presence of one or more other AGVs. As another example, the AGV may include a network interface wherein a management system and/or other AGVs may indicate the presence of other AGVs (e.g., according to GPS data, reported positions, etc.). In response to a determination that other AGVs are present, the control system of an AGV may control the propulsion portion to position the AGV relative to the one or more other AGVs in the meeting area according to a determined arrangement of the AGVs (e.g., as described above). In various implementations, communication may be received through the network interface of the AGV (from a management system, other AGVs, a transportation vehicle, etc.) that indicates the determined arrangement of the AGVs. After the AGV is in the determined arrangement, the control system of the AGV may receive an instruction and/or may otherwise determine that the AGV is to be repositioned relative to the one or more other AGVs in the meeting area, and in response thereto may control the propulsion portion to reposition the AGV.

While the AGV is positioned in the meeting area, a determination may be made (e.g., by the control system of the AGV, by a management system, etc.) as to when an item has been placed in the storage compartment of the AGV (e.g., as received from the transportation vehicle, etc.). In response to an item having been placed in the storage compartment, the control system of the AGV may control the propulsion portion to navigate the AGV along a travel path from the meeting area to a delivery location to deliver the item. Once at the delivery location, the control system of the AGV may receive an input of an access code and/or may otherwise be instructed to unlock the storage compartment of the AGV so that the item may be removed (e.g., by a user, by an item engagement mechanism, etc.) from the storage compartment at the delivery location.

As will be described in more detail below with respect to FIG. 11, as part of the travel from the home base locations to the meeting area, and from the meeting area to the delivery locations (e.g., which may be the same as the home base locations), the AGVs 200-1, 200-2 and 200-3 may encounter various obstacles and/or access barriers (e.g., doors, gates, etc.) The AGVs 200-1, 200-2 and 200-3 may be enabled with navigation capabilities for navigating around obstacles and for utilizing access mechanisms for opening or otherwise gaining access past access barriers (e.g., to allow an AGV to bring an item and/or storage compartment into a user's residence as instructed by the user). In various implementations, additional navigation may also be required when a home base location is not the same as a delivery location. For example, a home base location may be on the front porch of a user's residence, and once an item is acquired, a user may want the AGV to bring the item and/or storage compartment to a delivery location inside the user's residence (e.g., requiring navigation through a door or other access point of the user's residence). Once the item and/or storage compartment has been delivered from the AGV (e.g., as retrieved by the user from the AGV, or as otherwise removed from the AGV by a robotic arm of the AGV or residence, etc.), the AGV may be instructed to return to the home base location (e.g., requiring navigation back out a door or other access point of the user's residence so as to return to the front porch, etc.). In various implementations, the AGV may include an access mechanism that is configured to transmit a signal, or otherwise include an identification mechanism to cause the access barrier (e.g., a door, etc.) to be opened or otherwise unlocked to allow the AGV to navigate through or otherwise past the access barrier.

In a different example scenario, rather than the AGVs 200-2 and 200-3 both being utilized to deliver the ordered items to the delivery locations 708-2 and 708-3, a single AGV (e.g., AGV 200-2) may include two or more storage compartments (e.g., see FIG. 2B) and may be utilized to deliver the items. In such a scenario, the AGV 200-2 may travel to the meeting area 710A and may receive items that are placed in the first and second storage compartments, according to the different user orders. The AGV 200-2 may then deliver the items to the delivery locations 708-2 and 708-3, wherein at the delivery location 708-2 only the first storage compartment may be opened, and at the delivery location 708-3 only the second storage compartment may be opened. In such a configuration where an AGV has multiple storage compartments for delivering multiple orders, a separate access code or other mechanism may be utilized for each of the storage compartments, so that each user may only access or otherwise receive the item(s) that are part of their order.

In various implementations, AGVs may be utilized for different types of transactions (e.g., as facilitated by the management system 326, etc.). For example, if a user at a location 708-1 wishes to advertise and sell an item to a user who is at a location 708-2, an AGV (e.g., AGV 200-1 and/or AGV 200-2) may be utilized to transport the item from the location 708-1 to the location 708-2 (e.g., without requiring any direct human contact or interaction). As another example, a location 708-1 may be a business (e.g., a corner grocery store, a restaurant, an office supply store, etc.) for which an AGV (e.g., AGV 200-1 and/or AGV 200-2) may be utilized to deliver an item from the location 708-1 to a location 708-2 (e.g., which may be a user's residence, another business, etc.).

FIG. 7B illustrates an example in which the meeting area and corresponding stopping locations have been relocated. In various implementations, a stopping location and/or meeting area may be relocated for various reasons. As an example, a determination may be made that a group of AGVs that have congregated to meet a transportation vehicle may be able to move to a closer and/or more convenient meeting area for meeting with the transportation vehicle, in which case relocation may be implemented. As another example, a planned meeting area may not have sufficient space and/or stopping locations for either the AGVs and/or the transportation vehicle as the vehicles arrive (e.g., a previously available parking location may have been taken, a sidewalk may have become crowded, etc.), in which case relocation may be required. As another example, a parking time limit may have expired in a first stopping location, requiring relocation to a second stopping location.

In the example of FIG. 7B, the AGVs 200-1 and 200-2 have initially travelled to the stopping locations 750A-1 and 750A-2 in the meeting area 710A, and have since relocated to new respective stopping locations 750B-1 and 750B-2 in a new meeting area 710B. In various implementations, such a relocation may have been performed before the AGV 200-3 and/or the transportation vehicle 332 arrived. For example, while the AGVs 200-1 and 200-2 were waiting, the stopping location for the AGV 200-3 and/or the stopping location 750A for the transportation vehicle 332 (e.g., a parking location) may have been taken, and/or the meeting area 710B may have been determined to have been preferable (e.g., more convenient, closer, etc.) relative to the travel path of the transportation vehicle 332 and/or AGV-200-3, for which the AGVs 200-1 and 200-2 may have relocated to the stopping locations 750B-1 and 750B-2 in the meeting area 710B. In the meeting area 710B, after the AGV 200-3 arrives, it stops in a stopping location 750B-3, and after the transportation vehicle 332 arrives, it stops (e.g., parks) in a stopping location 750B, from which items may be provided to the AGVs 200-1, 200-2 and 200-3 for delivery to the respective delivery locations 708-1, 708-2 and 708-3.

FIG. 7C illustrates an example in which certain of the AGVs have been repositioned in the meeting area 710B. More specifically, after arriving at the meeting area 710B and occupying the stopping locations 750B-1 and 750B-2 (e.g., as illustrated in FIG. 7B), the AGVs 200-1 and 200-2 have moved to be repositioned in the stopping locations 750B-2 and 750-B1, respectively (e.g., thus effectively swapping positions). In various implementations, such maneuvers may be performed for various reasons. For example, the AGV 200-2 may be receiving an item that requires more urgent delivery than the item being received by the AGV 200-1 (e.g., such as may have been determined while the transportation vehicle 332 was in transit, etc.) for which the AGV 200-2 may be moved to a position (e.g., to the stopping location 750B-1) to receive the item from the transportation vehicle 332 sooner. As another example, the order of items in the transportation vehicle 332 may have changed and/or been more recently determined, such as having been recently received from a vendor while the transportation vehicle 332 was in transit, etc., for which the new arrangement of the AGVs at the meeting area 710B may correspond to the order of the items in the transportation vehicle 332 (e.g., as described above with respect to FIG. 7A).

In various implementations, a management system (e.g., including centralized and/or distributed elements, such as remote computing resources, control systems of AGVs and/or transportation vehicles, cloud based elements, etc.) may at least partially monitor, coordinate and/or direct, etc. the transportation of items by AGVs, transportation vehicles, etc. With respect to the examples of FIGS. 7A-7C as described above, a management system and/or the vehicles may determine a meeting area 710 (e.g., meeting area 710A and/or 710B) in which the AGVs 200-1, 200-2 and 200-3 will meet the transportation vehicle 332. Each of the AGVs 200-1, 200-2 and 200-3 may travel (e.g., from respective home base locations at respective user's residences 708-1, 708-2 and 708-3) to respective stopping locations (e.g., stopping locations 750A-1, 750A-2, 750A-3, or stopping locations 750B-1, 750B-2, 750B-3, etc.) in an arrangement in the meeting area 710 ahead of when the transportation vehicle 332 is to arrive in the meeting area 710. The stopping locations may correspond to the positions of the AGVs 200-1, 200-2 and 200-3 in the meeting area, and the positions/stopping locations of the AGVs 200-1, 200-2 and 200-3 in the meeting area may be coordinated so that the AGVs 200-1, 200-2 and 200-3 are arranged in a designated order in the meeting area 710. After arriving in the meeting area, an AGV may utilize a coupling portion to couple to another AGV and/or docking station in the meeting area (e.g., for recharging, communications, security, etc.).

As noted above, in various implementations, the designated order of the AGVs in the meeting area may correspond to an order of delivery addresses of the respective delivery locations 708-1, 708-2 and 708-3, or may not correspond to an order of delivery addresses of the respective delivery locations (e.g., as instead corresponding to an order of items as arranged in the transportation vehicle, etc.). In various implementations, the positions of the AGVs 708-1, 708-2 and 708-3 in the meeting area 710 may be adjacent to one another, or may be separated by various distances, etc. In various implementations, one or more AGVs may be instructed to change positions in the meeting area 710 before the transportation vehicle 332 arrives (e.g., as described above with respect to FIG. 7C and the positions of the AGVs 200-1 and 200-2). In various implementations, the meeting area 710 may be determined based at least in part on a determination that a stopping location 750 (e.g., a parking location 750A or 750B) is available for the transportation vehicle 332 in the meeting area 710 and/or that one or more stopping locations for the AGVs are available in the meeting area 710 (e.g., as adjacent to the parking location, etc.). In one instance, the determination that a parking location is available may be based at least in part on receiving an indication from one of the AGVs 200-1, 200-2 or 200-3 that the parking location is available.

After the transportation vehicle 332 arrives in the meeting area 710, each of the AGVs 200-1, 200-2 and 200-3 may be instructed to receive at least one respective item from the transportation vehicle 332. Each of the AGVs 200-1, 200-2 and 200-3 may be instructed to transport the respective items from the meeting area 710 to the respective delivery locations 708-1, 708-2 and 708-3. In various implementations, various notifications may be sent (e.g., after the AGVs receive the items from the transportation vehicles, after the items are delivered, etc.). For example, a notification may be sent to a user who ordered an item, indicating that the AGV has received the item from a transportation vehicle, and an expected delivery time and/or an identification of the item (e.g., wherein the notification includes a picture of the item, or a description of the item, etc.).

FIG. 8 depicts a block diagram of another AGV environment 800, according to some implementations. As shown in FIG. 8, in response to a receipt of an order for an item, an AGV 200 may be instructed to follow a travel path to a delivery location 808 (e.g., corresponding to a user's residence) with the ordered item contained in a storage compartment portion 202. As described above with respect to FIGS. 2A-2C, the AGV 200 may be modular, wherein the storage compartment portion 202 (e.g., including a door with a locking mechanism) may be separated (e.g., decoupled) from the propulsion portion 201. In the example of FIG. 8, the AGV 200 delivers the storage compartment portion 202 to the delivery location 808, and then continues (e.g., as instructed) along a travel path away from the delivery location 808 utilizing the propulsion portion 201 of the AGV 200.

In one implementation, at a location prior to the delivery location 808, the propulsion portion 201 of the AGV 200 may be directed to be coupled to the storage compartment portion 202 to enable the AGV 200 to transport the storage compartment portion 202 to the delivery location 808. In various implementations, various securing configurations may be utilized with respect to the coupling (e.g., attachment/detachment, etc.) of the storage compartment portion 202 to the propulsion portion 201. For example, a coupling portion (e.g., FIGS. 2A-2C) for coupling the storage compartment portion 202 to the propulsion portion 201 may include various types of securing components (e.g., utilizing magnetic components, latching components, etc.). As another example, the storage compartment portion 202 may be securely coupled to the propulsion portion 201 such that an access code may be required to remove the storage compartment portion 202 from the propulsion portion 201. In various implementations, the delivery location 808 may include a docking station and/or other facilities with coupling portions that allow the storage compartment portion 202 to be securely coupled, docked and/or otherwise securely attached at the delivery location 808, wherein an access code may be required to remove the storage compartment portion 202 from the docking station. In various implementations, a coupling portion of the docking station and/or propulsion portion 201 may also provide electricity and/or communications to/from the storage compartment portion 202. In various implementations, an access code may also or alternatively be required for unlocking and/or opening a door (e.g., a lid) of the storage compartment portion 202.

In one example scenario, a control system of the AGV 200 may control the propulsion portion 201 (e.g., as instructed) to navigate the AGV along a travel path to the delivery location 808, wherein the item for delivery is contained in the storage compartment portion 202 that is coupled to the propulsion portion 201. In various implementations, the AGV 200 may include an access mechanism and the AGV 200 may be instructed to utilize the access mechanism to navigate past an access barrier to deliver the storage compartment portion 202 to the delivery location 800. For example, the access barrier may be a door, gate, etc., and the access mechanism may be utilized to wirelessly transmit a signal that causes the access barrier to open.

In various implementations, the storage compartment portion 202 may include various electronic components (e.g., sensors, a cooling mechanism that refrigerates the storage compartment portion, etc.). In various implementations, a coupling portion may provide electronic coupling between the storage compartment portion 202 and a control system of the AGV (e.g., to enable electronic communication between electronic components of the storage compartment portion 202 and the control system). For example, the various sensors, user interface, etc. of the storage compartment portion 202 may be able to communicate with the control system of the AGV as coupled through the coupling portion. In one implementation, a sensor 204 (FIGS. 2A-2C) of the storage compartment portion 202 (e.g., which may have a higher field of view than the propulsion portion 201) may be utilized by the control system of the AGV for navigation along the travel path to the delivery location.

The control system of the AGV may receive an access code and/or other instructions once the AGV 200 arrives at the delivery location 808 (e.g., as input on a user interface of the AGV, as received from a remote computing resource, etc.). In response to the receipt of the access code and/or other instructions, the control system may control a coupling portion to decouple the storage compartment portion 202 from the propulsion portion 201 to enable the storage compartment portion 202 to be delivered to the delivery location 808. As described above with respect to FIGS. 2A-2C, in various implementations, the AGV and/or delivery location 808 may include one or more movement mechanisms (e.g., rollers, actuators, mechanical arms, etc.) configured to move the storage compartment portion 202 relative to the propulsion portion 201 after the storage compartment portion 202 is decoupled from the propulsion portion 201.

In various implementations, the delivery to the delivery location 808 may include one or more additional procedures (e.g., the delivery location 808 may be inside a user's residence and the AGV may be instructed to travel inside the user's residence to deliver the storage compartment portion 202, etc.). Once the storage compartment portion 202 has been delivered to the delivery location 808, the propulsion portion 201 may depart (e.g., as instructed) from the delivery location 808 without the storage compartment portion 202. In various implementations, notifications may be sent regarding the delivery of the storage compartment portion 202 to the delivery location 808 (e.g., a notification may be sent to a user when the storage compartment portion 202 has been delivered to a delivery location 808 at a user's residence, etc.). In various implementations, the propulsion portion 201 may travel to different types of locations from the delivery location 808. For example, the propulsion portion 201 may travel to an AGV facility (FIG. 5), a materials handling facility, a home base location for the AGV, a meeting area for meeting a transportation vehicle that will further transport the AGV, and/or a location where another storage compartment portion is to be coupled to the propulsion portion, etc.

In various implementations, storage compartment portions 202 may consist of various types of containers that may continue to function in certain capacities after the storage compartment portion 202 is separated from the propulsion portion 201. For example, some storage compartment portions 202 may include containers that are insulated and/or otherwise temperature regulated for containing hot items, cold items, etc. In configurations where the temperatures are electronically regulated, the storage compartment portion 202 may include a power module and/or may be electronically coupled at the delivery location (e.g., through a docking station, etc.). In various implementations, a user may be provided with different options for customizing a storage compartment portion 202 (e.g., which may be owned or otherwise regularly used by the user, etc.). For example, a user may be provided with options for selecting different styles or configurations of storage compartment portions and/or a user may be enabled to customize (e.g., decorate or otherwise modify) a storage compartment portion 202.

Figure 9:
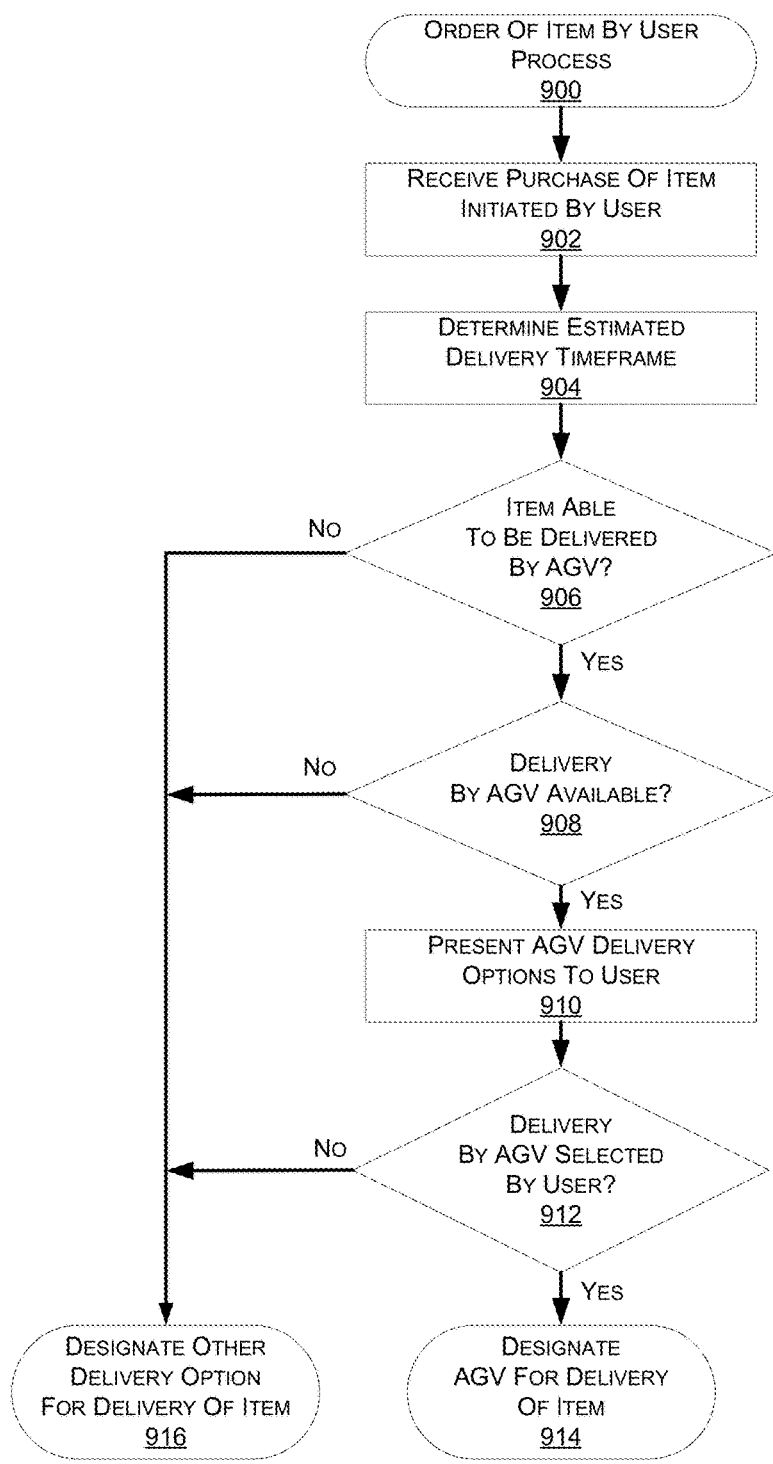
FIG. 9 is a flow diagram illustrating an example process for processing a user order for an item, according to some implementations.

FIG. 9 is a flow diagram illustrating an example process 900 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 900 begins with the receipt of a purchase request initiated by a user, as in 902. Upon receiving a purchase request for an item from a user, a determination is made as to the estimated delivery timeframe for that item, as in 904. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of the purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

After the estimated delivery timeframe is determined, a determination is made as to whether the item is able to be delivered by an AGV, as in 906. In various implementations, AGVs may have transportation limitations and/or restrictions related to size, weight, hazardous materials, travel areas, terrain, etc. for delivering items. For example, an item may need to be no larger than a specified size to be able to fit within a storage compartment of an AGV. As another example, AGVs may have restrictions regarding transportation of various types of hazardous materials, etc., for which delivery may not be available for certain types of items. If it is determined that the item is able to be delivered by an AGV, a determination is made as to whether a delivery by an AGV is available, as in 908. If it is determined that a delivery by an AGV is available, the available AGV delivery options are presented to the user, as in 910. In various implementations, different types of AGV delivery options may be available. For example, a delivery vehicle may be available that is able to transport an AGV with the item to a delivery area and to stop at a location from which the AGV can depart (e.g., along with other AGVs for other deliveries) and from which the AGV can transport the item to the delivery location (e.g., at the user's residence). As another example, an AGV may be stationed at a home base location (e.g., at a user's residence) and a delivery vehicle may be available that can transport the item to a meeting area with the AGV and transfer the item to the AGV for the delivery to the delivery location. As another example, an AGV may be available that can transport the item from a materials handling facility directly to the delivery location. As another example, an AGV may be available that can deliver the item from a materials handling facility to a meeting/pickup area where the user will go to retrieve the item from the AGV.

After the AGV delivery options are presented to the user, a determination is made as to whether a delivery by AGV is selected by the user, as in 912. In various implementations, an interaction may be received from a user through a user interface that presents delivery options to the user and receives a selection from the user (e.g., for selecting a delivery by AGV or other delivery option). In addition, in various implementations a user may preselect or provide a preference for deliveries by an AGV or other delivery options. If a delivery by AGV is selected by the user, the delivery by AGV is designated as the delivery option for the item, as in 914.

If it is determined that a delivery by AGV is not selected by the user, as in 912, or if delivery by AGV is not available, as in 908, or if the item is not able to be delivered by an AGV, as in 906, another type of delivery option is designated (e.g., as selected by the user) for the item, as in 916. In various implementations, other delivery options may include traditional carrier deliveries, providing an item at a pickup area where a user may retrieve the item, etc.

Figure 10:
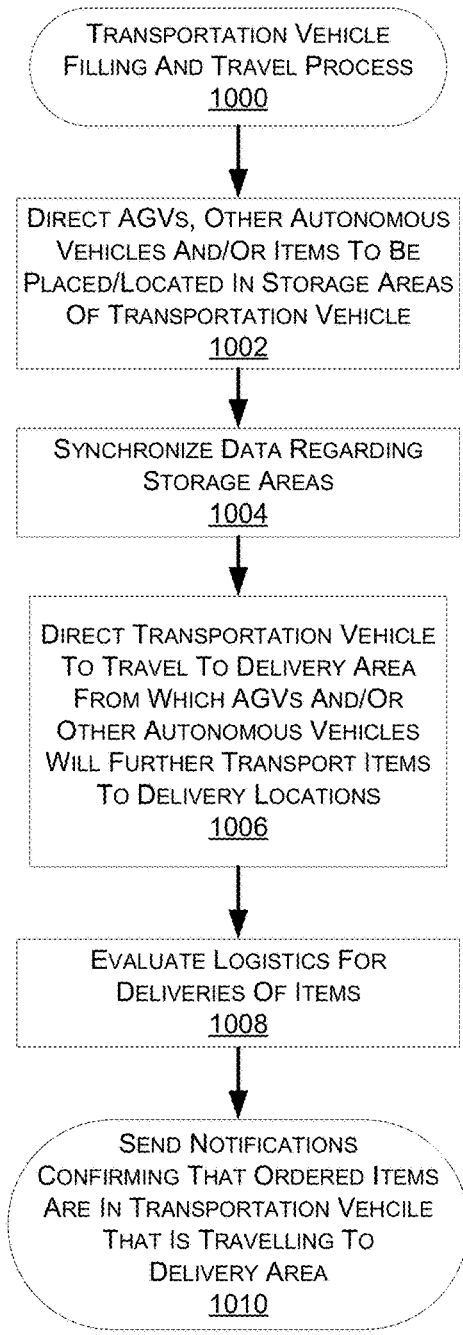
FIG. 10 is a flow diagram illustrating an example process for filling and travel of a transportation vehicle, according to some implementations.

FIG. 10 is a flow diagram illustrating an example process 1000 for filling a transportation vehicle and travelling to a location. The example process begins by directing items, AGVs and/or other autonomous vehicles to be placed/located in storage areas of the transportation vehicle, as in 1002. For example, as described above with respect to FIG. 1, for items that have been ordered with AGVs designated for the deliveries, in one implementation a materials handling facility may pick and place the ordered items directly into storage areas (e.g., bins) of the transportation vehicle and/or storage compartments of AGVs (e.g., which may be carried by the transportation vehicle). As another example, in addition or as an alternative to receiving items at a materials handling facility, the transportation vehicle may also travel to a receiving area or location for receiving items (e.g., from a merchant, vendor, etc.) before travelling to a delivery area from which the items may be further transported by the AGVs and/or other autonomous vehicles to delivery locations, etc.

After the items, AGVs and/or other autonomous vehicles have been placed/located in the storage areas of the transportation vehicle, data may be synchronized regarding the storage areas, as in 1004. In various implementations, at least some of the data that is synchronized may be generated as the items are placed into the storage areas of the transportation vehicle and/or storage compartments of AGVs or other autonomous vehicles. For example, as described above with respect to FIG. 1, the transportation vehicle, individual storage areas (e.g., bins), AGVs and/or storage compartments may include unique identifiers, such as a bar code, QR code, unique number, etc., to enable tracking, identification and association of items placed into the storage areas and/or storage compartments. Scanning of the identifiers for the storage areas/storage compartments and the picked items may result in the items becoming associated with the storage areas/storage compartments and tracked with the transportation vehicle, AGVs and/or other autonomous vehicles. In various implementations, the associated data may be synchronized among computing systems of the transportation vehicle, the AGVs, the other autonomous vehicles, the management system, and/or other systems.

After the data has been synchronized, the transportation vehicle is directed to travel to a delivery area from which the AGVs and/or other autonomous vehicles will further transport the items to delivery locations, as in 1006. As described above with respect to FIG. 3, a delivery area may be defined which includes delivery locations where items are to be delivered. In an implementation where the transportation vehicle is carrying AGVs, deliveries to the delivery locations may be performed by the AGVs that are deployed from the transportation vehicle (e.g., as directed by a management system, the transportation vehicle, the AGVs, etc.). In various implementations, one or more AGVs that are transported by the transportation vehicle may have items for delivery placed in the storage compartments of the AGVs (e.g., while at a materials handling facility, while in the transportation vehicle, after having deployed from the transportation vehicle, etc.). One or more AGVs that are deployed from the transportation vehicle may also be instructed to travel to a receiving location to acquire an item for delivery (e.g., from a vendor, user, etc.), and then to travel from the receiving location to a delivery location to deliver the item. As described above with respect to FIGS. 7A and 7B, an AGV that is based near a delivery location (e.g., at user's residence) may begin travel toward a meeting area in the delivery area ahead of time so as to arrive at the meeting area before or at the same time as the transportation vehicle.

Once the transportation vehicle is in transit or has reached the delivery area, logistics for the deliveries of the items are evaluated, as in 1008. In various implementations, the evaluation of the logistics may include evaluating various types of factors. For example, the number of AGVs that are in the transportation vehicle and/or otherwise expected to be available, as well as travel times, etc. may be related to the timing/speed with which the deliveries may be made. As another example, the number of deliveries and/or factors regarding the delivery areas (e.g., how soon AGVs that have been deployed for a first round of deliveries will be able to return to perform a second round of deliveries, etc.) may be related to the expected timing, etc. In various implementations, logistics may also be evaluated during other portions of the example process (e.g., before 1002 for determining the number of AGVs to be carried in the transportation vehicle and/or otherwise made available for transporting items, etc.). In various implementations, predictive inventory management or other techniques may also be utilized to increase the likelihood that an AGV will be available for delivering an item. For example, items that are expected to be in high demand for delivery by AGVs (e.g., release day items, items for a sporting event occurring in a particular area, holiday shopping seasons, etc.) may be moved ahead of time to a location from which AGVs will be able to deliver the items and/or additional AGVs may be sent ahead of time to locations where high demand is expected to occur.

Once the logistics have been evaluated, notifications may be sent to users, AGVs, other autonomous vehicles, the management system 326, etc. regarding the ordered items that are in the transportation vehicle, as in 1010. For example, a user may wish to receive a confirmation that an ordered item is in the transportation vehicle. As another example, a user may wish to receive a notification when an AGV has been deployed from a transportation vehicle with an item that is to be delivered to a delivery location that is associated with the user. Such notifications may also be utilized to determine if an AGV or other autonomous vehicle should continue travel toward a meeting area in the delivery area (e.g., depending on whether or not the transportation vehicle is transporting an ordered item that the AGV or other autonomous vehicle is supposed to receive). In various implementations, such notifications may further indicate an estimated arrival time of the transportation vehicle in the delivery area and/or of an AGV or other autonomous vehicle at the delivery location. For example, GPS signals may be utilized to determine the coordinates of the transportation vehicle and/or AGV or other autonomous vehicle. In various implementations, users may be able to view a map on a website that shows and updates the current location of the transportation vehicle and/or AGV or other autonomous vehicle, or may otherwise receive notifications regarding current locations. In various implementations, expected delivery times may also be determined according to the evaluation of the logistics, etc.

In various implementations, AGVs that have been deployed from transportation vehicles and/or have otherwise travelled to deliver items to delivery locations may receive further instructions for further travel. For example, an AGV may return to a transportation vehicle (e.g., which the AGV was deployed from) after delivering an item to a delivery location in a delivery area. As another example, an AGV may return to a different transportation vehicle (e.g., the original transportation vehicle may have subsequently left the area and the other transportation vehicle may be closer, the AGV may have an item that is to be delivered to the other transportation vehicle, etc.). As another example, the AGV may have first and second items in respective first and second storage compartments and may be instructed to deliver the first item to a first delivery location in the delivery area and then to deliver the second item to a second delivery location in the delivery area.

Figure 11:
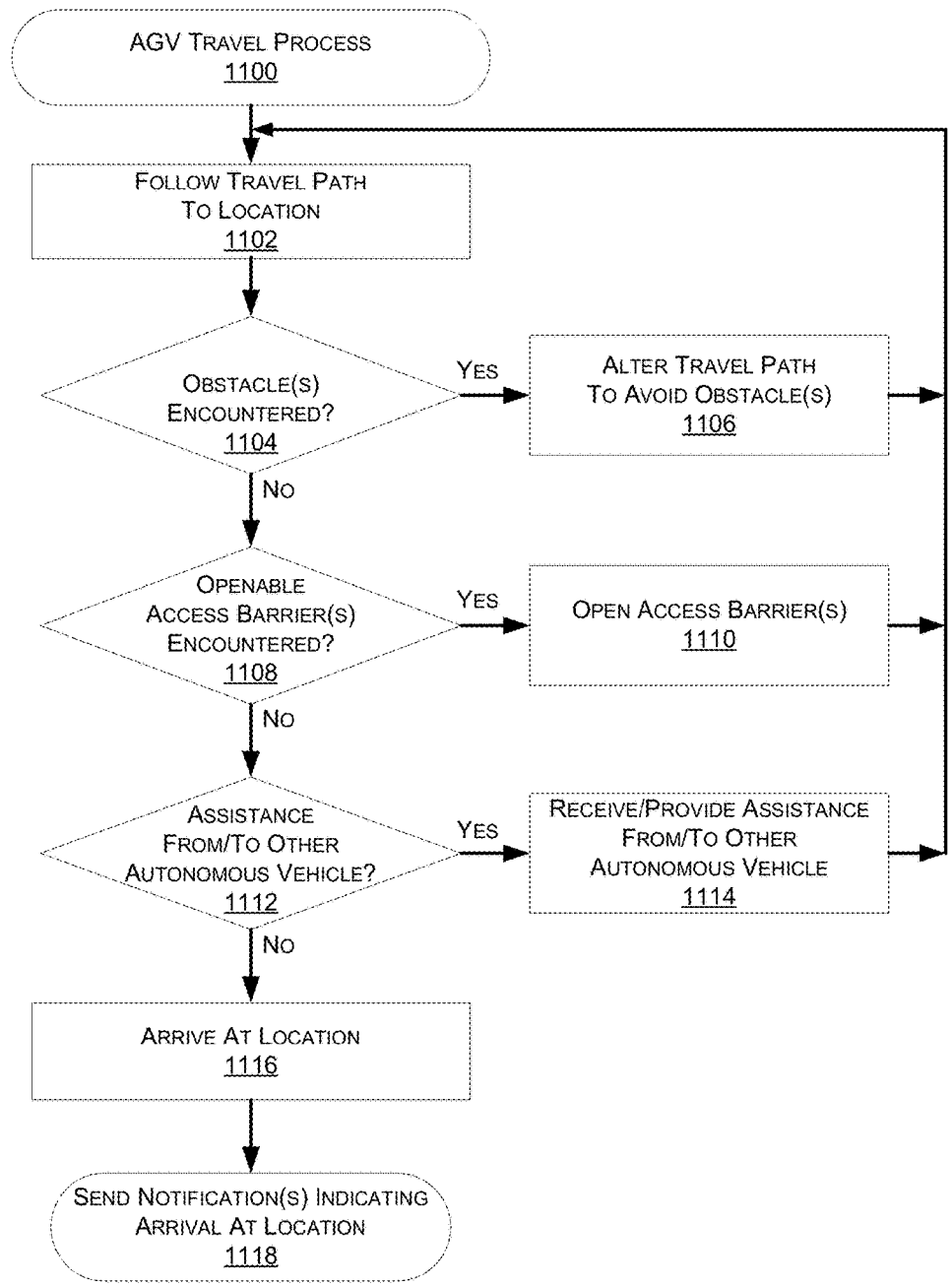
FIG. 11 is a flow diagram illustrating an example process for an autonomous ground vehicle travelling to location, according to some implementations.

FIG. 11 is a flow diagram illustrating an example process 1100 for an AGV travelling to a location. The example process begins with the AGV following a travel path to a location, as in 1102. In various implementations, AGVs may travel to and from different types of locations. For example, an AGV may be deployed from a stopping location where a transportation vehicle has stopped (e.g., parked), and the AGV may travel to a delivery location for delivering an item. As another example, an AGV may travel from a home base location (e.g., at a user's residence) to a stopping location in a meeting area where the AGV will meet a transportation vehicle for acquiring an item for delivery to a delivery location (e.g., at a user's residence, etc.). In various implementations, a home base location may be a location inside a user's residence, on a user's porch, in a user's garage, etc. where the AGV is generally stationed and waits for instructions (e.g., while utilizing a charging station and/or other facilities). As another example, an AGV may travel to a stopping location in a pickup area where a user will meet the AGV for acquiring an item from the storage compartment of the AGV. As another example, an AGV may travel to a location at a materials handling facility, AGV facility, charging station, etc.

In various implementations, AGVs (e.g., which may in some implementations travel at relatively slower speeds than other vehicles) may travel during certain hours when pathways and/or other resources (e.g., sidewalks, elevators, public transportation, etc.) are less crowded and/or utilized. For example, AGVs may travel during nocturnal hours, such as between 12 midnight and 8 a.m., or otherwise when pathways and/or resources are less crowded or utilized in certain areas, etc. In various implementations, AGVs may travel utilizing certain subterranean resources and/or pathways. For example, AGVs may travel along travel paths utilizing subways, tunnels, etc. It will be appreciated that by travelling along pathways that are less utilized (e.g., at certain times or otherwise), AGVs may be able to travel more efficiently and may be less likely to encounter congestion in certain areas, etc.

In various implementations, when a travel path is related to a delivery of an item, the AGV may receive an item to be delivered (e.g., from a transportation vehicle, materials handling facility, AGV facility, user, etc.) at the beginning of the travel path to the delivery location. In various implementations, different types of techniques may be utilized for the AGV to receive an item. For example, an AGV, transportation vehicle, materials handling facility, AGV facility, receiving location, etc., may include an item engagement mechanism (e.g., a robotic arm, etc.) for engaging an item that is to be received by the AGV (e.g., by placing the item in a storage compartment of the AGV, etc.). As another example, a human agent, carrier, user, etc. may take the item and place it in a storage compartment of the AGV.

In various implementations, once the item is placed in the storage compartment, the storage compartment may be locked or otherwise secured for the transport of the item to a delivery location. For example, the storage compartment may include an electronic locking mechanism that may be controlled to lock the storage compartment once it is determined that the item has been placed in the storage compartment. The determination that an item has been placed in the storage compartment may be made according to various types of procedures. For example, an input may be received (e.g., by the AGV control system 210) from a carrier, transportation vehicle, remote computing resource, etc. that indicates that an item has been placed in the storage compartment that is to be delivered to a delivery location. As another example, various sensors (e.g., sensors 271-273) may be utilized to determine that an item has been placed in the storage compartment and has thus been received by the AGV. In various implementations, once the item is received, the AGV may be instructed (e.g., by the management system, a remote computing resource, a control system 210 of the AGV, etc.) to travel to a delivery location (e.g., at a user's residence) to deliver the item. In various implementations, once the item is received, a message may also be sent to a user (e.g., from the AGV control system 210, the management system, a remote computing resource, etc.) that indicates that the AGV has received the item and the message may also indicate an identification of the item (e.g., including a description or picture of the item taken by a sensor of the AGV, etc.).

In various implementations, travel path instructions and/or information may be received by the AGV (e.g., from the management system, from a transportation vehicle, from a remote computing resource, from other AGVs, etc.). As part of the travelling along the travel path, the propulsion portion of the AGV may be controlled (e.g., by the AGV control system 210 as will be described in more detail below with respect to FIG. 16) to navigate the AGV along the travel path to the location. For example, if the AGV is carried by a transportation vehicle, the propulsion portion of the AGV may be controlled to deploy the AGV from the transportation vehicle after the transportation vehicle has stopped at a stopping location in a delivery area, and to navigate the AGV along a travel path from the stopping location to a delivery location in the delivery area. As the travel path toward the location is followed by the AGV, a determination is made as to whether any obstacles are encountered, as in 1104. If obstacles are encountered, the travel path to the location may be altered to avoid the obstacles, as in 1106. For example, AGVs that follow roadways, sidewalks, etc. may encounter obstacles (e.g., construction, blocked pathways, etc.) for which a different route may be calculated and taken. In various implementations, AGVs may also send/receive information regarding travel paths, obstacles, etc. For example, an AGV that encounters an obstacle may send a notification including data regarding the obstacle to a management system, other AGVs, etc. As part of such communications, other AGVs may also take different routes that are calculated based on the obstacles, such that data acquired by one AGV may be utilized in the determinations of the travel paths for other AGVs, etc. In addition to the travel path being altered to avoid any obstacles, a determination is also made as to whether any openable access barriers (e.g., openable doors, gates, etc.) are encountered, as in 1108. If openable access barriers are encountered, the access barriers are opened to allow the AGV to travel through the access barriers, as in 1110.

In various implementations, the AGV may include an access mechanism that is configured to transmit a signal, or otherwise to cause an access barrier to be opened or otherwise unlocked to allow the AGV to travel through or otherwise past the access barrier. For example, the AGV may include an access mechanism that is configured to transmit a remote control signal to open an access barrier (e.g., a garage door) so as to allow the AGV to pass through or around the barrier to travel to a location. As another example, an access barrier in a user's residence that is sized specifically for the AGV may include a sensing mechanism that senses an access mechanism of the AGV for unlocking the access barrier and allowing the AGV to pass through for travelling to a location. It is noted that if an access barrier is not openable, it may be treated as an obstacle according to the operations of blocks 1106 and 1108.

In various implementations, an AGV may also utilize various types of assistance (e.g., from a human, another AGV, another autonomous mechanism, etc.) as part of the navigation along a travel path (e.g., in order to navigate past an obstacle or access barrier, etc.). In various implementations, an AGV may utilize different mechanisms for requesting assistance. For example, an AGV may request assistance by utilizing a speaker (e.g., with a synthesized voice to request that a doorman open a door, etc.), or a display or transmitted electronic message (e.g., with a request for assistance) in order to navigate past obstacles and/or access barriers, etc. As another example, a user may be queried (e.g., by a voice controlled assistant that can control an access mechanism, etc.) as to whether an AGV that has arrived or is planned to arrive at a location should be allowed access past an access barrier (e.g., a door to the user's residence, etc.). In various implementations, a travel path may be determined in part based on an availability of assistance at certain locations. For example, if it is determined that an elevator operator is available to provide assistance (e.g., for pressing a button or otherwise electronically selecting a particular floor on behalf of the AGV, etc.), a travel path may be planned that includes travel by the elevator.

As obstacles and/or access barriers are passed, it is further determined if the AGV will receive assistance from, or provide assistance to, another autonomous vehicle, as in 1112. For example, an AGV may require assistance to navigate past an obstacle (e.g., a barrier, etc.), for which another autonomous vehicle (e.g., a UAV, etc.) may engage the AGV and/or item to be delivered and assist (e.g., through flying, lifting, etc.) in navigating past the obstacle to reach the delivery location. As another example, it may be undesirable for the another autonomous vehicle (e.g., a UAV) to navigate (e.g., fly) along a final portion of a travel path to the delivery location (e.g., due to undesirable noise levels, safety issues in proximity to the delivery location, etc.) for which it may be preferred to have the AGV carry or otherwise assist the other autonomous vehicle and/or item to be delivered in reaching the delivery location. If is determined that assistance is to be received from, or provided to, another autonomous vehicle, the AGV performs the associated procedures to receive or provide the assistance, as in 1114.

As obstacles and/or access barriers are passed and any assistance is received or provided, the AGV continues to travel along the travel path, as in 1102, and if additional obstacles and/or access barriers are encountered, and/or if additional assistance is to be received/provided from or to another autonomous vehicle, the process is repeated, as in 1104, 1108 and/or 1112. Once the AGV has passed any remaining obstacles and access barriers and has received or provided any needed assistance from/to other autonomous vehicles as it continues to travel along the travel path, the AGV arrives at the location, as in 1116. Once the AGV arrives at the location, notification(s) may be sent indicating the arrival at the location (e.g., to the management system, transportation vehicle, user, etc.), as in 1118. In various implementations, if the AGV is delivering an item (e.g., to a user's residence), a notification may be included as part of a message that is sent to a user, etc. (e.g., from the AGV, management system, etc.), which indicates that an item is being delivered and may also include information indicating an identification of the item (e.g., a description of the item, a picture of the item in the storage compartment as taken by an image capture sensor of the AGV, etc.).

In various implementations, the delivery of an item at a delivery location may be performed by following various procedures. For example, an item engagement mechanism (e.g., a robotic arm) of the AGV or delivery location may be utilized to remove the item from the storage compartment of the AGV and place the item at the delivery location (e.g., in a corner of the floor, on a counter, in a refrigerator, etc.). As another example, a delivery may consist of the AGV waiting at the delivery location until a user arrives and removes the item from the storage compartment of the AGV. In some instances, a user or other entity may be required to perform an action to unlock or otherwise open the storage compartment (e.g., by interacting with the user interface 211 and entering an access code, or sending a signal from a smart phone, or utilizing another electronic or mechanical opening device, etc.) In response to such unlocking procedures, the locking mechanism is controlled (e.g., by the AGV control system 210, management system, remote computing resource, etc.) to unlock the storage compartment to enable the item to be removed from the storage compartment at the delivery location (e.g., by the user, etc.). In other instances, the locking mechanism may be controlled to automatically unlock the storage compartment once an AGV reaches a delivery location (e.g., according to a sensed location of the AGV, or according to a signal from a transmitting device within a user's residence or doorway, etc.).

After the item is delivered, a determination may also be made as to whether the delivery location is a home base location for the AGV, in which case the AGV may remain at the home base location. If the delivery location is not a home base location, the AGV may in some instances control the propulsion portion to navigate the AGV to follow a travel path to a home base location, or back to a transportation vehicle, materials handling facility, etc. In various implementations, a home base location for an AGV may include a charging station or other facilities for the AGV (e.g., an inductive charging station that the AGV engages when the AGV is at the home base location, etc.). In various implementations, a home base location may be a location where an AGV is generally stationed and waits for instructions and/or is otherwise located when not performing deliveries or other activities, and to which an AGV may return when such activities are completed.

In various implementations, a home base location for an AGV may be in or around different areas of a user's residence or other location. For example, a home base location may be in a user's kitchen, hallway, garage, front porch, etc. As other examples, a home base location for an AGV that services a group of users may be in a common area such as a hallway, lobby, garage, etc. In some instances, a home base location may be utilized as a delivery location where an item will be retrieved from a storage compartment of the AGV by a user. In other instances, the delivery location may be in a more convenient area or location (e.g., as delivered to a user's front door, kitchen, etc.), after which the AGV may return to a home base location. In various implementations, the AGV may return to a different home base location than the AGV started at for making a current delivery. For example, a residence or other area may include multiple home base locations, where an AGV may return to whichever home base location is most convenient or optimal for future expected deliveries, etc.

In various implementations, a home base location may also be a meeting area that a transportation vehicle may travel to where items are to be received by AGVs. For example, an apartment building may have a home base location in a garage, wherein one or more AGVs may be stationed at the home base location to wait for a transportation vehicle that will enter the garage for transferring items to the AGVs. In such instances, an AGV may not need to travel to the meeting area since the home base location where the AGV is stationed is at a stopping location for the AGV that is in the meeting area (e.g., adjacent to a stopping location for the transportation vehicle that will supply the item to be delivered, etc.). Once the items are received, the AGVs may follow travel paths (e.g., utilizing an elevator of the building) to travel to the designated delivery locations (e.g., at users' front doors on the various floors of the building, etc.).

In various implementations, certain portions of the example process 1100 may be repeated, in particular with regard to deliveries of multiple items. For example, if an AGV is carrying multiple items that are to be delivered to different delivery locations (e.g., as stored in separate storage compartments of the AGV), the AGV may travel from one delivery location to another before returning to a home base location or other designated location. As another example, an AGV may receive multiple items from different transportation vehicles or other sources (e.g., stored in separate storage compartments of the AGV), before delivering the multiple items to one or more delivery locations. In a configuration where separate storage compartments (e.g., see FIG. 3B) are utilized for separate deliveries, a separate access code or other mechanism may be utilized for opening each of the storage compartments, so that each user may only access or otherwise receive the item(s) that are part of their delivery.

In various implementations, in addition to delivering items to users, AGVs may also be utilized for delivering items to transportation vehicles as part of return processes for items. For example, when user wishes to return an ordered item, the user may place the item in an AGV which may travel to a delivery location which may correspond to a stopping location for a transportation vehicle in a meeting area where the AGV will deliver the item to the transportation vehicle which will then transport the item back to a materials handling facility or other location as part of a return process for the item. In such instances, after an item that is to be returned is received in a storage compartment of the AGV (e.g., at a user's residence, etc.), the AGV may follow a travel path to a delivery location/meeting area (e.g., where other AGVs that are returning or receiving items may congregate) for meeting a transportation vehicle to which the AGV will deliver the item for the return. After the item has been delivered to the transportation vehicle, the AGV may in some instances then follow a travel path back to a home base location or other location, or may board or otherwise be placed on the transportation vehicle for further transport (e.g., back to a materials handling facility where the item may be removed from the storage compartment of the AGV if it was not already removed when the AGV met the transportation vehicle, etc.).

In various implementations, a receiving location may be designated as a location where an AGV receives an item that is to be transported by the AGV. In the above scenario where an item is received by the AGV as part of a return process for the item (e.g., wherein the AGV is to transport the item to a transportation vehicle for the return), the receiving location may in some instances be a home base location that the AGV is stationed at. For example, when a user wishes to return an item, the user may take the item to the home base location where the AGV is stationed and may place the item in the storage compartment of the AGV, in which case the home base location is a receiving location for the AGV. Alternatively, in a scenario where an AGV is delivering an item to a user, the receiving location may be in a meeting area that the AGV travels to or is otherwise at for receiving the item from a transportation vehicle.

Figure 12:
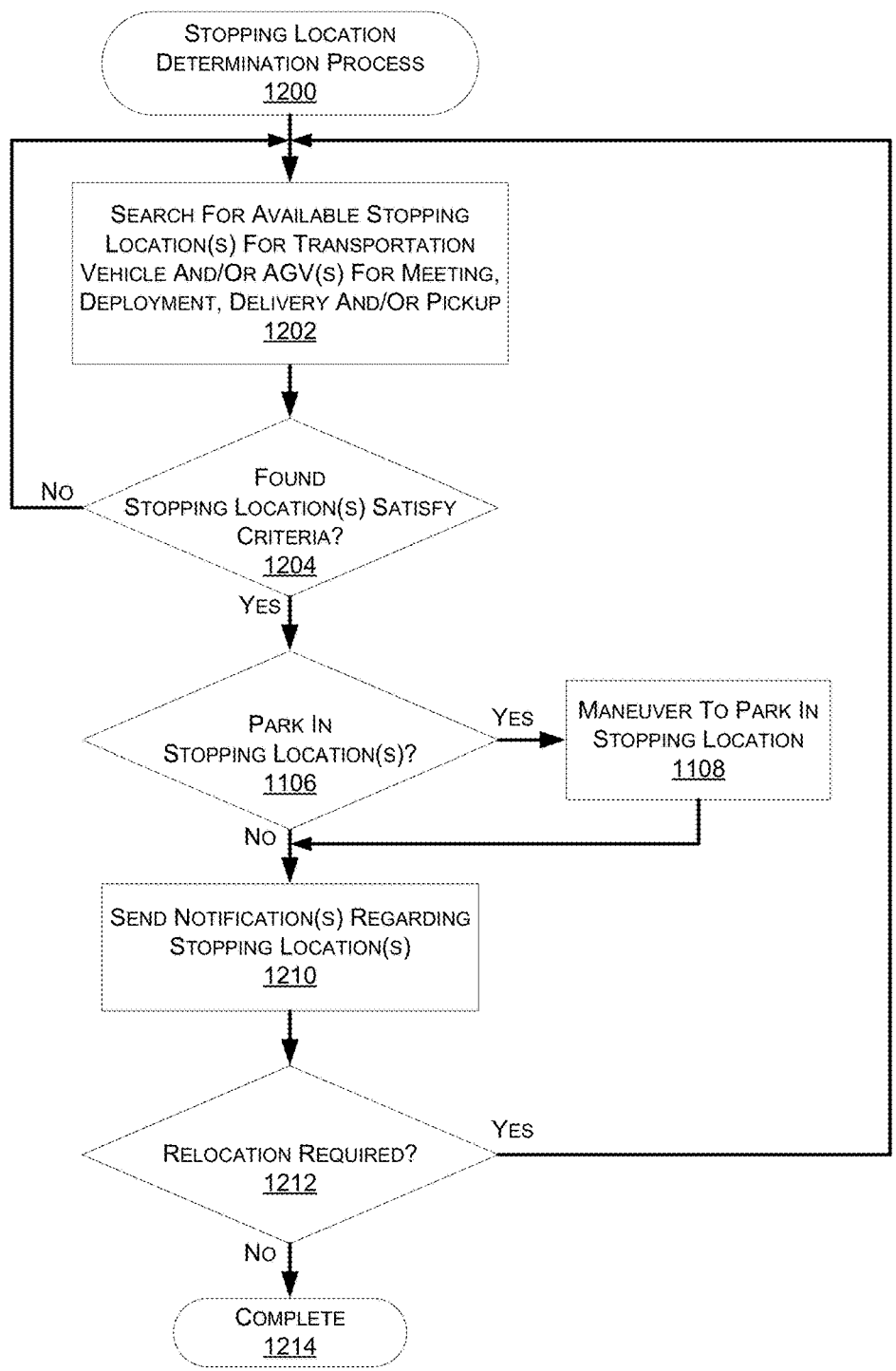
FIG. 12 is a flow diagram illustrating an example process for determining a stopping location, according to some implementations.

FIG. 12 is a flow diagram illustrating an example process 1200 for determining a stopping location for a transportation vehicle and/or AGVs, according to some implementations. The example process begins with a search for available stopping location(s) (e.g., a place where the transportation vehicle may park or otherwise stop to deploy or meet AGVs, a place where AGVs may stop to meet a transportation vehicle, etc.). In various implementations, the search for stopping locations may be conducted by various entities. For example, the transportation vehicle may search for stopping locations once it has arrived and is travelling through the delivery area. As another example, the AGVs and/or other autonomous vehicles may search for stopping locations (e.g., before or after a transportation vehicle has arrived in the delivery area, etc.). As another example, the management system 326 may assist with the search for stopping locations (e.g., utilizing satellite imagery, data provided from local street cameras, etc.). In various implementations, the search by each of the entities may include searching for stopping locations for both the transportation vehicle and AGVs (e.g., if the AGVs will be meeting a transportation vehicle, then stopping locations may be required within the meeting area for both the transportation vehicle and the AGVs, etc.).

For conducting the search, various techniques may be utilized. For example, a transportation vehicle and/or AGV or other autonomous vehicle may be instructed to travel to a preferred location (e.g., an optimal location) that has been determined (e.g., at a center or centroid of the delivery area, or according to an average of the coordinates of the delivery locations, etc.) and to begin a search for available stopping locations that are as close as possible to the preferred location. In various implementations, the search instructions may include following a particular pattern (e.g., a spiral pattern outward, etc.), which may depend in part on the timing for finding the stopping locations. For example, a transportation vehicle may be instructed to stop/park by a particular time (e.g., so as to provide certain AGVs and/or other autonomous vehicles sufficient time to travel from a stopping location to designated delivery locations to meet certain delivery deadlines, etc.). If a transportation vehicle is to be parked by a particular time (e.g., by 3:00 p.m.) but has arrived in a delivery area early (e.g., 30 minutes early), the search instructions may include circling the area near the preferred location for a period of time (e.g., in case a stopping location becomes available) before beginning a more aggressive search pattern to look for stopping locations that may be further away from the preferred location. As another example, a transportation vehicle may alternatively be directed to park or otherwise stop in a first available stopping location within a delivery area (e.g., if there is only limited time remaining for finding a stopping location, etc.).

In various implementations, as noted above other data may also be received and utilized for assisting with the search for stopping locations (e.g., images and/or data from satellites, street cameras, AGVs or other vehicles travelling in the area, users, etc.). Other data may also be received or accessed regarding stopping locations in a given area (e.g., map and/or other data regarding public, private, and/or reserved stopping locations indicating coordinates, fees, parking time limits, sizes, restrictions, statistics regarding how often the various stopping locations are available and at what times of day, etc.). In various implementations, once an available stopping locations is found, data regarding the stopping location and/or the search for the stopping location, etc. may be recorded (e.g., by the transportation vehicle and/or the management system) and may be stored as part of a database or other collection of data regarding the given area, etc. Such data (e.g., regarding stopping locations, statistical availability of stopping locations, travel in the given area, etc.) may be collected from multiple transportation vehicles, AGVs, other autonomous vehicles and/or other sources, and may be accessed and/or otherwise utilized to assist with future searches (e.g., by transportation vehicles, AGVs, etc.) for stopping locations in the given area, etc.

Once one or more available stopping locations are found, a determination is made if the stopping locations meet certain criteria, as in 1204. In various implementations, the criteria may be based at least in part on factors such as the size of the transportation vehicle and/or AGVs, the required orientations of the transportation vehicle and/or AGVs while stopped, an amount of time that the transportation vehicle and/or AGVs will be required to stop for, etc. For example, if a transportation vehicle will be stopping (e.g., parking) at a stopping location from which AGVs will be deployed, the stopping location may require sufficient room for the transportation vehicle to park and to be in an orientation from which the AGVs can be safely deployed (e.g., out of a back or side of the transportation vehicle, etc.), and may require enough room adjacent to the stopping location for the AGVs as they are deployed (e.g., on a sidewalk that is not currently crowded, etc.). Similarly, if AGVs will be meeting (e.g., and waiting for) the transportation vehicle, the AGVs may require stopping locations (e.g., on a sidewalk, etc.) that are proximate to the stopping location for the transportation vehicle, and where the AGVs can safely wait for and/or interact with the transportation vehicle (e.g., to receive items from the transportation vehicle once it arrives, etc.). As another example, if a user is to meet an AGV at a stopping location (e.g., in a pickup area where a user is informed of the location of the AGV and meets the AGV for acquiring an ordered item), the stopping location may need to be at a location where the AGV can safely wait for the user (e.g., to the side of a sidewalk, or otherwise in a space that is not in the way of other activities or pathways of travel for other entities, and where the user can easily find the AGV, etc.).

In various implementations, the criteria may also be related to certain timing considerations. For example, if a transportation vehicle and/or AGVs will be required to stop for a specified period (e.g., 15 minutes, 4 hours, etc.), the criteria may require that the stopping location be available for that time period. In some instances, the amount of time that a transportation vehicle will be required to stop for may depend on whether the transportation vehicle will be waiting at the location for certain AGVs and/or other autonomous vehicle to arrive/return (e.g., which may require longer periods of time than deploying AGVs and/or providing items to AGVs that are already waiting for the transportation vehicle). In some implementations, some stopping locations that are located throughout a region may be reserved for use by the transportation vehicles, AGVs, and/or other commercial vehicles (e.g., during certain times of day and/or for certain amounts of time, such as 30 minutes, 2 hours, etc.) In various implementations, certain stopping locations may generally be more available during certain time periods. For example, if certain activities (e.g., deployment, meeting, etc.) of the transportation vehicle and/or AGVs are conducted during certain time periods (e.g., between 2:00 a.m. and 6:00 a.m., etc.), certain stopping locations (e.g., parking locations, sidewalk locations, etc.) may generally be more available (e.g., less utilized, less crowded, etc.) and may have fewer timing restrictions.

In some instances, a transportation vehicle and/or AGVs may park or otherwise stop in a first stopping location during a first portion of a time period, and then may move to a second stopping location during a second portion of a time period (e.g., due to no stopping locations currently being available for the full time period). In various implementations, certain sensors of the transportation vehicle and/or AGVs may be utilized to read parking signs or otherwise obtain information regarding a stopping location (e.g., for determining maximum parking time limits, the available area of the stopping location, etc.). In some instances, stopping locations for a group of AGVs may not all need to be adjacent to a stopping location for the transportation vehicle, in that the AGVs may wait at stopping locations in a meeting area that are near to where the stopping location for the transportation vehicle will be, and then may move (e.g., in small groups and/or individually, etc.) to be adjacent to the transportation vehicle for receiving items after the transportation vehicle arrives. If no found stopping location (s) are determined to meet the required criteria, the process returns to 1202, where the search continues for other available stopping location(s).

If the found stopping location(s) do meet the criteria, a determination is made as to whether to park in a stopping location, as in 1206. In certain implementations, if the transportation vehicle itself has been searching for and has found a stopping location that meets the criteria, the transportation vehicle may immediately park in the stopping location for the transportation vehicle. However, as noted above, in some instances it may be AGVs that have been searching for the stopping location(s), in which case the determination may be as to whether one or more of the AGVs should stop/park in the stopping location for the transportation vehicle. For example, one or more of the AGVs may stop/park in the stopping location for the transportation vehicle to hold the stopping location for the transportation vehicle until the transportation vehicle arrives, and/or one or more of the AGVs may remain in the stopping locations for the AGVs which may be adjacent or near the stopping location for the transportation vehicle. In various implementations, the determination may be made based at least in part on how soon the transportation vehicle is expected to arrive and well as certain policies regarding such timing. For example, if the transportation vehicle is expected to arrive relatively shortly (e.g., less than a minute), it may be determined that the AGV or other autonomous vehicle should park in the stopping location to hold it for the transportation vehicle. In various implementations, the AGVs may also congregate in the stopping location for the transportation vehicle while they wait for the transportation vehicle (e.g., so as to not take up space or otherwise be in the way on a sidewalk etc. while they wait). In such instances, the AGVs may move (e.g., up on a sidewalk, to the back or side of the parking space, etc.) to make room for the transportation vehicle to park once it arrives. If the vehicle(s) (e.g., AGVs, transportation vehicle, etc.) are to park in the stopping location, the vehicle(s) maneuver to park in the stopping location, as in 1208.

Once the vehicle(s) have stopped/parked in the stopping location(s), as in 1208, or if the vehicle(s) are not to park in the stopping location(s) but the stopping location(s) are still determined to be available, as in 1206, notifications regarding the stopping location(s) may be sent, as in 1210. In various implementations, in instances where the transportation vehicle itself has found and parked in the stopping location, such notifications may be sent from the transportation vehicle to a remote computing resource (e.g., a management system), or directly to AGVs and/or other autonomous vehicles that are travelling to meet the transportation vehicle, etc. Such notifications may include information regarding not only the transportation vehicle stopping location, but also regarding located/visible stopping locations for the AGVs that are adjacent to or near the stopping location for the transportation vehicle (e.g., informing the AGVs where they should line up and on which side of the transportation vehicle, etc.). In some instances, a management system may determine when a transportation vehicle is parked within a delivery area (e.g., according to a notification that is received from the transportation vehicle or as otherwise determined from GPS or other sensor data, etc.) and may send a notification and/or instructions to AGVs that indicates the stopping location where the transportation vehicle is parked and the available stopping locations for the AGVs. In various implementations, in instances where an AGV or other autonomous vehicle has found the stopping location(s), notifications regarding the stopping location(s) may be sent from the AGV or other autonomous vehicle (e.g., to the transportation vehicle, to other AGVs travelling to meet the transportation vehicle, to a management system, etc.) indicating the coordinates and/or other information/data regarding the stopping location (e.g., where the transportation vehicle is expected to park once it arrives). In an instance where a transportation vehicle and/or AGV is to park in a first stopping location during a first portion of a time period, and then move to a second stopping location during a second portion of a time period (e.g., due to no stopping locations currently being available for the full time period), corresponding notifications (e.g., indicating when the transportation vehicle and/or AGV is to move, etc.) may be sent to the management system, AGVs, transportation vehicle, etc.

After the notifications are sent, a determination may be made as to whether relocation may be required, as in 1212. In various implementations, such determinations may be made at regular time intervals or in response to certain events (e.g., some of the stopping locations in a meeting area being taken, etc.). In various implementations, relocation of stopping location(s) may be implemented for various reasons. As an example, a determination may be made that a group of AGVs that have congregated to meet a transportation vehicle may be able to move to a closer and/or more convenient meeting area for meeting with the transportation vehicle, in which case relocation may be implemented. As another example, a planned meeting area may not have sufficient space and/or stopping locations for either the AGVs and/or the transportation vehicle as the vehicles arrive (e.g., a previously available parking space may have been taken, a sidewalk may have become crowded, etc.), in which case relocation may be required. As another example, a parking time limit may have expired in a first stopping location, requiring relocation to a second stopping location. If the vehicles are to relocate, the process returns to 1202, where new stopping location(s) are searched for, otherwise the process completes, as in 1214.

Figure 13:
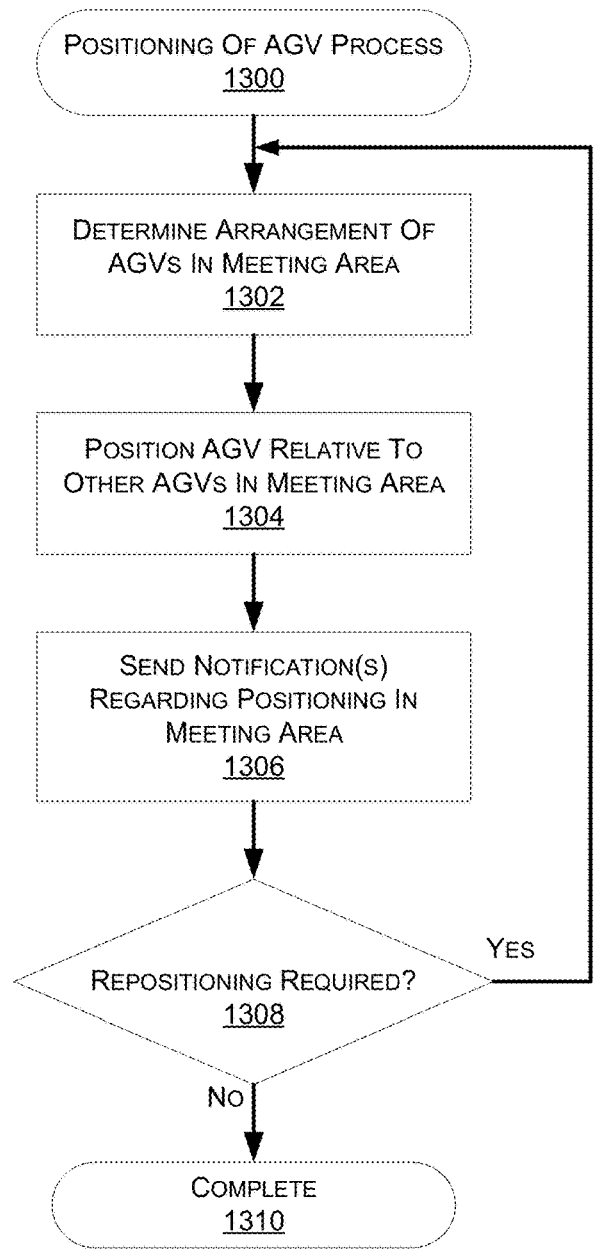
FIG. 13 is a flow diagram illustrating an example process for a positioning of an autonomous ground vehicle relative to other autonomous ground vehicles at a location, according to some implementations.

FIG. 13 is a flow diagram illustrating an example process 1300 for a positioning of an AGV relative to other AGVs in a meeting area, according to some implementations. The example process begins with a determination of an arrangement of the AGVs in the meeting area, as in 1302. In various implementations, after an AGV arrives in a meeting area, a determination may be made as to whether other AGVs are already present in the meeting area (e.g., utilizing various sensors of the AGVs that may provide sensed data indicating the presence of one or more other AGVs and/or as indicated by a management system, etc.). In various implementations, the determination of the arrangement of the AGVs in the meeting area may be made by a management system, or a control system of a transportation vehicle, or by a control system of one or more of the AGVs, and may be communicated to each of the AGVs through wireless communications (e.g., through a network interface, etc.). In various implementations, coordination may be performed between the management system, transportation vehicle and/or AGVs to determine the arrangement of the AGVs in the meeting area.

In various implementations, if the meeting area is for meeting a transportation vehicle, the AGVs may be arranged to each be positioned in a particular stopping location in a particular order. For example, the AGVs may be lined up in an order according to the delivery addresses where the AGVs will be delivering items. As another example, the AGVs may be arranged in an order according to an arranged order of items that are stored in a transportation vehicle. In various implementations, in addition to being lined up, the AGVs may also be arranged in other patterns and/or configurations (e.g., arranged in geometric patterns or configurations, stacked, etc.). It will be appreciated that such arrangements of AGVs at the meeting area may simplify the transfer of items from the transportation vehicle to the AGVs. In various implementations, the AGVs may also include markings or other identifying symbols or devices (e.g., flashing lights, sounds, etc.) for simplifying the identification and transfer of corresponding items from the transportation vehicle. In various implementations, if the meeting area is a pickup area where items will be retrieved by users, the AGVs may be arranged to be positioned in particular stopping locations according to various factors at the pickup area. For example, an AGV that is expected to be departing shortly may be arranged to be at the outside of a configuration (e.g., so as to cause less disruption to the arrangement of the other AGVs when the AGV departs).

In various implementations, the determination of the arrangement of the AGVs may involve coordination between the AGVs, transportation vehicle, and/or management system, etc. For example, one or more of the AGVs may transmit current positions, information regarding items being transported, planned travel paths, delivery timing requirements, available space in the meeting area, and/or other relevant information to be utilized for determining the arrangement. As part of the coordination process, one or more of the AGVs may also transmit a suggested arrangement and/or suggested stopping location(s) (e.g., one AGV may send a communication including a suggested arrangement and/or suggested stopping location(s), and the other AGV(s), transportation vehicle and/or management system may respond with a communication including either a confirmation or else a suggested alternative arrangement or suggested alterative stopping location(s), etc.)

Once the arrangement of the AGVs has been determined, the AGV is positioned relative to the other AGVs in the meeting area according to the determined arrangement, as in 1304. For example, the AGV may be instructed to move to a designated stopping location at a designed position within the arrangement, and other AGVs that are already in the meeting area may be instructed to move to accommodate the positioning of the AGV. Once the AGV has been positioned relative to the other AGVs, various notifications may be sent regarding the positioning of the AGV in the meeting area, as in 1306. For example, a management system may be sent a notification (e.g., which may be utilized to update a database with the information regarding the positioning of the AGV in the meeting area, etc.). As another example, a user may be sent a notification indicating that the AGV is positioned in the meeting area (e.g., as a confirmation to the user that an AGV that is to be delivering an item is waiting for a transportation vehicle to provide the item, or that an AGV in a pickup area has arrived and is available for a user to retrieve an item, etc.).

After any notifications have been sent, a determination is made if a repositioning of the AGV is required, as in 1308. In various implementations, such determinations may be made in response to certain events or at certain time intervals. For example, if an AGV has arrived at, or is departing from, a meeting area, a determination may be made as to whether any of the remaining AGVs in the meeting area should be repositioned (e.g., to fill a gap left by the departing AGV). As another example, if information is received indicating that an order and/or arrangement of items in a transportation vehicle has changed, an AGV may be repositioned according to the new order (e.g., as described above with respect to FIG. 7C). If it is determined that repositioning is required, the process returns to block 1302 where the new arrangement of AGVs in the meeting area is determined, otherwise the process completes as in 1310.

Figure 14:
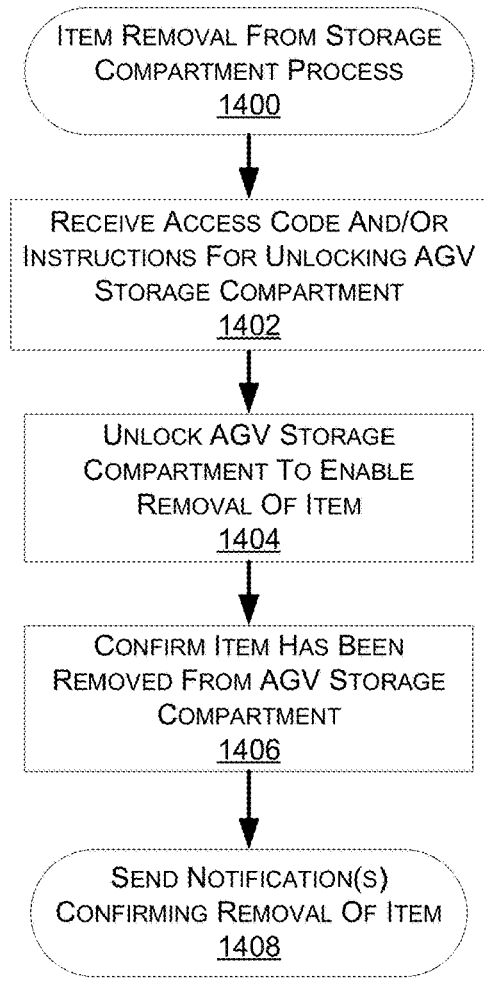
FIG. 14 is a flow diagram illustrating an example process for a removal of an item from a storage compartment of an autonomous ground vehicle, according to some implementations.

FIG. 14 is a flow diagram illustrating an example process 1400 for a removal of an item from a storage compartment of an AGV, according to some implementations. The example process begins with the receipt of an input (e.g., an access code and/or instructions) at a control system of the AGV, as in 1402. For example, a user may enter an access code on a user interface of the AGV. In various implementations, an access code may include a unique identifier, such as a PIN that may be input by the user. The access code may have been provided to the user as part of a message indicating that the item was to be delivered by the AGV. In an alternative implementation, rather than the user providing an access code on the user interface, the control system may receive an input of an access code or other instructions from a remote computing resource. For example, a user may be instructed to perform an activity such as responding to a text message or performing another action with their cell phone or other device (e.g., after the AGV has arrived at a delivery location, after the user has met the AGV in a pickup area, etc.) in order to have an access code or other instructions sent from a remote computing resource to the control system of the AGV for providing access to the storage compartment. As another example, an access code or other instructions may be automatically sent to the AGV control system upon arrival at a designated location (e.g., a delivery location may include a system or device that automatically transmits a code or instructions once the AGV has arrived at the delivery location, as determined by one or more sensors, GPS tracking, etc.).

Once the access code or other instructions are received, the storage compartment associated with the access code or other instructions is unlocked so as to enable the item to be removed from the storage compartment, as in 1404. For example, a user may reach into the storage compartment to retrieve the item. As another example, an item engagement mechanism (e.g., a robotic arm, etc.) of the AGV, delivery location, etc., may be utilized to remove the item from the storage compartment. Once the item has been removed, a confirmation is made that the item has been removed from the storage compartment, as in 1406. For example, the confirmation may include determining whether a closed-door notification has been received, as indicating that the door of the storage compartment has been closed after the item has been removed. In addition, if an image capture device 273 within the storage compartment has been activated, video or images captured by the image capture device 273 may be reviewed or analyzed to confirm that the item has been removed from the storage compartment. In addition, or as an alternative thereto, a presence detection sensor 271 and/or motion sensor 272 within the storage compartment may be queried to confirm that the item has been removed from the storage compartment.

Once a confirmation has been made that the item has been removed from the storage compartment, the control system of the AGV sends a notification confirming the removal of the item to a remote computing resource and/or to a user, etc., as in 1408. The confirmation of the removal of the item may also include additional information such as the date and time of the removal. In various implementations, a message may be sent to the user confirming the removal, as a safety measure to ensure that it was the user or a user's authorized agent and not another party that removed the item from the storage compartment. In various implementations, the notification confirming the removal of the item may also correspond to and/or otherwise serve as a notification confirming that the item has been delivered to the location where the item was removed from the storage compartment.

Figure 15:
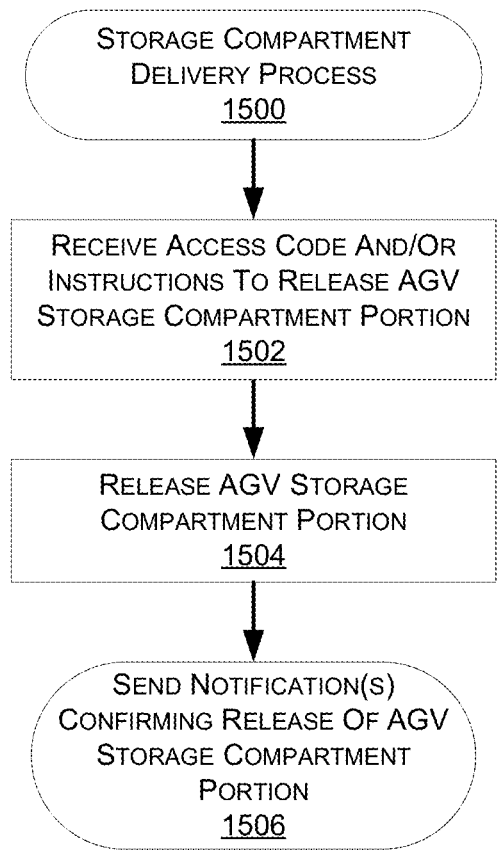
FIG. 15 is a flow diagram illustrating an example process for an autonomous ground vehicle delivering a storage compartment portion to a location, according to some implementations.

FIG. 15 is a flow diagram illustrating an example process 1500 for an AGV delivering a storage compartment portion to a location, according to some implementations. The example process begins with a receipt of an access code and/or instructions to release the storage compartment portion, as in 1502. For example, a control system of an AGV may receive an access code and/or instructions from a remote computing resource (e.g., a management system 326), or as transmitted locally from a delivery location once an AGV arrives, or as provided from a user's electronic device, or as manually input by a user on a user interface of the AGV, etc. Once the access code and/or instructions have been received, the storage compartment portion is released at the delivery location, as in 1504. For example, as described above with respect to FIGS. 2A-2C and 8, the storage compartment portion may be unlocked and/or otherwise released from a propulsion portion, so that the storage compartment portion may be left at the delivery location while the propulsion portion departs from the delivery location. In various implementations, a storage compartment detachment and/or movement mechanism (e.g., rollers 234) may be utilized to assist with the removal and delivery of the storage compartment portion to the delivery location.

Once the storage compartment portion has been released and delivered at the delivery location, one or more notifications may be sent confirming the delivery of the storage compartment portion to the delivery location, as in 1506. For example, a notification may be sent to a user confirming that the storage compartment portion has been delivered to the delivery location (e.g., at a user's residence, etc.). As another example, a notification may be sent to a management system that may be utilized to update a database with the delivery information. As another example, a notification may be sent to a second AGV that is to further transport the storage compartment portion. In various implementations, after the storage compartment portion is delivered, the propulsion portion of the AGV may continue travel to another designated location (e.g., to a home base location, to a transportation vehicle, etc.). In various implementations, the storage compartment portion may be further transported from the location to another location by a second AGV. For example, a management system may direct a propulsion portion of a second AGV to travel to the location so that the storage compartment portion may be coupled to the propulsion portion of the second AGV. The second AGV may further be instructed to travel from the location to a second location where the storage compartment portion is to be delivered.

Figure 16:
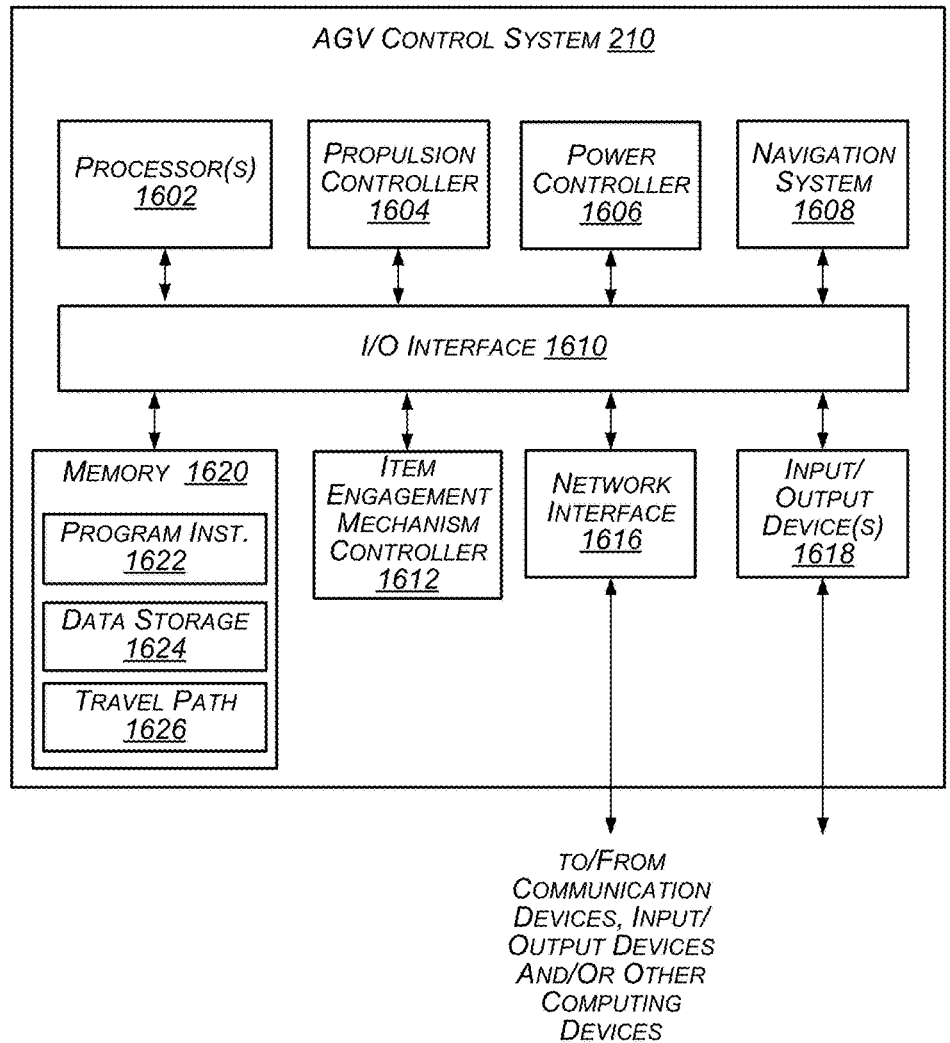
FIG. 16 depicts a block diagram illustrating various components of an autonomous ground vehicle control system, according to an implementation.

FIG. 16 is a block diagram illustrating an example AGV control system 210, such as may be utilized for the AGVs 200 of FIGS. 2A-8, or for other types of AGVs. In various examples, the block diagram of FIG. 16 may be illustrative of one or more aspects of the AGV control system 210 that may be used to implement the various systems and methods discussed herein. In the illustrated implementation, the AGV control system 210 includes one or more processors 1602 coupled to a non-transitory computer readable storage medium 1620 via an input/output (I/O) interface 1610. The AGV control system 210 may also include a propulsion controller 1604 (e.g., for controlling one or more motors, engines, etc.), a power controller 1606 (e.g., for controlling, monitoring and/or regulating the use and charging of the power modules) and/or a navigation system 1608. The AGV control system 210 further includes an item engagement mechanism controller 1612, a network interface 1616, and one or more input/output devices 1618.

In various implementations, the AGV control system 210 may be a uniprocessor system including one processor 1602, or a multiprocessor system including several processors 1602 (e.g., two, four, eight, or another suitable number). The processor(s) 1602 may be any suitable processor capable of executing instructions. For example, in various implementations, the processor(s) 1602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1602 may commonly, but not necessarily, implement the same ISA.

The non-transitory computer readable storage medium 1620 may be configured to store executable instructions, data, travel paths, and/or data items accessible by the processor(s) 1602. In various implementations, the non-transitory computer readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1620 as program instructions 1622, data storage 1624 and travel path data 1626, respectively. In other implementations, program instructions, data, and/or travel paths may be received, sent, or stored upon different types of computer-accessible media, such as non-transitory media, or on similar media separate from the non-transitory computer readable storage medium 1620 or the AGV control system 210. Generally speaking, a non-transitory, computer readable storage medium may include storage media or memory media such as magnetic or optical media, e.g., disk or CD/DVD-ROM, coupled to the AGV control system 210 via the I/O interface 1610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1616.

In one implementation, the I/O interface 1610 may be configured to coordinate I/O traffic between the processor(s) 1602, the non-transitory computer readable storage medium 1620, and any peripheral devices, the network interface or other peripheral interfaces, such as input/output devices 1618. In some implementations, the I/O interface 1610 may perform any necessary protocol, timing or other data transformations to convert data signals from one component (e.g., non-transitory computer readable storage medium 1620) into a format suitable for use by another component (e.g., processor(s) 1602). In some implementations, the I/O interface 1610 may include support for devices attached through various types of peripheral buses, such as a variant of the Peripheral Component Interconnect (PCI) bus standard or the Universal Serial Bus (USB) standard, for example. In some implementations, the function of the I/O interface 1610 may be split into two or more separate components, such as a north bridge and a south bridge, for example. Additionally, in some implementations, some or all of the functionality of the I/O interface 1610, such as an interface to the non-transitory computer readable storage medium 1620, may be incorporated directly into the processor(s) 1602.

The propulsion controller 1604 communicates with the navigation system 1608 (e.g., for adjusting the steering and power of the motor of the AGV 200 to guide the AGV along a determined travel path). The navigation system 1608 may include a global positioning system (GPS), indoor positioning system (IPS), or other similar system and/or sensors that can be used to navigate the AGV 200 to and/or from a location. The item engagement mechanism controller 1612 is utilized to engage and/or disengage items that are to be acquired and/or delivered by the AGV 200. For example, the item engagement mechanism controller 1612 may operate an item engagement mechanism that includes a robotic arm or other mechanism for engaging items and placing them in a storage compartment of the AGV 200, or for removing items from a storage compartment and placing them at a delivery location or other location. In various configurations, the item engagement mechanism may be powered by the power modules, motors, etc. of the AGV 200.

The network interface 1616 may be configured to allow data to be exchanged between the AGV control system 210, other devices attached to a network and/or the AGV, such as other computer systems (e.g., remote computing resources 310), and/or with AGV control systems of other AGVs. For example, the network interface 1616 may enable wireless communication between the AGV 200 and the management system 326 that is implemented on one or more of the remote computing resources 310. For wireless communication, an antenna of an AGV or other communication components may be utilized. As another example, the network interface 1616 may enable wireless communication between numerous AGVs. In various implementations, the network interface 1616 may support communication via wireless general data networks, such as a Wi-Fi network. For example, the network interface 1616 may support communication via telecommunications networks such as cellular communication networks, satellite networks, and the like. Communications through wired connections (e.g., through coupling portions 205) may also be supported (e.g., for communicating with other coupled AGVs, control stations, docking stations, other control systems and/or networks, etc.).

In some implementations, with respect to the operations of the user interface 211 and/or operations for accessing the storage compartment(s), receiving items, etc., the input/output devices 1618 may include one or more display terminals, keyboards, keypads, touchpads, scanning devices, voice or optical recognition devices, sensors, or any other devices suitable for entering or retrieving data or sensing inputs. Multiple input/output devices 1618, some of which may be included as part of the user interface 211, may be present in or otherwise controlled by the AGV control system 210 or may be distributed on various nodes of the AGV control system 210. In some implementations, similar input/output devices may be separate from the AGV control system 210 and may interact with one or more nodes of the AGV control system 210 through a wired or wireless connection, such as over the network interface 1616. In various implementations, a storage compartment portion 202 and/or various components thereof (e.g., sensors, user interface, etc.) may function as input/output device(s) with respect to the AGV control system 210 (e.g., as coupled through various coupling portions as described above with respect to FIGS. 2A-2C). Similarly, in some implementations, movement mechanisms 234 (e.g., for assisting with the movement of a storage compartment portion 202 for coupling/decoupling from a propulsion portion 201) may be operated as input/output devices by the AGV control system 210.

In some implementations, with respect to the navigation, etc. of the AGV 200, the input/output devices 1618 may include one or more displays, imaging sensors, thermal sensors, infrared sensors, time of travel sensors, accelerometers, weather sensors, locator devices, etc. Multiple such input/output devices 1618 may be present and controlled by the AGV control system 210. One or more of these sensors (e.g., imaging sensors, etc.) may be utilized to assist with navigating the AGV 200 along travel paths (e.g., including the avoidance of other vehicles or obstacles during travel, etc.). In various implementations, such sensors may also be utilized for assisting with the positioning of the AGV 200 relative to other AGVs in a meeting area and/or other activities of the AGV 200. For example, an imaging sensor may be utilized to assist with navigation, as well determining an identification of a transportation vehicle from which an item is to be received and/or an identification of an item that is to be received.

As shown in FIG. 16, the memory may include program instructions 1622 that may be configured to implement the example processes and/or sub-processes described herein. The data storage 1624 may include various data stores for maintaining data items that may be provided for determining travel paths, receiving and delivering items, identifying locations, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AGV control system 210 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AGV control system 210 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AGV control system 210. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the AGV control system 210 may be transmitted to the AGV control system 210 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other AGV control system configurations.

While the functional components of the example AGV 200 are discussed herein as part of the AGV 200, in other implementations, one or more of the functional components may be distributed and/or implemented as part of the management system 326. For example, one or more of the aspects of the program instructions 1622 may be implemented as part of the management system 326.

Figure 17:
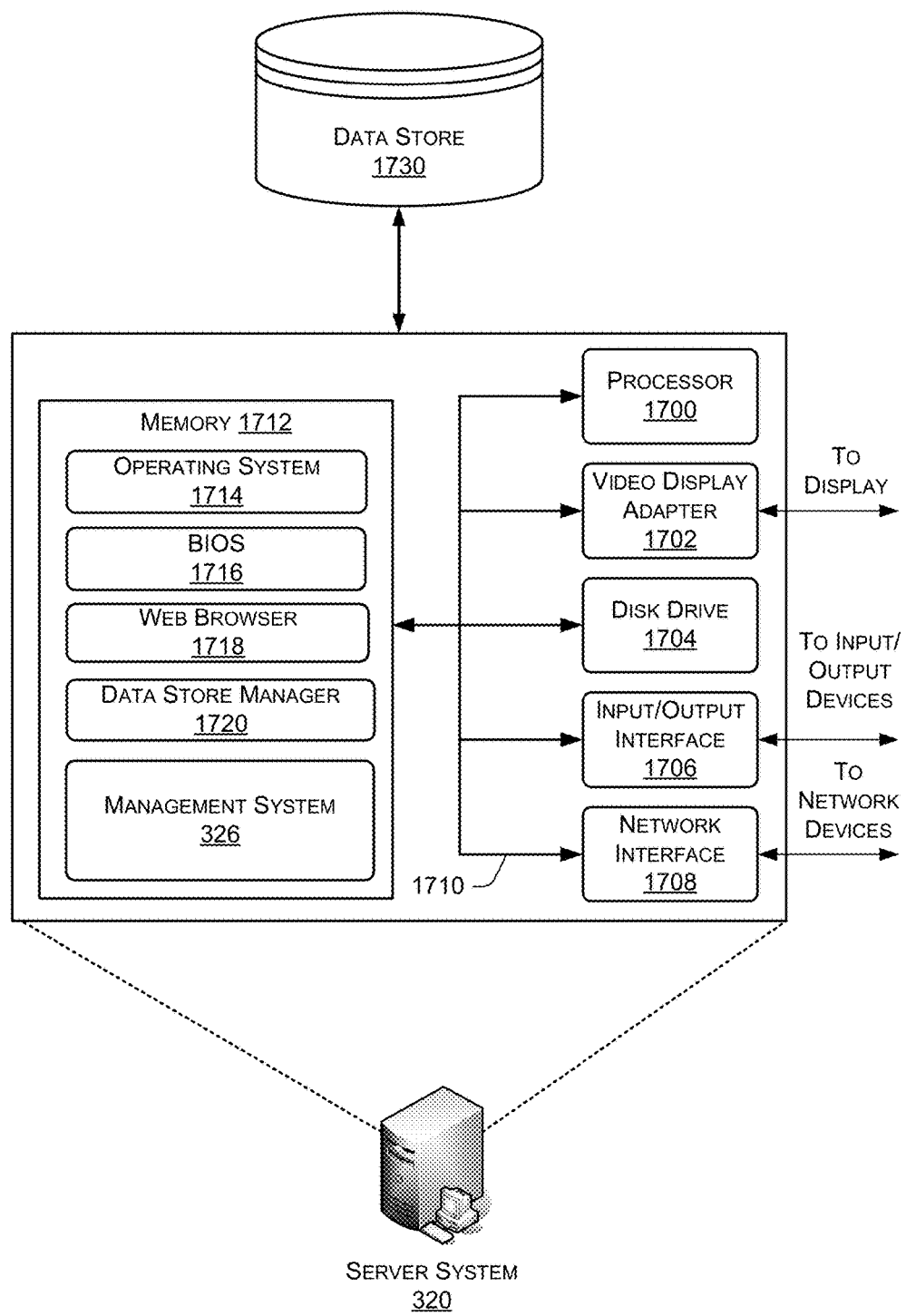
FIG. 17 is a block diagram of an illustrative implementation of a server system that may be used with various implementations.

FIG. 17 is a block diagram of an illustrative implementation of a server system, such as the server system 320, which may be used in the implementations described herein. The server system 320 may include a processor 1700, such as one or more redundant processors, a video display adapter 1702, a disk drive 1704, an input/output interface 1706, a network interface 1708, and a memory 1712. The processor 1700, the video display adapter 1702, the disk drive 1704, the input/output interface 1706, the network interface 1708, and the memory 1712 may be communicatively coupled to each other by a communication bus 1710.

The video display adapter 1702 provides display signals to a local display (not shown in FIG. 17) permitting an agent of the server system 320 to monitor and configure operation of the server system 320 and/or to provide information (e.g., regarding the operations of AGVs 200, transportation vehicles 332, etc.). The input/output interface 1706 likewise communicates with external input/output devices not shown in FIG. 17, such as a mouse, keyboard, scanner, or other input and output devices that can be operated by an agent of the server system 320. The network interface 1708 includes hardware, software, or any combination thereof, to communicate with other computing devices. For example, the network interface 1708 may be configured to provide communications between the server system 320 and other computing devices, such as that of an AGV 200, transportation vehicle 332, management system 326, etc., via a network.

The memory 1712 generally comprises random access memory (RAM), read-only memory (ROM), flash memory, and/or other volatile or permanent memory. The memory 1712 is shown storing an operating system 1714 for controlling the operation of the server system 320. A binary input/output system (BIOS) 1716 for controlling the low-level operation of the server system 320 is also stored in the memory 1712.

The memory 1712 additionally stores program code and data for providing network services to the AGVs 200, the transportation vehicles 332, the management system 326, etc. Accordingly, the memory 1712 may store a browser application 1718. The browser application 1718 comprises computer executable instructions, that, when executed by the processor 1700 generate or otherwise obtain configurable markup documents such as Web pages. The browser application 1718 communicates with a data store manager application 1720 to facilitate data exchange between the data store 1730 and the AGVs 200, the transportation vehicles 332, the management system 326, etc.

As used herein, the term "data store" refers to any device or combination of devices capable of storing, accessing, and retrieving data, which may include any combination and number of data servers, databases, data storage devices and data storage media, in any standard, distributed or clustered environment. The server system 320 can include any appropriate hardware and software for integrating with the data store 1730 as needed to execute aspects of one or more applications for an AGV 200, a transportation vehicle, a management system 326, etc.

The data store 1730 can include several separate data tables, databases or other data storage mechanisms and media for storing data relating to a particular aspect. For example, the illustrated data store 1730 may include mechanisms for maintaining information related to operations, inventory, maps, GPS data, AGVs, delivery locations, home base locations, meeting areas, associated travel paths, etc., which can be used to generate and deliver information to an AGV 200, a transportation vehicle 332, a management system 326, agents, etc. It should be understood that there may be additional aspects that can be stored in the data store 1730 and that additional data stores beyond the one illustrated may be included. The data store 1730 is operable, through logic associated therewith, to receive instructions from the server system 320 and obtain, update or otherwise process data in response thereto.

The memory 1712 may also include the management system 326, discussed above. The management system 326 may be executable by the processor 1700 to implement one or more of the functions of the server system 320. In one implementation, the management system 326 may represent instructions embodied in one or more software programs stored in the memory 1712. In another implementation, the management system 326 can represent hardware, software instructions, or a combination thereof.

The server system 320, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction in FIG. 17 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to transport an ordered item, the system comprising:
    a materials handling facility containing an ordered item to be delivered by an autonomous ground vehicle (AGV) to a delivery location in a delivery area;
    an AGV facility that is mobile and is configured to be temporarily located at a stopping location in the delivery area;
    a transportation vehicle configured to transport the ordered item from the materials handling facility to the AGV facility at the stopping location in the delivery area;
    an AGV to be deployed from the AGV facility to deliver the ordered item from the AGV facility to the delivery location, the AGV comprising:
        a propulsion portion;
        a power module for supplying power to the propulsion portion;
        a storage compartment having a locking mechanism; and
    a control system, comprising:
        one or more processors; and
        a memory coupled to the one or more processors and storing program instructions that when executed by the one or more processors cause the one or more processors to at least:
            control the propulsion portion to deploy the AGV from the AGV facility that is at the stopping location in the delivery area with the ordered item contained in the storage compartment of the AGV;
            control the propulsion portion to navigate the AGV along a travel path from the AGV facility to the delivery location; and
            control the locking mechanism after the AGV has arrived at the delivery location to unlock the storage compartment to enable the ordered item to be removed from the storage compartment.

2. The system of claim 1, wherein the AGV facility that is mobile is of a size that fits within a 9 foot by 18 foot parking space.

3. The system of claim 2, wherein the AGV facility comprises an item engagement mechanism that is configured to place the item in the storage compartment of the AGV.

4. The system of claim 3, wherein the item engagement mechanism comprises a mechanical arm.

5. A transportation system, comprising:
    a first autonomous ground vehicle (AGV) comprising:
        a first storage compartment having a first locking mechanism;
        a first control system configured to control the first locking mechanism; and
        a first propulsion portion;
    an AGV facility that the first AGV is configured to deploy from and that is mobile and is configured to be temporarily located at a stopping location in a delivery area; and
    a computing system, comprising:
        one or more processors; and
        a memory coupled to the one or more processors and storing program instructions that when executed by the one or more processors cause the one or more processors to at least:
            provide instructions for an item to be to be transported by a transportation vehicle from a materials handling facility to the AGV facility at the stopping location in the delivery area;
            provide instructions for the first AGV to deploy from the AGV facility with the item in the first storage compartment;
            provide instructions for the first AGV to follow a travel path to deliver the item to a first delivery location that is in the delivery area; and
            provide instructions for the first AGV to follow the travel path to return to the AGV facility after completing the delivery of the item to the first delivery location.

6. The system of claim 5, wherein the AGV facility comprises a door that requires an access code to open, and the first AGV further comprises an access mechanism that wirelessly transmits the access code to open the door to enable the first AGV to at least one of enter or exit the AGV facility.

7. The system of claim 5, wherein the AGV facility comprises an item engagement mechanism that is configured to place the item in the first storage compartment of the first AGV.

8. The system of claim 7, wherein the item engagement mechanism comprises a mechanical arm.

9. The system of claim 5, whereon the travel path is a first travel path, the system further comprising:
a second AGV comprising:
a second storage compartment having a second locking mechanism;
a second control system configured to control the second locking mechanism; and
a second propulsion portion; and
wherein the program instructions when executed by the one or more processors further cause the one or more processors to:
instruct the second AGV to deploy from the AGV facility;
instruct the second AGV to follow a second travel path to deliver an item to a second delivery location; and
instruct the second AGV to follow the second travel path to return to the AGV facility after completing the delivery of the item to the second delivery location.

10. The system of claim 9, wherein the AGV facility is large enough to contain the first and second AGVs at the same time.

11. The system of claim 10, wherein the AGV facility is of a size that fits within a 9 foot by 18 foot parking space.

12. The system of claim 10, wherein the AGV facility is configured to store the first and second AGVs when the first and second AGVs are not performing deliveries or other activities.

13. A computer implemented method to transport an item, the computer implemented method comprising:
under control of one or more computing systems configured with executable instructions,
providing instructions for an AGV facility that is mobile to be temporarily located at a stopping location in a delivery area;
receiving an order for a first item that is to be delivered by a first autonomous ground vehicle (AGV) to a first delivery location that is in the delivery area;
providing instructions for the first item to be transported by a transportation vehicle from a materials handling facility to the AGV facility;
providing instructions for the first AGV to receive the first item in a storage compartment of the first AGV at the AGV facility; and
providing instructions for the first AGV to follow a travel path from the AGV facility to the first delivery location to deliver the first item.

14. The computer implemented method of claim 13, wherein the travel path is a first travel path, the method further comprising:
receiving an order for a second item that is to be delivered by a second AGV to a second delivery location;
providing instructions for the second item to be transported by the transportation vehicle from the materials handling facility to the AGV facility at the same time that the first item is transported by the transportation vehicle to the AGV facility;
providing instructions for the second AGV to receive the second item in a storage compartment of the second AGV at the AGV facility; and
providing instructions for the second AGV to follow a second travel path from the AGV facility to the second delivery location to deliver the second item.

15. The computer implemented method of claim 14, wherein the AGV facility is a home base location for the first and second AGVs, and the method further comprises providing instructions for the first and second AGVs to follow respective travel paths to return to the AGV facility after completing the deliveries to the respective first and second delivery locations.

16. The computer implemented method of claim 14, further comprising providing instructions for the first and second items to be removed from the transportation vehicle and placed in the respective first and second storage compartments while the first and second AGVs are inside the AGV facility.

17. The computer implemented method of claim 13, further comprising providing instructions for the first AGV and a second AGV to utilize respective coupling portions to couple to respective docking stations inside the AGV facility.

18. The computer-implemented method of claim 13, wherein the AGV facility that is mobile is of a size that fits within a 9 foot by 18 foot parking space, and the instructions for the AGV facility to be positioned at the stopping location include instructions for searching for an available parking space in the delivery area where the AGV facility may be parked.

19. The computer-implemented method of claim 18, wherein the AGV facility comprises an item engagement mechanism and the computer-implemented method further comprises providing instructions for the item engagement mechanism to place the item in the storage compartment of the AGV.

20. The computer-implemented method of claim 19, wherein the item engagement mechanism comprises a mechanical arm and the instructions for the item engagement mechanism comprise instructions for the mechanical arm to place the item in the storage compartment of the AGV.

* * * * *